(12) United States Patent
Choyi et al.

(10) Patent No.: US 7,339,928 B2
(45) Date of Patent: Mar. 4, 2008

(54) MICRO-MOBILITY NETWORK ROUTING SYSTEM AND METHOD

(75) Inventors: Vinod Kumar Choyi, Plano, TX (US); Behcet Sarikaya, Plano, TX (US); Vincent Magret, Oak Park, CA (US)

(73) Assignee: Alcatel Lucent, Paris (FR)

( * ) Notice: Subject to any disclaimer, the term of this patent is extended or adjusted under 35 U.S.C. 154(b) by 1133 days.

(21) Appl. No.: 10/068,525

(22) Filed: Feb. 4, 2002

(65) Prior Publication Data

US 2005/0213545 A1    Sep. 29, 2005

Related U.S. Application Data

(60) Provisional application No. 60/316,849, filed on Aug. 29, 2001.

(51) Int. Cl.
*H04B 7/00* (2006.01)

(52) U.S. Cl. ........................... 370/390; 370/392

(58) Field of Classification Search ............ 370/310.2, 370/313, 340, 341, 409, 437, 390
See application file for complete search history.

(56) References Cited

U.S. PATENT DOCUMENTS

| | | | |
|---|---|---|---|
| 5,325,362 A | 6/1994 | Aziz | |
| 5,636,220 A | 6/1997 | Vook et al. | |
| 5,901,362 A | 5/1999 | Cheung et al. | |
| 6,240,089 B1 | 5/2001 | Okanoue et al. | |
| 6,243,758 B1 | 6/2001 | Okanoue | |
| 6,434,134 B1 * | 8/2002 | La Porta et al. | 370/338 |
| 6,816,912 B1 * | 11/2004 | Borella et al. | 709/238 |
| 2001/0016492 A1 * | 8/2001 | Igarashi et al. | 455/433 |
| 2002/0075866 A1 * | 6/2002 | Troxel et al. | 370/389 |

FOREIGN PATENT DOCUMENTS

| | | |
|---|---|---|
| EP | 1 030 491 A2 | 8/2000 |
| WO | WO 00/54475 | 9/2000 |
| WO | WO 01/08359 A1 | 2/2001 |
| WO | WO 01/22766 A1 | 3/2001 |

OTHER PUBLICATIONS

Johnson, David B.; Mobility Support in IPv6; IETF Mobile IP Working Group, Internet Draft; Nov. 18, 1998; pp. i-93.

(Continued)

*Primary Examiner*—Huy D. Vu
*Assistant Examiner*—Roberta Shand
(74) *Attorney, Agent, or Firm*—Bobby D. Slaton

(57) ABSTRACT

A micro-mobility network routing system and method implementing a protocol that extends the macro mobility support of Mobile IP to support micro mobility is disclosed which permits a more efficient and easily implemented Internet routing protocol for network devices to be affected. The macro mobility feature herein refers to the notion in which the mobile node gains access to the Internet, while retaining the same IP address. This concept is used only once when the mobile node enters the coverage area of a foreign domain (eventually its home domain). The concept of micro mobility within this context eases routing packets to the mobile node while its moves within the foreign network. The present invention implements these new features via the use of message compositions and protocol extensions that extend the prior art Mobile IP protocols.

5 Claims, 40 Drawing Sheets

OTHER PUBLICATIONS

Seshan, et al; Handoffs in Cellular Wireless Networks; The Daedalus Implementation and Experience; Wireless Personal Communications; Mar. 1, 1997; pp. 141-162; vol. 4, No. 2; Kluwer Academic Publishers, NL.

Heissenhuber, et al.; Home Agent Redundancy and Load Balancing in Mobile IPv6; Proceedings of the International IFIP-IEEE Conference on Broadband Communications; Nov. 10, 1999; pp. 235-244.

Mysore, et al.; A New Multicasting-based Architecture for Internet Host Mobility; MultiCom 97; 1997; USA.

Tan, et al.; A Fast Handoff Scheme for Wireless Networks; Singapore 99; 1999; USA.

Castelluccia, et al.; Toward a Unified Hierarchical Mobility Management Framework; IETF internet draft; Jun. 25, 1999; USA.

Ramjee, et al.; IP Micro-Mobility Support Using HAWAII; IETF internet draft; Ju. 25, 1999, USA.

Valko, et al.; Cellular IP; IETF internet draft; Nov. 1998; USA.

Charles Perkins; IP Mobility Support; IETF RFC 2002; Oct. 1996; USA.

W. Fenner; Internet Group Management Protocol, Version 2; IETF RFC 2236; Nov. 1997; USA.

Aboba, et al.; The Network Access Identifier; IETF RFC 2486; Jan. 1999; USA.

Magret, et al.; Multicast Micro-Mobility Protocol (MMM); IETF internet draft; Jul. 1, 2000; USA.

Magret, et al.; Multicast Micro-mobility Management; Mobile Data Management, Second International Conference, MDM 2001, Hong King, CHina, Jan. 8-10, 2001; Proceedings by Vincent Magret and Vinod Kumar Choyi.

* cited by examiner

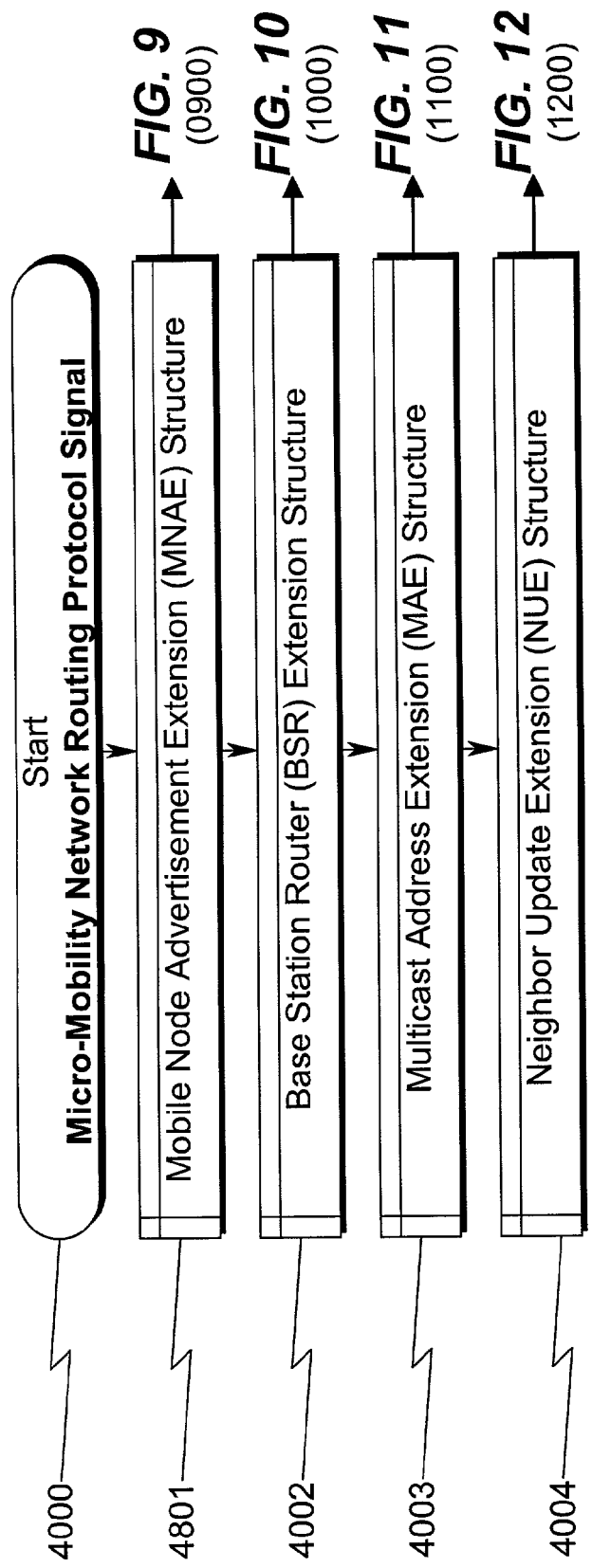

MICRO-MOBILITY NETWORK ROUTING SYSTEM AND METHOD

CROSS REFERENCE TO RELATED APPLICATIONS

Provisional Patent Applications

Applicants claim benefit pursuant to 35 U.S.C. § 119 and hereby incorporates by reference Provisional Patent Application "MICRO-MOBILITY PROTOCOL BASED ON EXPLICIT MULTICAST", Ser. No. 60/316,849, filed Aug. 29, 2001.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

Overview

The Internet has revolutionized the way people day-to-day chores. Whether it is reading our daily morning papers, trading stocks, keeping track of weather, buying clothes or anything else that one can think of. Slowly the technology of wireless communications has improved of the last decade. It started back in the sixties with the first analog radio system to become digital and now in transition to offer broadband access. The reason that this slow revolution of wireless networking is now going to be explosive in the next few years is because now there exists a medium (Internet) to communicate and a tremendous set of applications.

Mobile IP provides a framework wherein mobile nodes can move from one point of attachment (e.g., a sub-network in an enterprise) to another sub-network (e.g., another sub-network in another enterprise) and will still be able to communicate with nodes. Mobile IP provides the means to keep track of the current location (called a binding in Mobile IP specification) and have all the traffic sent to the mobile node transparently forwarded to the current location. Mobile IP implies that whenever the mobile node moves from one sub-network to another to update the tracking (i.e., the binding) that is maintain in his home network (e.g., the network in which the user is officially registered).

Problem Solution Field

The problem with Mobile IP is the overhead that is incurred while performing handoff. When the Mobile Host is in a Foreign Network and every time it performs a handoff, Mobile IP Registration Request messages are sent to the Home Agent. The Base Stations in Cellular networks are usually clustered together forming domains along with routers in the upstream that determine where the packets have to be forwarded. One solution to the problem of frequent Registration Request messages being sent to the HA is to take advantage of the domain concept and the topology of the domain (usually Tree-like).

The present invention is related to the general area of telecommunications and computer network message routing within the context of Mobile IP. While the prior art deals generally with macro mobility within Mobile IP networks, the present invention extends this concept to permit a mobile node to gain access to the Internet while retaining the same IP address. To permit a significant reduction in protocol overhead, the present invention protocol reduces overall network communication to the instance in when the mobile node enters the coverage area of a foreign domain (eventually its home domain).

BACKGROUND AND DESCRIPTION OF THE PRIOR ART

Overview

Mobile IP offers support to mobile users to roam from one network to another without interruption in its services. The concept suffers from a major drawback when the user's movement imposes high frequency of handoffs on the network. Mobile IP requires the mobile node to inform its home agent of its new location every time it changes its point of attachment. The concept, which is sometimes referred to as macro-mobility is not suitable when there are frequent handoffs because of the latency that is incurred due to the exchange of registration messages between the mobile node and the Home Agent.

Present Invention Contrasted with Prior Art Solutions

Micro-mobility is an extension to Mobile IP, and is achieved by hiding the exact location of the mobile node from the home agent so that registration messages do not have to be sent all the way to the HA, instead, the messages are processed locally. The mobile node's exact location is kept local within the wireless domain it has visited. This paper presents a novel protocol designed to address micro-mobility. The protocol is based on IP multicast and has been further refined using Explicit Multicast to address the issues of fast and smooth handoffs. Explicit Multicast has been used to overcome some of the drawbacks of regular IP multicast.

Exemplary Prior Art Solutions

Several protocols, such as HAWAII [Lucent], Cellular IP [Ericsson], and Hierarchical Foreign Agent, have been proposed to decrease the amount of messages sent to the home agent (HA). Each of these protocols uses the Domain concept to reduce the frequency of messages sent.

The HAWAII and Cellular IP proposals are very similar, but HAWAII appeals better, because it offers a more complete solution to the above stated problem. An Overview of the design of the protocol is given below. Brief descriptions of the proposals from Singapore University and Hierarchical Micro-mobility management are also given below.

There are two protocols that have been widely discussed within the IETF and the academic community that are based on host-route based technique. The host-route based techniques uses hop-by-hop mechanism to perform routing whereby, at each hop the entry for the mobile host is searched and the data packets are forwarded using the appropriate interface. The two protocols are HandoffAware Inter-domain infrastructure and Cellular IP. These will now be discussed in detail.

Handoff Aware Inter-Domain Infrastructure [HAWAII]

Overview

A domain as defined in HAWAII can contain several hundred base stations, thereby increasing the probability that a MN (visiting a foreign domain), after having registered with its home agent, remains within the same wireless domain. In such a scenario the home agent's role is very much reduced.

HAWAII defines a Domain Root Router (DRR) as the connecting device between the Internet and the wireless domain. The mobile node or mobile host uses the usual Mobile IP concepts when moving for the first time into a foreign domain.

The protocol requires that the mobile node use a co-located care-of address, an address that is not given by the foreign agent. The address can be obtained for instance via DHCP. The mobile node appends a Network Address Identifier Extension so that the domain can differentiate between a visiting mobile node from a mobile node administrated by the domain. For a visiting node, the base station (i.e., the router that is connected to the base station) creates an entry in the routing cache for the mobile node and forwards the registration request to the home agent of the mobile node. Each node along the path realizes the same operation (i.e., creation of a routing cache's entry) until the message reaches the DRR, from where the registration request is forwarded to the home agent.

The mobile node must remember the address of the current base station, so that it can provide the IP address along with its registration request when performing a handoff to the new base station. The presence of the Previous Foreign Agent Node Extension helps the base station to determine if the mobile node had previously registered via another base station from within the same wireless domain.

When the base station detects this extension, it triggers the route update algorithm. Two possibilities are defined depending on the capacity offered by the wireless technology used. If the mobile node can receive packets from two base stations simultaneously, the routing update process goes on until the crossover router (the router that has one interface leading to the old base station and the other one leading towards the new one); this scheme is also called the non-forwarding scheme. In the forwarding scheme wherein the mobile nodes are not capable of simultaneously listening to multiple base stations the route update message is sent till it reaches the old base station. This scheme allows the old base station to forward the packets intended for the mobile node to the mobile node's new location.

If there is no traffic and the mobile node is not yet idle, the node is required to transmit path update messages. These messages are propagated towards the DRR and at each router in its path the routing entries are refreshed.

Correspondent nodes send packets to the home address of the mobile node. The home agent intercepts these packets and creates a tunnel using the co-located care-of address of the mobile node. When the packets arrive at the DRR, they are forwarded in a hop-by-hop manner. At this point each hop uses the routing entries previously updated by the MN. This protocol is further extended with a support for paging.

The general characteristics of HAWAII are as follows:
Defines a two-level hierarchy along domain boundaries and defines separate mechanisms for inter-domain and intra-domain mobility. A unique co-located care-of-address is assigned to the mobile Host to provide for straight-forward QoS support Special Paths are established to maintain end-to-end connectivity as the mobile host moves. These paths are used to provide for hop-by-hop routing of packets.

Soft-state mechanisms are used to provide a degree of tolerance to router or link failures within the network.

Depending upon the capability of the Mobile Host two different schemes for smooth handoffs are provided. A Non Forwarding Scheme for Mobile Nodes that can receive data simultaneously from two different Base Stations and a Forwarding Scheme for Nodes that can receive data only from one Base Station at a time.

Terminology Used in HAWAII

Home Domain
This is the domain to which a Mobile Node belongs.

Foreign Domain
Any domain that the Mobile Node visits and is not its Home Domain Domain Root Router
Domain Root Router is the Gateway to a Domain Update Messages
These are messages sent by the Base Station to the routers upstream to update the entries of a Mobile Node when a handoff occurs or periodically (using a lifetime)

Principles
The gateway into each domain is called the Domain Root Router. Each host has an IP address and a Home Domain. A domain may cover an area containing a few hundred base-stations, thereby increasing the probability that the mobile host is within its home domain. The home agent's job is very much reduced.

When a mobile node (MN) moves into a foreign domain, the usual mobile IP concepts come into play. Each mobile host is assigned a unique care-of-address and the address is unchanged when moving within the foreign domain. The home agent tunnels the packets to the care-of-address. The home agent is not notified of movements within the foreign domain and connectivity is maintained using dynamically established paths in the foreign domain.

Sequence of Operations—Power Up
The base station determines if the MN is at home or in a foreign domain by comparing the network access identifier (NAI) sent along with the registration request with the NAI of the current wireless domain. If the mobile is at home the base station must create a route entry in every node till the domain root router. Otherwise the base station must forward the registration request to the home agent and create a route entry in every node till the domain root router.

Packets from a Correspondent Node (CN) are sent to the Home Network of the MN.

The packets are intercepted by the HA and then tunneled to the MN using the co-located care-of address (CCOA). When the packets reach the wireless domain they are routed using the hop-by-hop route entries previously created.

Operation Sequence—Intra-domain Movement (Non-Forwarding)

On Receiving a Registration Request from a MN, the Base Station (BS) figures out the old base station as the MN must sent the previous foreign agent extension along with the registration request.

If the movement was an Intra-domain movement then the BS would send an Hawaii Update message to all the way to the Old BS, updating the cache of all the routers in the path between the new BS and the Old BS The Old BS then sends an acknowledgement back to the New BS The above operations are done to provide for smooth-handoff Sequence of Operations—Intra-Domain Handoff Packets sent by the CN are sent to the MN's home network, the Home Agent intercepts these packets and tunnels them to the CCOA. The DRR then sends the packets downstream through the appropriate interface on a hop-by-hop basis.

The crossover router then forwards the packets to the next hop router through the interface as per the HAWAII entry.

Cellular IP [CIP]

Overview

Cellular IP is intended to allow routing of IP datagrams to a mobile host. The protocol along with mobile IP is intended to provide wide-area mobility support. Cellular IP has been designed to be used on a local level, like in a campus or metropolitan area network.

Cellular IP is similar to HAWAII as it relies on a hop-by-hop principle to handle the traffic within the wireless domain. The protocols differ in the terminology used, the messages and its interaction with Mobile IP. The CIP gateway controls the traffic that is directed to and originating from the CIP domain. The CIP gateway includes two sub-components: the gateway controller and the gateway filter.

The Gateway Controller (GC) receives packets that are usually update packets that are used by the Gateway to update the locations of the MN and are then dropped. The Filter (GPF) checks to see if packets coming from within the domain are to be sent to the GC or forwarded on to the Internet. One of the primary features of this protocol is the distinction made between idle and active nodes and the support for paging.

Terminology

Cellular IP Node

A cellular IP network consists of interconnected Cellular IP (CIP) nodes. The nodes route packets inside the Cellular IP network and communicate via wireless interface with mobile hosts.

Gateway Controller

The Gateway Controller (GC) receives packets that are usually update packets that are used by the Gateway to update the locations of the MN and are then dropped.

Gateway Packet Filter

The Filter (GPF) checks to see if packets coming from within the domain are to be sent to the GC or forwarded on to the Internet.

Cellular IP Gateway

It consists of a GC, CIP Node and GPF.

Control Packet

A route-update and paging-update packet

Paging Cache

A cache maintained by some Cellular IP nodes used to route packets to mobile hosts

HAWAII and CIP Deficiencies

The solutions described in previous sections allow for support of micro-mobility. HAWAII requires that the mobile node receive an agent advertisement as defined in Mobile IP before being able to update the routing entries along the path from the DRR to the last router. The latency involved in updating intermediate routers from the BS to the DRR after a handoff may not be in line with requirements for realtime applications. CIP imposes modifications to Mobile IP at the mobile node and the implementation of CIP at every mobile node, which are stringent restrictions and a drawback of the solution. Both protocols may face scalability problems if they are deployed over cellular infrastructure, where the number of users could be very large.

Location Management and Routing

CIP uses two parallel cache systems to store information related to location of mobile hosts. Mappings for active hosts are maintained in the routing-cache that has a small timeout value when compared to the timeout in paging cache. For a host that performs handoff frequently, the mappings are maintained at the routing-cache. Since the time-out values of the routing-cache are very small, it results in flushing the entry for a mobile from the routing cache of a node. Thus, packets would not be sent to the mobile host's old address resulting in less wastage of resources. An idle host sends fewer update packets since the time-out values for the routing-cache are larger.

Cellular IP Functions

Location Management

Paging update packets are sent by idle hosts to update the Paging-cache mappings, to reflect the current location but do not modify the routing-cache mappings. Paging update packets are discarded once it reaches the Gateway to prevent Cellular IP specific control operations from reaching the Internet.

When an IP packet arrives at a Cellular node, addressed to a mobile host for which no up-to-date routing cache mapping is available then the mapping in the paging cache is used to route the packet. This phase is called "Implicit Paging".

Routing

Packets transmitted by mobile hosts are routed to the gateway using regular hop-by-hop routing, the cellular IP nodes monitor these packets and update their routing-cache entries with the host address and the interface on which they arrived. Packets addressed to the mobile host are routed hop-by-hop in the reverse by the routing cache mappings. Mobile hosts that are active but do not have any data to send must send periodic route-update packets in order to ensure that route-caches are not purged. For reliability paging caches may also contain mobile hosts that are also contained by routing caches.

Handoff

The mobile host initiates handoff. When a mobile host migrates packets are directed to the new base station and these packets update the caches along its path to the gateway. If there are nodes that share both the paths then the old mappings are refreshed. Packets would be sent to the old base stations and to the new base station for a time equal to the timeout of the route-cache mappings. After the expiration of the timeout the cache entries for the old base stations are cleared.

Wide-Area Mobility

Wide area mobility occurs when a mobile host moves from one Cellular IP network to another. The mobile nodes distinguish between Cellular IP network by using the Cellular IP network identifier contained in the Base station's beacon signals. The beacon signal also contains the IP address of the gateway. A mobile host can start sending paging-update packets immediately. Upon receiving the first paging-update packet, the gateway performs admission control that could involve charging decisions, etc. Once the request has been accepted the mobile host can send a mobile IP registration message to its home agent specifying the gateway's IP address as care-of-address.

Singapore University Proposal

This scheme suggests using a hierarchical mobility management architecture to restrict handoff processing within the domain and uses multicast as a mechanism to deliver packets to multiple base stations to achieve fast handoffs.

Terminology

Domain Foreign Agent (DFA)
The DFA works like a gateway into the domain. The DFA performs all functionality as mentioned in Mobile IP.

Dynamic Virtual Macro-cells (DVMs)
The base stations are logically organized into DVMs. The DVMs are formed by clusters of base stations adjacent to each other and may even overlap. Each BS may belong to multiple DVMs but each BS can only be the core of only one DVM.

Principles
MN registers with the IP address of the DFA, which are broadcast on behalf of the DFA by the BS. The DFA assigns a multicast address unique within it domain for the MN. The MN informs the serving BS to subscribe to this multicast address. The BS in turn tells its neighboring BSs to subscribe to the multicast group.

Packets destined to a MN within a domain are tunneled to the DFA, the DFA then forwards the packets to the multicast address of the MN. BSs subscribed to the multicast group receive the datagrams, and only that BS that serves the MN forwards the packet the other BSs just buffers them.

A significant disadvantage of this approach is the management of who the core is each time there is a handoff.

Hierarchical Micro Mobility

Terminology
In this proposed micro mobility scheme, the mobility management protocol is composed of three components:

Access Mobility Management Protocol
It specified the registration procedures between the MN and the domain it is attached and is independent of the micro and macro-mobility management protocols used in the core of the network Micro-mobility Management Protocol
It handles the local mobility within the domain.

Macro-mobility Management Protocol
It is the protocol that handles macro-mobility (inter-domain) of the MN; Mobile IP is used to achieve macro-mobility Principles
The proposal is based on the deployment of Mobility supports (MS). A MS is a router or set of routers that maintains a binding per Mobile nodes currently visiting the domain and also performs the job of sending Bind Updates on behalf of the MN. Typical functions of a MS include:
Process Registration Messages sent by the MN
Send Binding Updates to the CN and the HA of the MN
Intercept and redirect packets addressed to the MN Sequence of Operations: Entering a New Domain (Inter-domain Movement)
Obtains a CoA (also called Physical CoA (PcoA)) and registers with the Mobility Support, by sending its Home Address, home agent address, PcoA and the address of its previous Mobility Support (MS_p) in the previous domain. The registration is acknowledged by the Mobility Support
Upon receiving a registration message from the MN, the MS allocates a Virtual CoA (VCoA) for the MN and registers with its HA on behalf of the MN. Then it acknowledges the reception of the registration message sent by the MN and the acknowledgement contains the VCoA.
After the above-mentioned operations the MS asks the MS_p to redirect all packets addressed to the MN to it. MS_p must acknowledge this request and send the list of CN and the list of sequence numbers of the latest Binding updates sent.
Creates an entry that contains binding between MN's address, its HA, VcoA and the list of CN's and sequence numbers.
Sends a binding Update to each CN
MS then creates a binding between the MN's PcoA and VcoA, which is used by the MS to redirect packets addressed to its current point of attachment.

Sequence of Operations: Intra-domain Movement
When a MN moves within a domain (from the coverage of one BS to another, then the MN registers its new point of attachment with the MS. The MS then updates binding entry for the MN replacing the existing PCoA with the new PCoA. Could also send Binding Updates to the MN's local CN's.

Data Flow
Datagrams sent by a correspondent node are intercepted by the MN's HA and forwarded to the MN's VCoA. The MS intercepts these packets and tunnels them to the PCoA. The MS sends a (Home Address, Border Router) bind update messages to each of the CNs. The CNs on receiving these messages updates the MN's entry and sends the forthcoming packets to the MN's current PcoA.

Multicasting Based Architecture for Internet Host Mobility

This proposal uses IP multicasting as a mechanism to achieve mobility. Every mobile node is issued a multicast address instead of a unicast address. There is no concept of Home Agent/Foreign Agent The multicast address is used along with Location Servers and Multicast Routers to achieve mobility. It is not a solution to the problem of micro-mobility. It is protocol that challenges Mobile IP.

Terminology

Location Server (Distributed Directory)
   These are servers that store binding between the multicast address of a MN and the Multicast Router serving the MN. Each MN is responsible for periodically updating its Location Server periodically with information on the Multicast Router (MR) serving it.

Base Station
   In addition to the normal capabilities of base station, in this scheme each base station also has the capability of working as a MR.

Principles
   When a CN sends datagrams intended to a MN (having a multicast address), the multicast router (MR_CN) within the network picks up the datagrams and checks a Location Server for information regarding the MN. The Location Server chosen depends upon the multicast address of the MN.
   On obtaining the address of the Multicast Router (MR_MN) that serves the MN, the MR_CN contacts the MR_MN and joins the multicast group and forwards the datagrams.
   Each MR that receives the datagrams, de-tunnels the datagrams, and forwards them to the MN.
   Before the MN moves from the coverage of one Multicast Router to another, the MN requests the MR within the new network to join the multicast group. Therefore the MN receives packets uninterrupted.
   Therefore the previous MR and the new MR of the MN receives the packets, but the previous MR would stop receiving datagrams after a certain time period.

DEFICIENCIES IN THE PRIOR ART

While the following list should not be viewed as limiting the scope of the present invention in any way, it does provide some insight into deficiencies of the prior art that in some exemplary embodiments may be corrected by the present invention:

Cellular IP implies that the mobile node implements that protocol. This is major drawback since it requires an update of every node to be able to take advantage of the say protocol. Beside this important point, the protocol does not detailed how the mobile node should know whether it should use a traditional scheme (i.e. mobile IP) or the cellular scheme.
   Cellular IP and HAWAII both use a hop-by-hop routing protocol, which requires management of huge routing tables when deployed in a big network (e.g. cellular network, in which users are counted in millions). This specific issue implies also that all nodes in the wireless domain must integrated a specific software, thus off the shelf components cannot be used.
   HAWAII does not support the foreign address care-of address scheme offered in mobile IP. In turn, HAWAII requires usage of co-located care-of address. This principle requires the operator to manage a huge number of IP addresses, since it must allocate one IP address per user. Considering the issue that IPv4 already has a lack of address, then the proposal also implies that the network either run some private address scheme or use IPv6.
   The proposal made in Singapore implies that the mobile node sends the multicast address along with the registration request to the new base station. This modifies the protocol on every single mobile node.
   The unified hierarchical model implies that the mobility support registers on the mobile node behalf with the home agent. The scheme creates a serious security issue. It also modifies mobile IP specification by changing the registration PDU. And finally the mobile node needs to have the IP address of the base station with which it was previously connected.
   The solutions aforementioned do not support a scheme such as "make before break", which is essential for voice over IP applications.
   The last proposal has several drawbacks. There is a limitation in the number of unique class D addresses that can be assigned to each and every MN in IPv4. It requires that every router in a sub-network is mobility-aware. Before a MN moves under a new coverage, it can inform the MR within that area of a possible handoff and request the MR to join the multicast group. Therefore, the MN has to know the address of the neighboring MR, and also the overhead that is involved at the MN every time it performs a handoff. The scalability of using a location server is something that is not very clear.

One skilled in the art may be able to expand this list, but it does serve to indicate that the prior art has pending technical issues that have yet to be addressed by any Mobile IP protocol.

OBJECTIVES OF THE INVENTION

Accordingly, the objectives of the present invention are (among others) to circumvent the deficiencies in the prior art and affect the following:
   (1) To increase mobility of mobile nodes while maintaining an IP connection.
   (2) To reduce the routing overhead associated with current IP routing protocols.
   (3) To generally overcome the deficiencies of existing macro-mobility protocols.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Multicast Micro-Mobility (MMM) Protocol

The MMM protocol takes advantage of IP multicast to achieve fast handoffs. The base stations as defined by the protocol are not merely passive bridges, but has an active participation in the working of the protocol. Efficient handoffs can be achieved if triggers from the link layer were used to perform network layer handoffs. All routers within the wireless domain are required to support IP multicast routing.

The Main Access Router (MAR) acts as the Gateway to the wireless domain and supports Mobile IP. The MAR may serve as a foreign agent and/or a home agent. MAR processes registration requests sent by a MN and also processes the BSR extension that are appended to the registration messages. The MAR is also required to allocate and insert a multicast address extension (MAE) before forwarding the registration reply. The MAR makes use of two caches to manage nodes within its domain. The Binding cache has entries for mobile nodes that are presently being served by the MAR. The probable cache has entries for MNs that are expecting to be approved for service by the MAR. Once the MN has been approved for service after having performed the necessary checks and after receiving a registration reply from the MN's HA, the MN entry is moved from the probable cache to the binding cache. The MAR implements the extensions as described in the Mobile IP literature.

The BSR appends the BSR extension to each Mobile IP registration request and forwards the messages to the MAR. The BSR processes the multicast address extension appended to the Mobile IP registration reply. The BSRs also sends periodic neighbor binding update (NBU) message to every BSR that are on its neighbor list. The BSR manages two caches; the binding cache is used by the BSR to manage mobile nodes under its coverage and the probable cache is used by the BSR to perform fast handoffs for mobile nodes that are under the coverage of its neighboring BSRs. The binding caches are updated by MNAE messages and the probable caches are updated by the NBU message. The NBU message is used by the neighboring BSRs (the definition of "neighboring BSR" is determined by the network operator either statically or dynamically) to manage their probable caches. The Base station Routers (BSR) implement the extensions as described in known networking literature. Here it is assumed that each BSR knows the IP address of its neighboring BSRs (This can be easily configured by a Network Administrator). Each BSR also knows the IP address of its MAR.

The MMM protocol extends the current Mobile IP protocol with a set of messages designed so that:
- A BSR may communicate with its neighboring BSRs, the list of mobile node's information that are currently under the BSR's coverage area using the Neighbor Binding Extension (NBE). The neighbor binding update (NBU) message contains the NBE.
- A BSR may inform its MAR the IP address of the BSR that has forwarded the Mobile IP registration request using the BSR extension. The Registration Request message is appended with the BSR extension.
- A MAR can inform the BSR, the multicast address assigned to a particular MN after a MN has been granted access to the network using the Multicast Address Extension (MAE). This extension is appended to the Mobile IP registration reply.
- A BS can inform the BSR the link layer characteristics of a mobile node entering its cell using a Mobile Node Advertisement extension (MNAE). The message MAY contain more than one MNAE.

The following discussion describes the different phases, detailing how these extensions contribute in extending mobile IP to offer micro-mobility support. A short description is given about the sequence of operations when a MN enters a foreign domain. This protocol makes an assumption that there is a single operator managing the foreign network.

Protocol Extensions

The present invention extends existing Mobile IP protocols with the following additions:
- BSR Extension—appended after the mobile node's registration request and contains the IP address of the BSR forwarding the mobile node's registration request.
- Multicast Address Extension (MAE)—appended after the home agent's registration reply and contains the multicast address allocated for the mobile node.
- Neighbor Update Extension (NUE)—message is sent by one BSR to its surrounding BSRs to inform them with the list of mobile node currently located under its BSR coverage area. The message is sent periodically.
- Mobile Node Advertisement Extension (MNAE)—sent whenever the base station discovers that a new mobile node has entered the coverage area.

Message Extensions

The present invention extends existing Mobile IP messaages with the following additions:
- Mobile Node Advertisement (MNA)—A base station sends this message to its BSR whenever the base station discovers that a new mobile has entered its coverage area. The message is also sent periodically to refresh binding cache entries in the BSR.
- Neighbor Binding Update (NBU)—A BSR that currently serves a MN periodically sends NBU messages to its neighboring BSRs. The NBU messages can contain NUE for all MNs under its coverage. When a BSR receives NBU from a neighboring BSR, it then refreshes or adds information of MNs that are under the coverage of its neighbor. This is only a partial refresh because the BSR has to receive NBUs from all its neighboring BSRs in order that all entries are refreshed or updated.

Messaging Principles

The disclosed MMM protocol extends the current Mobile IP protocol with a set of messages designed so that:
- A BSR may communicate with its neighboring BSRs, the list of mobile node's information that are currently under the BSR's coverage area using the Neighbor Update Extension (NUE). The neighbor binding update (NBU) message contains the NUE.
- A BSR may inform its MAR the IP address of the BSR that has forwarded the Mobile IP registration request using the BSR extension. The Registration Request message is appended with the BSR extension.
- A MAR can inform the BSR, the multicast address assigned to a particular MN after a MN has been granted access to the network using the Multicast Address Extension (MAE). This extension is appended to the Mobile IP registration reply.

A BS can inform the BSR the link layer characteristics of a mobile node entering its cell using a Mobile Node Advertisement (MNA). The message MAY contain more than one MNAE.

Visiting a Foreign Domain

When a MN enters the coverage area of a BSR (or any other router in this domain), the link layer protocol at the BS serving the mobile node triggers a MNAE message. The BS informs its BSR of the arrival of a MN under its coverage. The base stations periodically send MNAE messages to the BSR with the list MNs under its coverage.

The BSR takes an action based on the presence of link layer information of the MN in its caches. If there is an entry for the MN in its binding cache, then the BSR refreshes the entry. If there is an entry for the MN in its probable cache, then the BSR joins the multicast group and transfers the entry from the probable cache to the binding cache. If there are no entries in either of its caches then the BSR sends a mobile IP agent advertisement message to the mobile node.

Upon receiving the advertisement the MN sends a registration request to the BSR. The BSR appends the BSR extension to the MN registration request and forwards it to its MAR. The MAR after having performed all the required checks (AAA protocol, challenge/response, and key exchange, NAI, etc.) forwards the registration request without the BSR extension (this extension is stripped by the MAR) to the mobile node's home agent.

The MAR creates an entry in the pending cache for the MN with its home address and the address of the BSR serving the mobile node. To the HA, it appears as though the MAR is hosting the MN. The HA, based on its policy, grants or denies the registration request. If the HA grants the request, it then sends a registration reply to the MAR with the appropriate flags.

If the MN initiates a registration request and moves into a new cell connected to a new BSR, the mechanism previously described will trigger a second registration request. The new BSR processes the registration request as described previously (the BSR appends the BSR extension to the registration request). The MAR receiving the MN registration checks its pending cache for entries. If an entry exists, the MAR will conclude that the MN has moved under another BSR's coverage area while the mobile node's home agent processes the previous registration request. The MAR does not forward the new registration request to the MN's home agent. The MAR updates the pending cache to reflect the new BSR address.

When the MAR receives a registration reply from the HA, it moves the entry for the MN from the probable cache to the binding cache and assigns a multicast address to the MN. The registration reply is then forwarded to the BSR along with the appended MAE. The BSR removes the MAE and forwards the registration reply to the MN. It also creates an entry binding the multicast address to the MN.

The current BSR of the MN periodically informs its neighboring BSRs of the newly created bindings of MNs within its coverage using a NBU message. This message includes the MN home address, its CoA, HA address, the multicast address, link layer information and the lifetime of the registration for each MN within its coverage. The NBU message partially refreshes the probable cache entries. It is a partial refresh, because the cache will be entirely refreshed only after the BSR has received every NBU message from each of its neighboring BSRs.

The base stations periodically send mobile node advertisement message to its BSR (the periodicity has not been defined) to refresh the bindings. The mobile node advertisement message partially refreshes BSR's binding cache entries. It is a partial refresh, as the cache will only be refreshed entirely after the BSR has received mobile node advertisement message from each of the base stations under its coverage.

If the MN moves to another BS connected to the same BSR, the BS immediately sends a mobile node advertisement message with the link layer information of the MN.

If the MN moves to a cell that is connected to a different BSR than the one serving it, then the new BS informs the new BSR of the presence of the MN by sending a mobile node advertisement message. If the BSR has an entry in its probable cache associating the link layer information given by the BS to the one found in the probable cache then it sends a join message to the MAR (requesting to join the multicast group). Meanwhile, the old BSR, which does not receive a mobile node advertisement message from at least one of its base stations refreshing the binding cache entry of the MN, then moves the biding entry for the MN to its probable cache presuming that the mobile node has moved to its neighbor.

Care-of-Address

The proposed protocol does not make any special requirement on the type of care-of address used by the MN. This address can either be a foreign agent care-of address or a co-located care-of address.

The MAR should initially require that all the BSRs set the 'R' bit in the agent advertisement messages that are sent after receiving a mobile node advertisement message.

If the MN registers with a co-located care-of address, the BSR appends the BSR extension to the registration request. The MAR processes the registration and removes the BSR extension. The MAR also allocates a multicast address for.

The MN and appends the Multicast Address Extension to the registration reply. The only difference is in traffic management, i.e., which node removes the tunnel and forwards the packet to its mobile destination.

Traffic Flow

If the correspondent node (CN) is located outside the foreign wireless domain, data packets sent to a MN will be addressed to its home address (unless Route 9 Optimization is used). The home agent intercepts these datagrams and tunnels them to the care-of address (CoA) of the MN. The CoA is the MAR's IP address. The MAR upon receiving the tunneled packets checks to see if there is a valid binding cache entry for the MN. If the MAR has a valid entry for the MN, then it de-tunnels the packets and creates a new tunnel. The IP address of the MAR is set as the source address of the tunneled packets, the destination address is the multicast address assigned to the MN. The packets are then sent through this tunnel. Each BSR that has subscribed to the multicast group receives a copy and de-tunnels the packets and only the BSR that has a binding cache entry for the MN forwards the packets to the MN. The BSRs that do not have a binding cache entry for the MN discards the packets even though they may have an entry for the MN in their probable cache.

Moving Within a Foreign Domain

If a MN enters a new cell (within the same foreign domain that it is visiting), the BS must inform the BSR of the presence of the MN. It must send a mobile node advertisement message that includes the link layer information of the MN. Two scenarios can be foreseen. In the first case the MN moves to a new BS but remains under the coverage of the same BSR (the old and the new base stations are being served by the same BSR), then no action is needed. In the second case the MN moves under the coverage of a BSR that is different from the old BSR (very likely that there would be an entry for the MN in the probable cache), then the new BSR must immediately subscribe to the multicast group. The new BSR also sends a NBU to its neighboring BSRs and if the old BSR is one among the neighboring BSRs, it would then move the entry for the MN from the binding cache to the probable cache.

Make-Before-Break

The Make-Before-Break (MBB) option requires that the neighboring BSRs of a serving BSR subscribe to the diffusion group as soon as they receive the NBU message. This option also requires that the neighboring BSRs (that have an entry in their probable cache and no entry in the binding cache) filter and discard all the incoming multicast packets. Filtering is stopped when a BSR receives a mobile node advertisement from one of its base stations for a particular MN.

Using the normal mode of operation the BSR sends a join message only after a MN has entered its coverage, this delay (depending upon how high in the topology the MAR is located) and the processing delay at the MAR are incurred. Using the MBB option, the neighboring BSRs would have joined the group prior to the entry of the mobile node within its coverage and therefore does not incur the delay. The Make-Before-Break (MBB) option is intended to eliminate the latency incurred during the join process.

Make-Before-Break within a foreign domain is illustrated generically in FIG. 6 (0600).

Exemplary Advantages

While the following list should not be viewed as limiting the scope of the present invention in any way, it does provide some insight into some features and benefits of the present invention that in some exemplary embodiments may contrast it with the prior art:

The main advantage of the protocol is the low latency that is incurred in establishing a network layer connection, this is achieved by taking advantage of the triggers offered by the link layer when a handoff occurs.

The other advantage is the smoothness of the handoff that this protocol offers. Smooth handoff occurs because of the Make-Before-break offered by the protocol and this is achieved by taking advantage of multicasting techniques. The present invention protocol described herein offers a new solution to the challenging micro-mobility issue. There are a number of advantages this protocol offers when compared to the other solutions mentioned previously The present invention protocol is completely transparent to the mobile node, which is not aware of the wireless domain and see the BSR as a "pseudo" foreign agent. The use of multicast allows the deployment of a "make before break" feature presenting advantages in case of "real-time" traffic such as voice over IP, although it is important to note that the advantage has its own drawbacks. The drawback is the "useless" traffic generated to the BSRs that do not serve a MN.

BRIEF DESCRIPTION OF THE DRAWINGS

For a fuller understanding of the advantages provided by the invention, reference should be made to the following detailed description together with the accompanying drawings wherein:

FIG. 40 illustrates the generalized signal components as embodied by protocol extensions used in some preferred embodiments of the present invention.

DESCRIPTION OF THE PRESENTLY PREFERRED EXEMPLARY EMBODIMENTS

Figure 1:
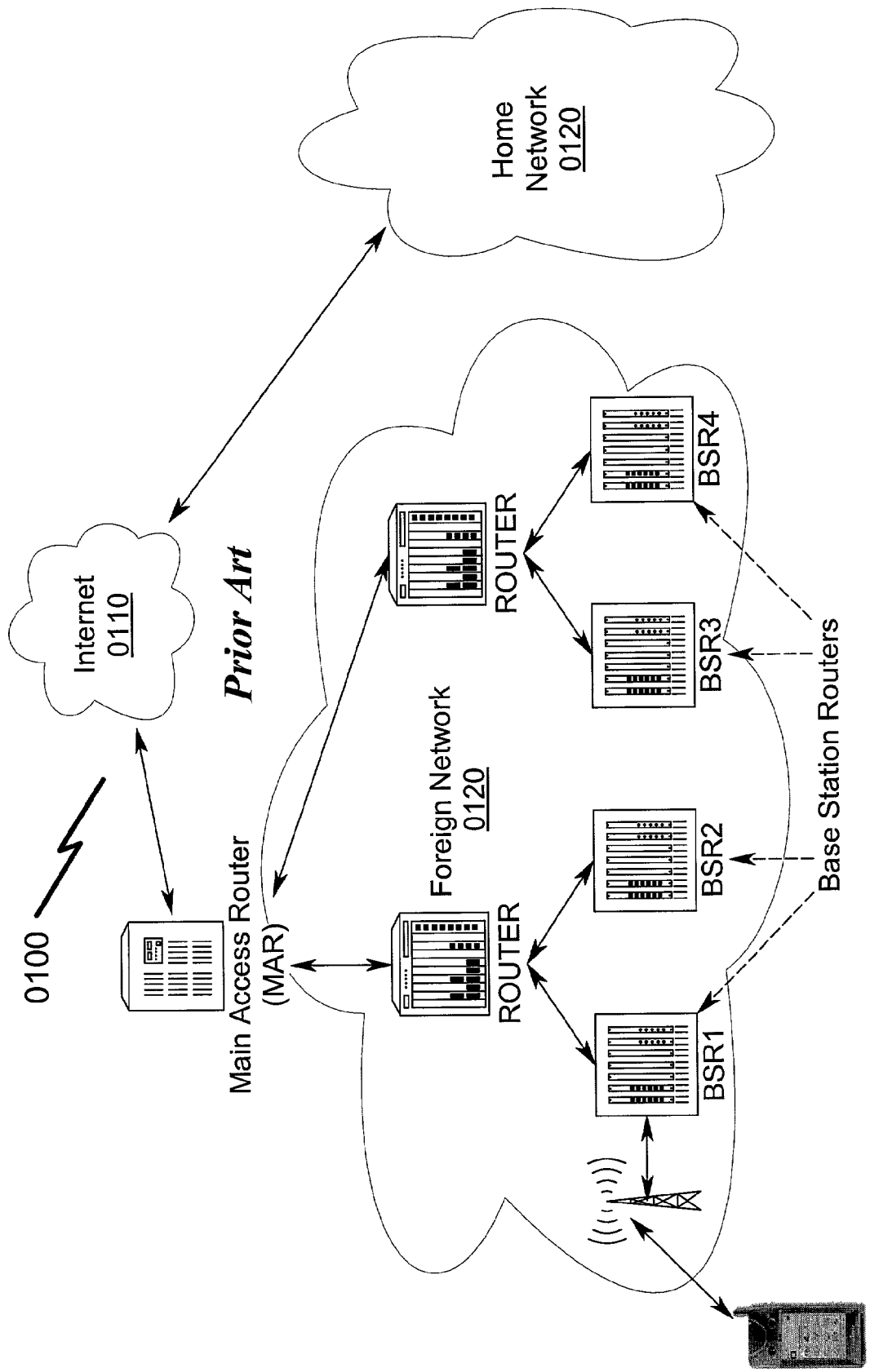
FIG. 1 illustrates existing prior art home/foreign node IP networking.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MICRO-MOBILITY NETWORK ROUTING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Definitions

Throughout the discussion in this document the following definitions will be utilized:

System Blocks/Procedural Steps not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet not Limitive

Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols.

Application Programming Interface (API) not Limitive

While the present invention may be in part implemented using standard Application Programming Interfaces (APIs) such as Software Development Kits (SDKs) and the like, there is no requirement that the present invention be implemented using these tools. Note also that the framework of the present invention may be incorporated into standard toolkits and the like which may or may not be integrated into an API framework for use in standard software development frameworks.

Operating System not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Structures not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

Communication Media not Limitive

The present invention may be embodied to affect transport of network protocol information over a variety of communication media. However, the signal format used to transmit such transmissions as described herein is only exemplary. One skilled in the art would quickly realize that a wide variety of other communication media could be used equivalently in this application. Therefore, no communication media contained herein should be interpreted as limiting the scope of the present invention.

Acronyms

The following acronyms will be used throughout the discussion of the present invention and in discussions contrasting it with the prior art:

Wireless Domain (WD)

The domain via which the user gains access to the Internet. The domain needs to be managed by a single entity for security and authorization reasons.

Main Access Router (MAR)

The router connected to the wireless domain and to the Internet. This router needs to support mobile Base Station Router (BSR)

This terms designs the router connected to a set of bridges of base stations.

BSR Coverage Area

The BSR coverage area is composed of every coverage area of each base station attached to the BSR.

Serving BSR

This terms designs the BSR that is currently processing the multicast packet sent to a mobile node. The BSR de-tunnels the outer header and forwards the inner packet to the mobile node.

Base Station (BS)

This is the end point of the wired network. It has an air interface. Several base stations may be linked to the same BSR.

BS Coverage Area

The area covered by a single base station.

BSR Active Cache

This cache contains information related to every mobile node located under the coverage area of the say BSR.

BSR Probable Cache

This cache contains information sent by surrounding BSRs indicating that a mobile node has been authorized to use the wireless infrastructure.

Cell

This is the area covered by a Base Station (BS).

Overview

In a world where wireless networking is becoming a predominant solution to offer access to customer from anywhere, it is important to have a design that allows a smooth mobility. The user needs to be able to move along his/her path without suffering from connectivity disruptions. Mobile IP defines a protocol with which the mobile node retains its home address regardless the network it is connected to. This protocol has a major drawback when hand-offs become too frequent. The process of registering via a foreign agent with the home agent creates an overhead that wills dramatically impacts on outgoing connections.

Within the context of the present invention it is assumed that base stations are not simply passive bridges. An additional assumption is that several base stations are connected to the same base station router (BSR).

The principle retained for the present invention protocol is to use the link layer protocol to trigger the sending of the agent advertisement message. Every base station is in charge of informing the BSR when a mobile node enters its cell. The base stations are connected to a base station router (BSR), which is connected to the foreign domain network. We want to take advantage of link layer protocol to inform the base station router of any mobile node's entrance in one of the cell of the BSR coverage area. Based on information in its possession, the BSR takes the appropriate action (sends an agent advertisement or joints a diffusion tree).

The wireless domain network can either be built with a tree structure or another. The tree structure is retained for the description of the protocol. The important point is the exact topology of the network is well known by the operator of the say network. This implies that regardless the motion direction taken by the user the next BSR is predictable. Within in the wireless domain network there is a Main Access Router (MAR) connecting the wireless domain to the Internet. This router plays the role of the foreign and home agent as defined in mobile IP. The rest of the network routers are traditional IP router with a specific requirement to support multicast routing.

The MAR manages a binding cache for every mobile node whose access has been granted. This cache contains information such as mobile node home address, home agent address, multicast address, and lifetime. It also manages a cache for all pending registration request. This cache contains information found in the registration request and the IP address of the BSR.

The BSR manages two caches. One cache contains information on every binding association. The binding association contains the mobile node address, the multicast address, lifetime, etc. The BSR's second cache contains information on probable mobile node. This information is given by surrounding BSRs when a mobile node access has been granted.

At power up, the MAR and BSRs MUST synchronize. During this process every BSR acquires knowledge of the FA capability of the MAR. This information is used by the each BSR to create a local agent advertisement message.

The BS triggers the emission of the agent advertisement message by sending the mobile node advertisement message; the mobile node receives it and sends a registration request. The BSR inserts its IP address at the end of the mobile node registration request (the BSR extension) and forwards the entire message to the MAR. The MAR checks the registration and takes the appropriate action associated with each extension present in the message (AAA extension, challenge and response extension, network Access Identifier extension, etc.). The MAR removes the BSR extension and creates an entry in the pending cache associating the BSR to the mobile node registration request. Then the registration request is forwarded to the home agent. Once the registration reply from the home agent is received by the MAR, it assigns a multicast address that is associated to the mobile node binding. The entry in the pending cache is moved to the binding cache and is updated to integrate the multicast address. The multicast address extension is sent along with the mobile IP registration reply to the BSR that has forwarded the mobile node registration request. The BSR removes the multicast address extension and forwards the mobile IP registration reply. The BSR MUST joint the diffusion group which address is given in the multicast extension. The BSR communicates to the surrounding BSRs the information related to the mobile node to which access has just been granted. This message includes link layer information such as ISMI or MAC address and the multicast address used to tunnel the packet of the mobile node.

If the mobile node moves under the coverage area of a new base station, this base station informs the BSR of the newly arrived mobile node by sending link layer information of the mobile node. If the BSR has a cache entry for the mobile node, it updates the cache. If the BSR does not have a cache entry for the mobile node but has an entry in its probable cache, the BSR send a joint message toward the MAR. It then can receive and de-tunnel the packets send to the mobile node.

The following sections present in detail the proposed protocol.

New Mobile IP Extensions

This section identifies the new extensions to Mobile IP necessary to implement the proposed protocol within the context of the present invention.

Mobile Node Advertisement (0900)

Figure 9:
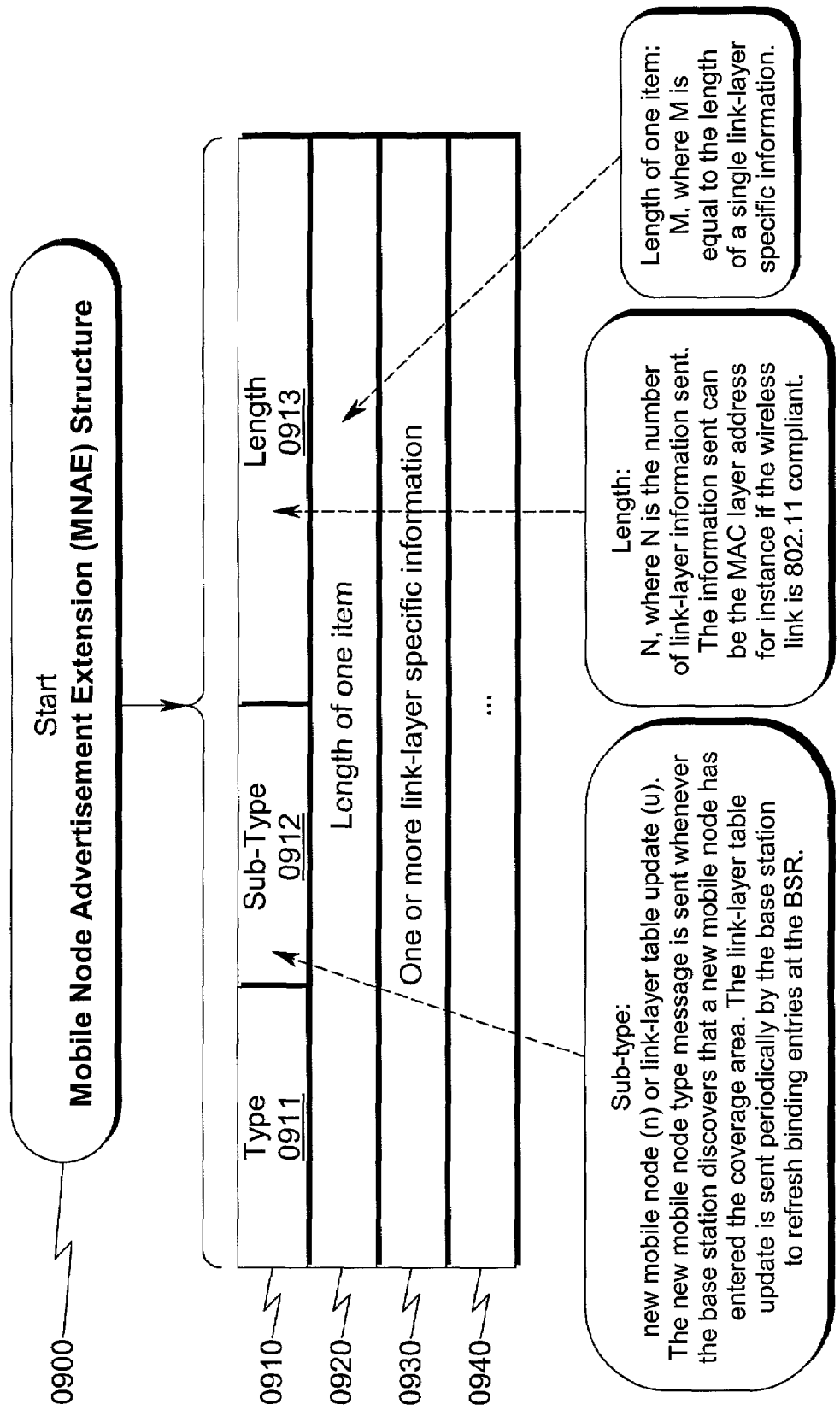
FIGS. 9-12 illustrate exemplary data structures used within some preferred embodiments of the present invention.

The mobile node advertisement protocol structure extension is illustrated in FIG. 9 (0900) and typically comprises the following fields:

Type (0911): a type identification field.

Sub-type (0912): new mobile node (n) or link-layer table update (u). The new mobile node type message is sent whenever the base station discovers that a new mobile node has entered the coverage area. The link-layer table update is sent periodically by the base station to refresh binding entries at the BSR.

Length (0913): N, where N is the number of link-layer information sent. The information sent can be the MAC layer address for instance if the wireless link is 802.11 compliant.

Length of one item (0920): M, where M is equal to the length of a single link-layer specific information.

BSR Extension (1000)

Figure 10:
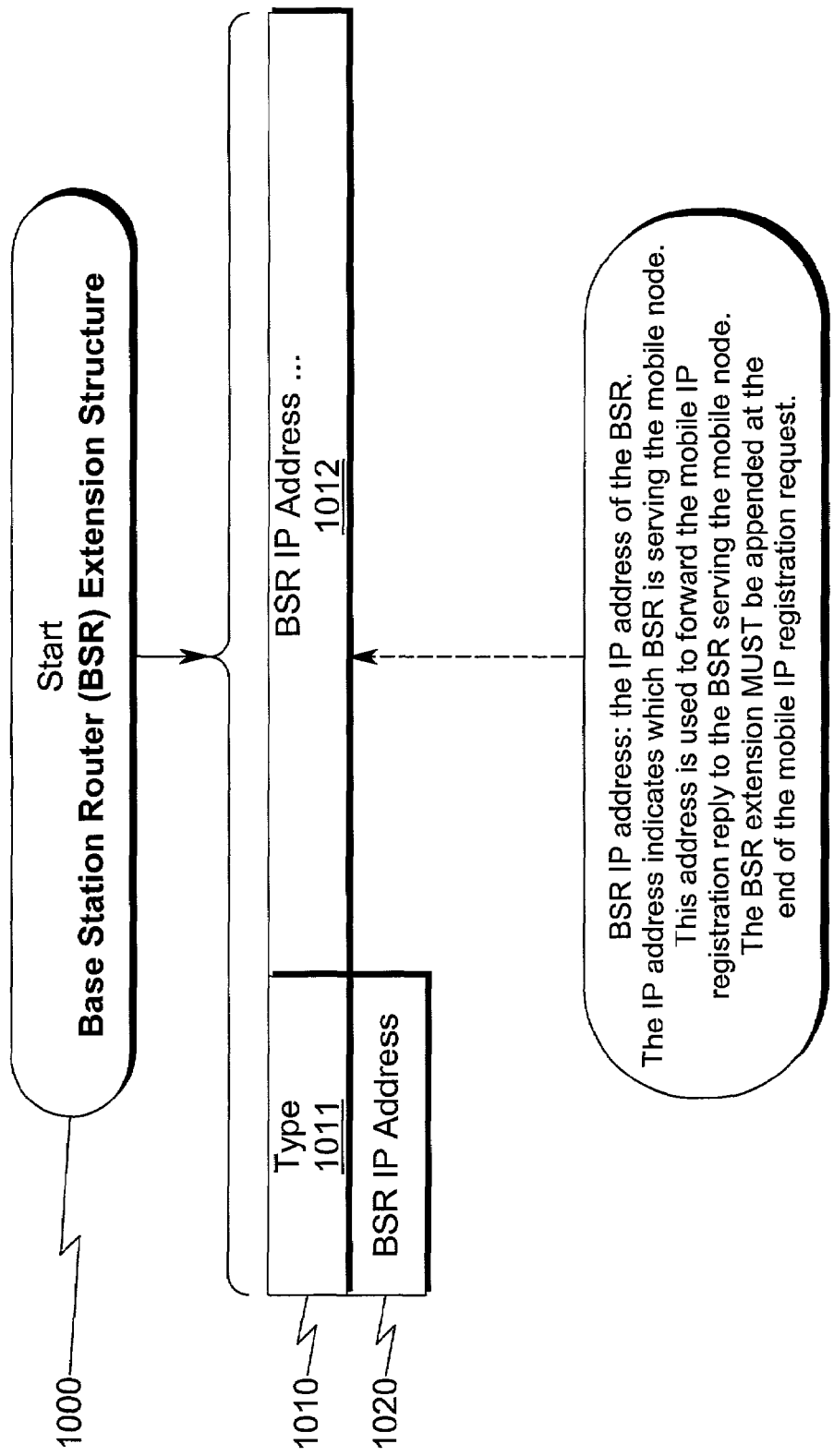

The BSR Extension protocol structure extension is illustrated in FIG. 10 (1000) and typically comprises the following fields:

Type (1011): a type identification field.

BSR IP address (1012, 1020): the IP address of the BSR. The IP address indicates which BSR is serving the mobile node. This address is used to forward the mobile IP registration reply to the BSR serving the mobile node. The BSR extension MUST be appended at the end of the mobile IP registration request.

Multicast Address Extension (1100)

Figure 11:
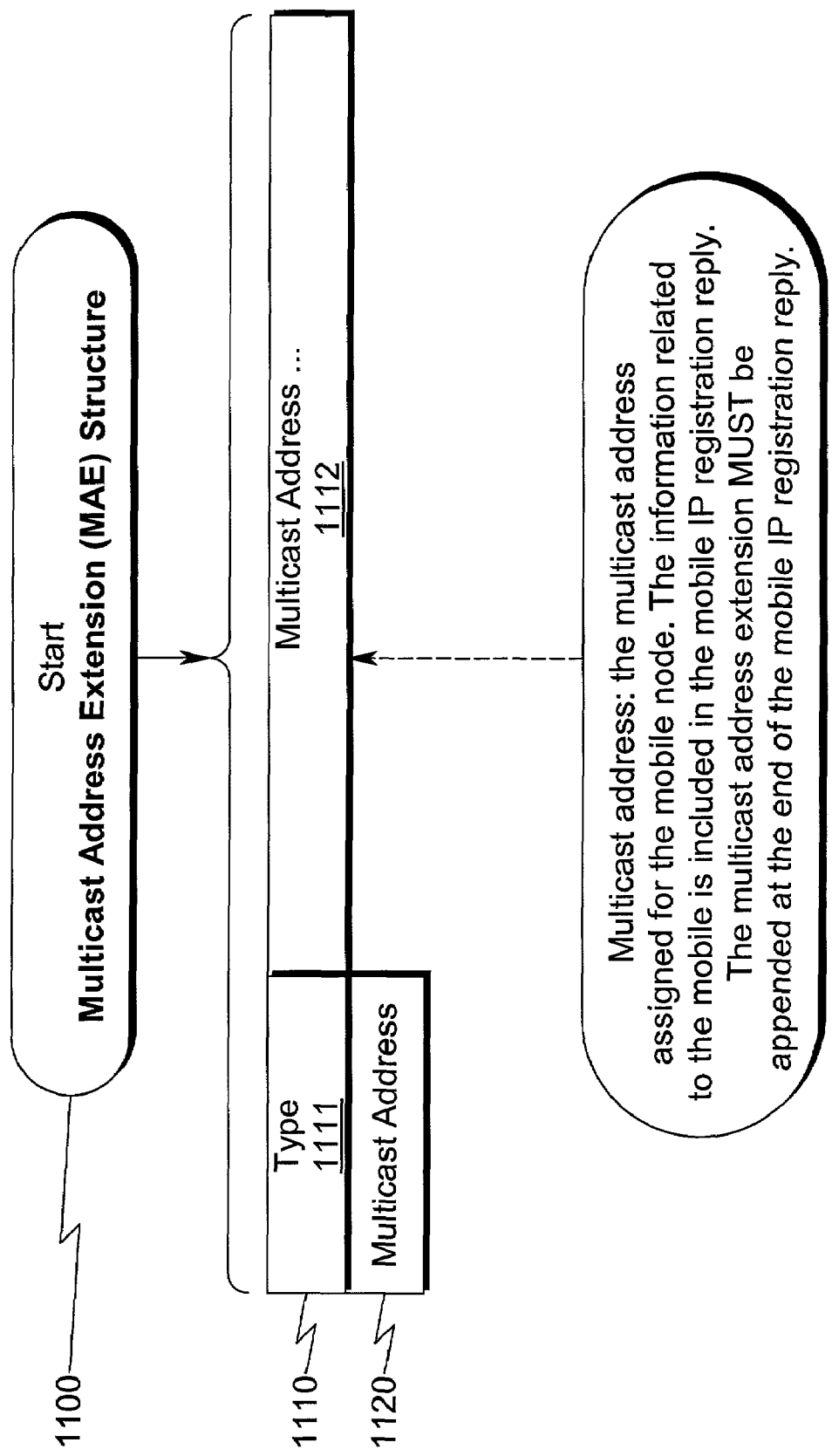

The Multicast Address protocol structure extension is illustrated in FIG. 11 (1100) and typically comprises the following fields:

Type (1111): a type identification field.

Multicast address (1112, 1120): the multicast address assigned for the mobile node. The information related to the mobile is included in the mobile IP registration reply. The multicast address extension MUST be appended at the end of the mobile IP registration reply.

Neighbor Update Extension (1200)

Figure 12:
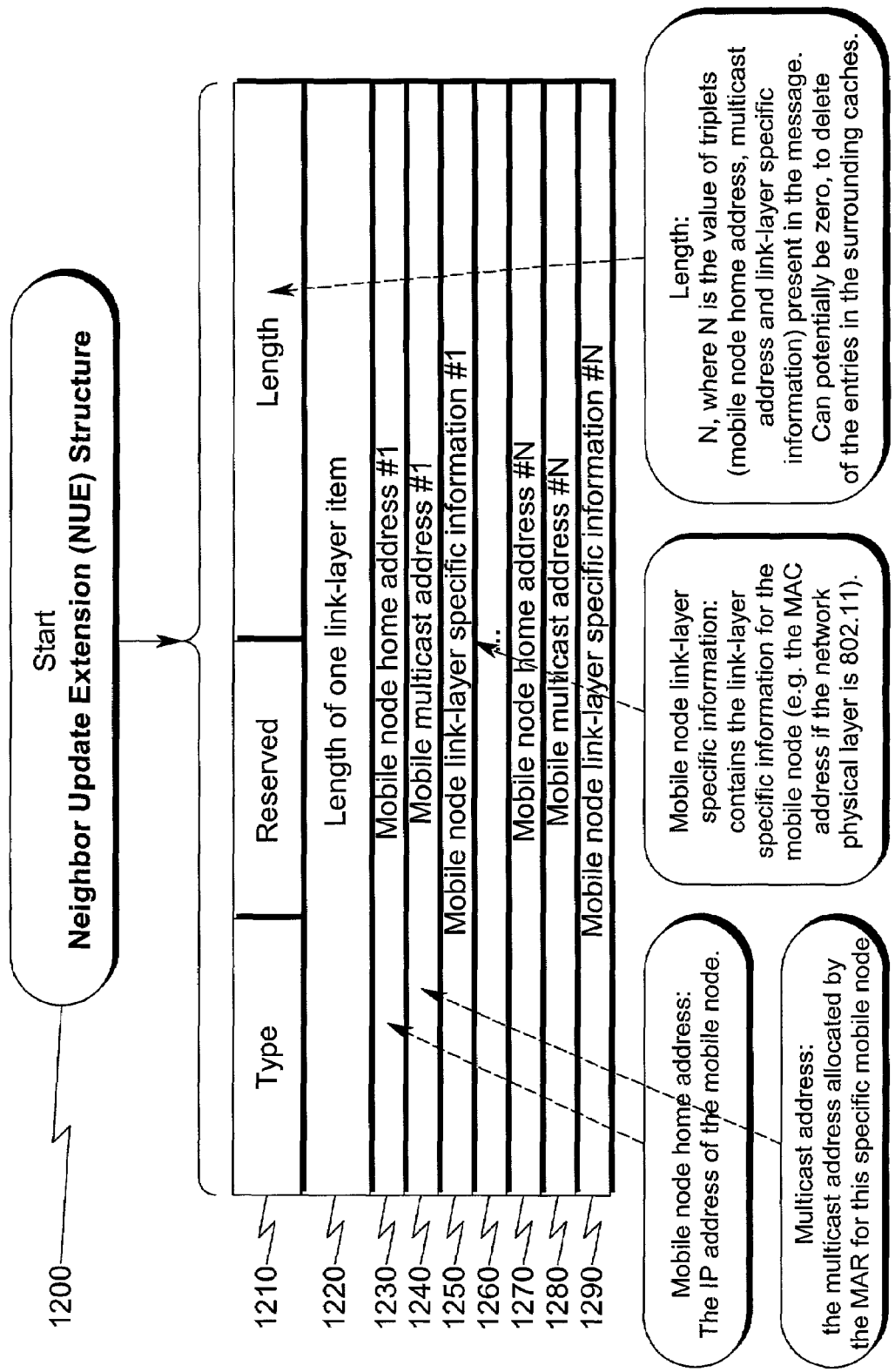

The Multicast Address protocol structure extension is illustrated in FIG. 12 (1200) and typically comprises the following fields:

Type (1211): a type identification field.

Length (1213): N, where N is the value of triplets (mobile node home address, multicast address and link-layer specific information) present in the message. Can potentially be zero, to delete of the entries in the surrounding caches.

Mobile node home address (1230, 1270): The IP address of the mobile node.

Multicast address (1240, 1280): the multicast address allocated by the MAR for this specific mobile node Mobile node link-layer specific information (1250, 1290): contains the link-layer specific information for the mobile node (e.g., the MAC address if the network physical layer is 802.11).

Protocol Overview (1300-1600)

This section describes the behavior of the different mobile nodes in two situations:
1. The first scenario describes the protocol when the mobile node enters the foreign domain and moves within its coverage area.
2. The second scenario describes the evolution of the mobile node while it moves within the coverage area of the home network.

Figure 13:
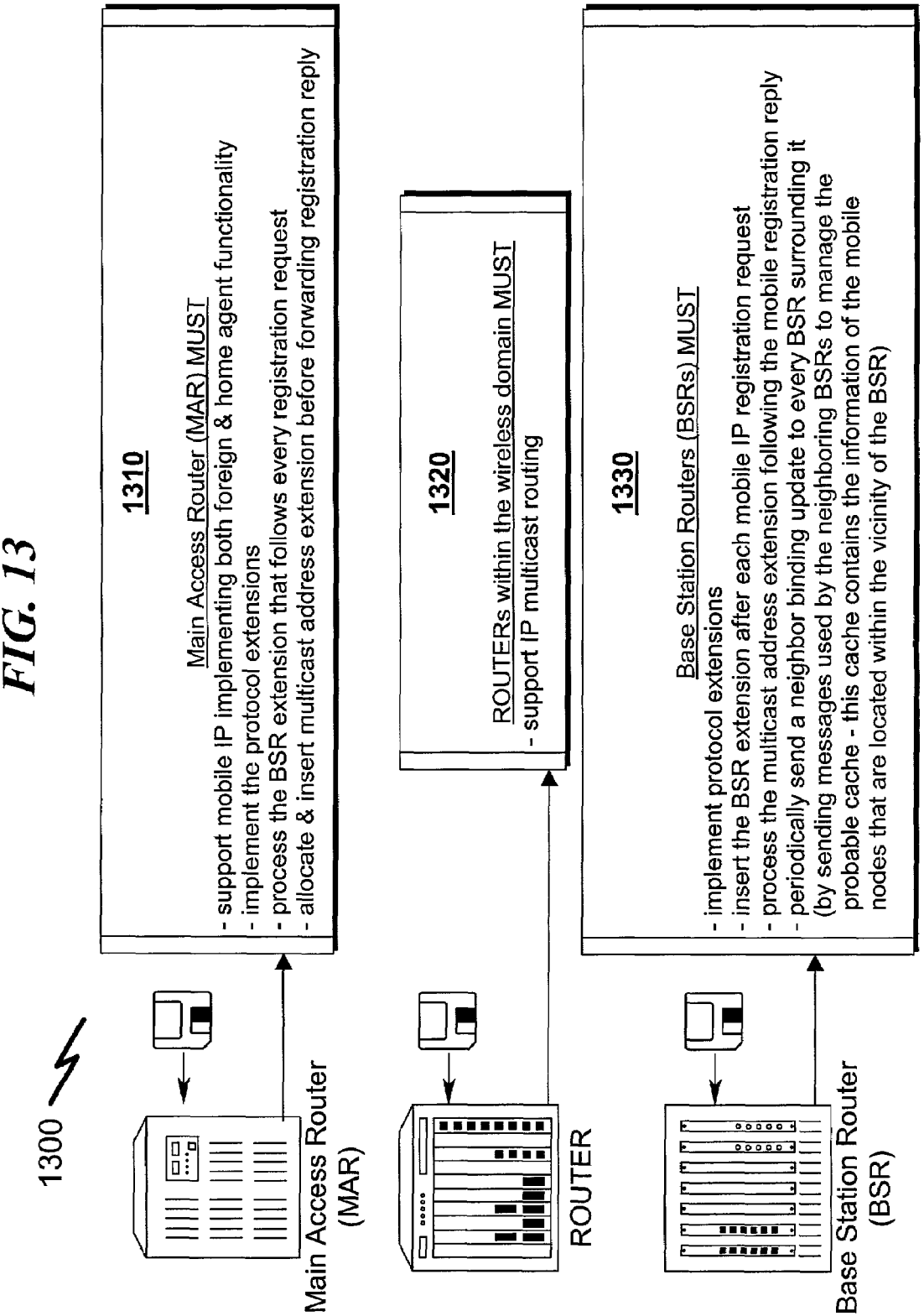
FIGS. 13-14 illustrate exemplary system components and networking topologies used within some preferred embodiments of the present invention.
Figure 14:
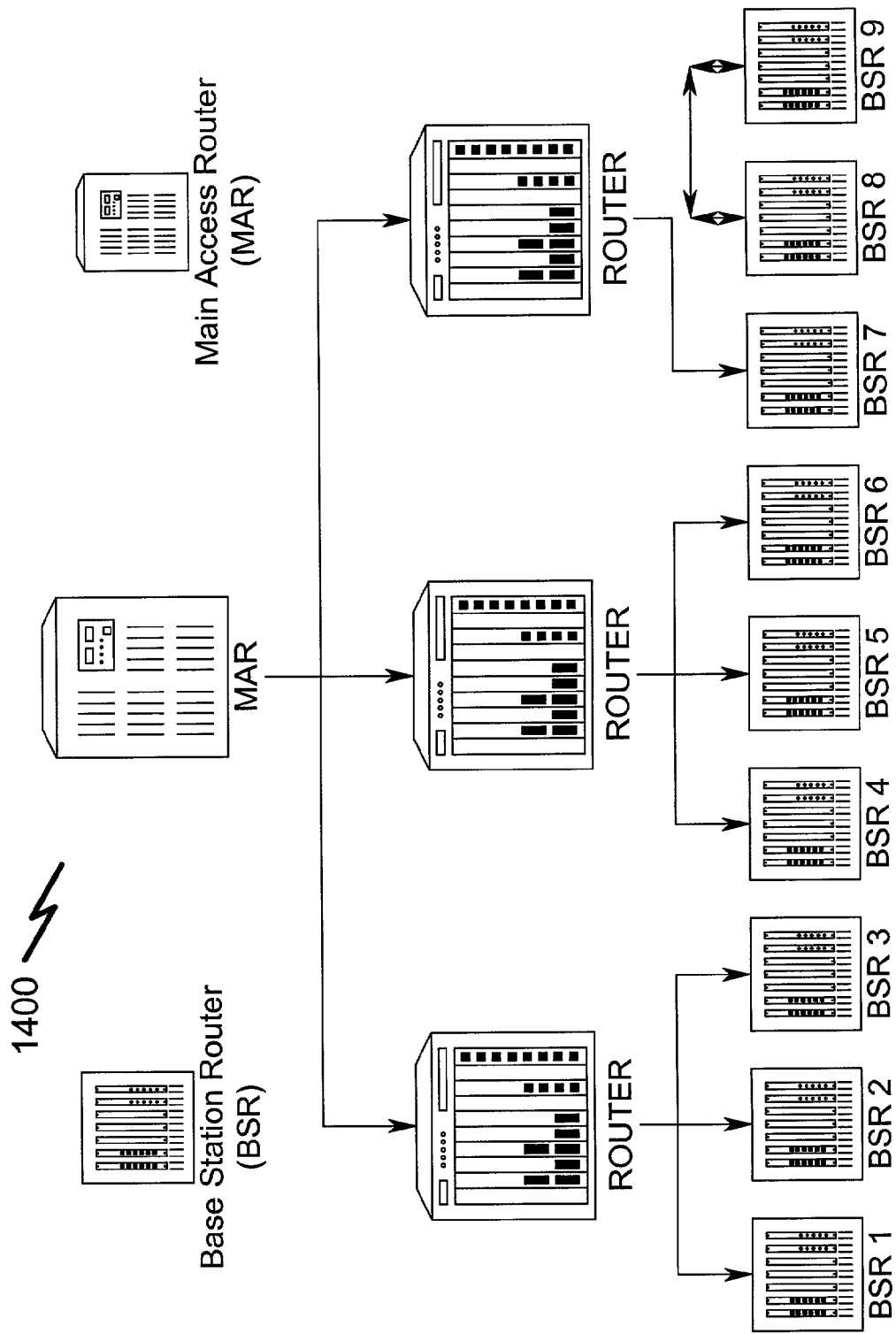

In both cases the discussion is based on the network elements illustrated in FIG. 13 (1310, 1320, 1330) and the topology illustrated in FIG. 14 (1400).

Network Element Components (1300)

Within the context of the network elements used in this discussion as illustrated in FIG. 13 (1300), the following restrictions apply:

The Main Access Router (MAR) (1310) MUST support mobile IP implementing both foreign and home agent functionality. The MAR MUST also implement part of the protocol extensions described in this document. The MAR MUST process the BSR extension that follows every registration request. The MAR MUST allocate and insert the multicast address extension before forwarding the registration reply.

The Routers (1320) within the wireless domain MUST support IP multicast routing.

The Base Station Routers (1330) MUST implement the extensions described in this document. The BSR MUST insert the BSR extension after each mobile IP registration request. The BSR MUST process the multicast address extension following the mobile registration reply. The BSR MUST periodically send a neighbor binding update to every BSR surrounding it. This message is used by the neighboring BSRs to manage the probable cache. This cache contains the information of the mobile nodes that are located within the vicinity of the BSR.

As mentioned earlier, the topology is well known, and each base station router knows the IP address of other base station routers that are located in its neighborhood. For instance BSR 4 knows that the IP addresses of BSR 3 and BSR 5 as these BSRs are its neighbors. Each base station router knows the IP address of the Main Access Router.

Protocol Extension Messages (1500)

Figure 15:
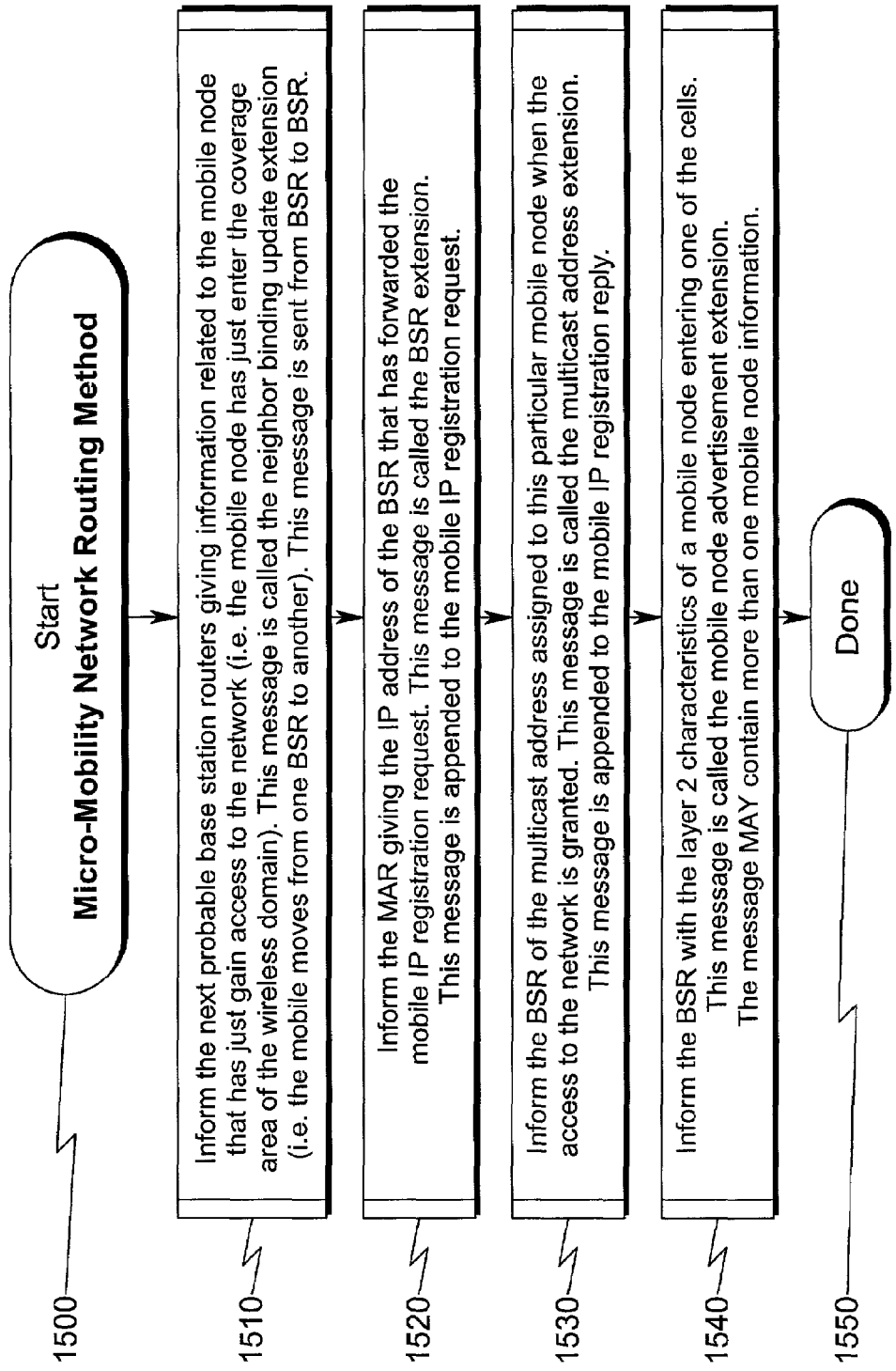
FIG. 15 illustrates the fundamental method used in some preferred embodiments of the present invention.

As illustrated in FIG. 15 (1500), the present invention protocol extends the current Mobile IP protocol with a set of messages designed to:

Inform the next probable base station routers giving information related to the mobile node that has just gain access to the network (i.e., the mobile node has just enter the coverage area of the wireless domain). This message is called the neighbor binding update extension (i.e., the mobile moves from one BSR to another). This message is sent from BSR to BSR. (1510)

Inform the MAR giving the IP address of the BSR that has forwarded the mobile IP registration request. This message is called the BSR extension. This message is appended to the mobile IP registration request. (1520)

Inform the BSR of the multicast address assigned to this particular mobile node when the access to the network is granted. This message is called the multicast address extension. This message is appended to the mobile IP registration reply. (1530)

Inform the BSR with the layer 2 characteristics of a mobile node entering one of the cells. This message is called the mobile node advertisement extension. The message MAY contain more than one mobile node information. (1540)

These extended protocol messages are utilized within the context of two mobility scenarios described below and illustrated in FIG. 16 (1600).

Generalized Mobility Scenarios (1600)

Figure 16:
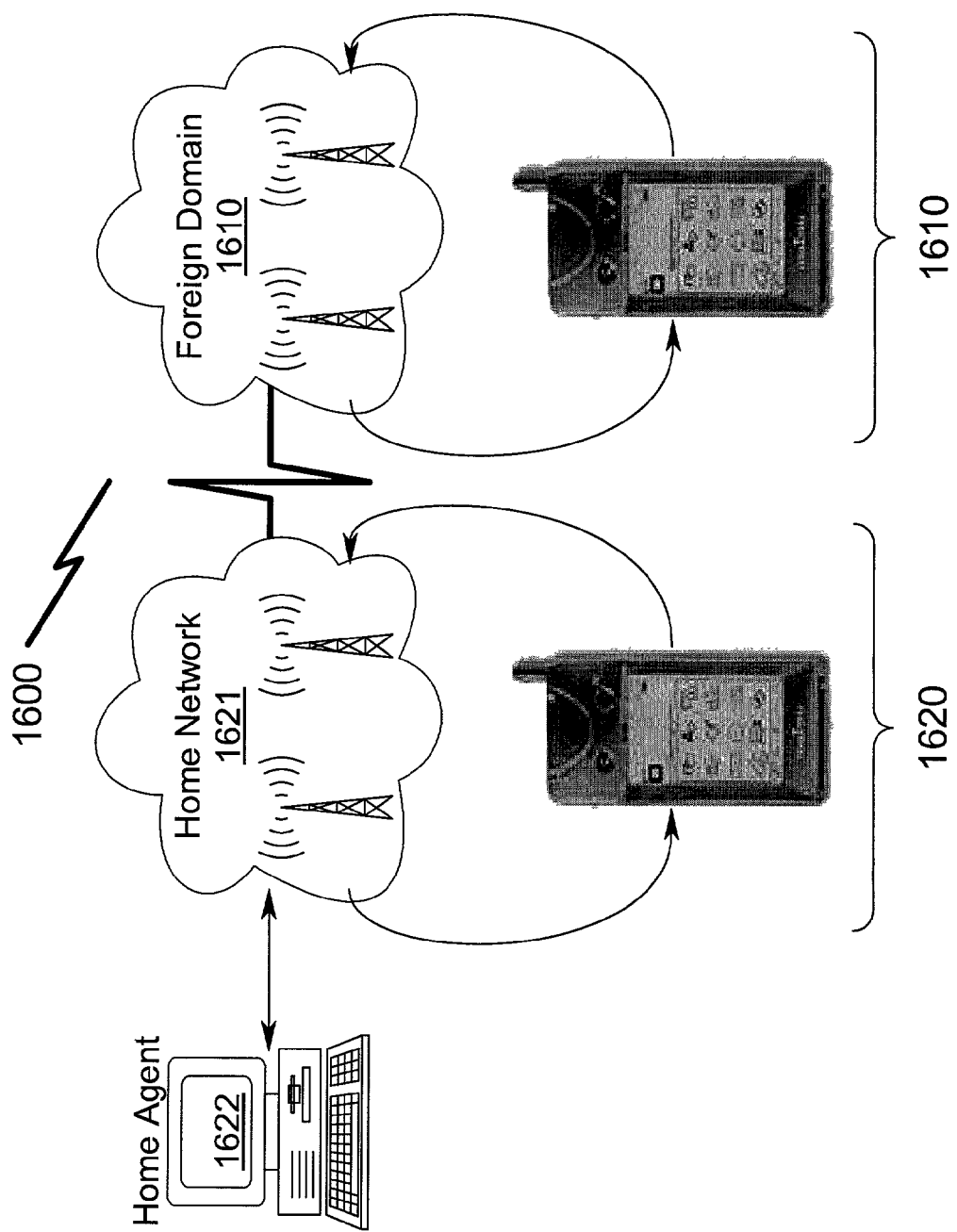
FIG. 16 illustrates the fundamental network topology scenarios used in some preferred embodiments of the present invention.
Figure 17:
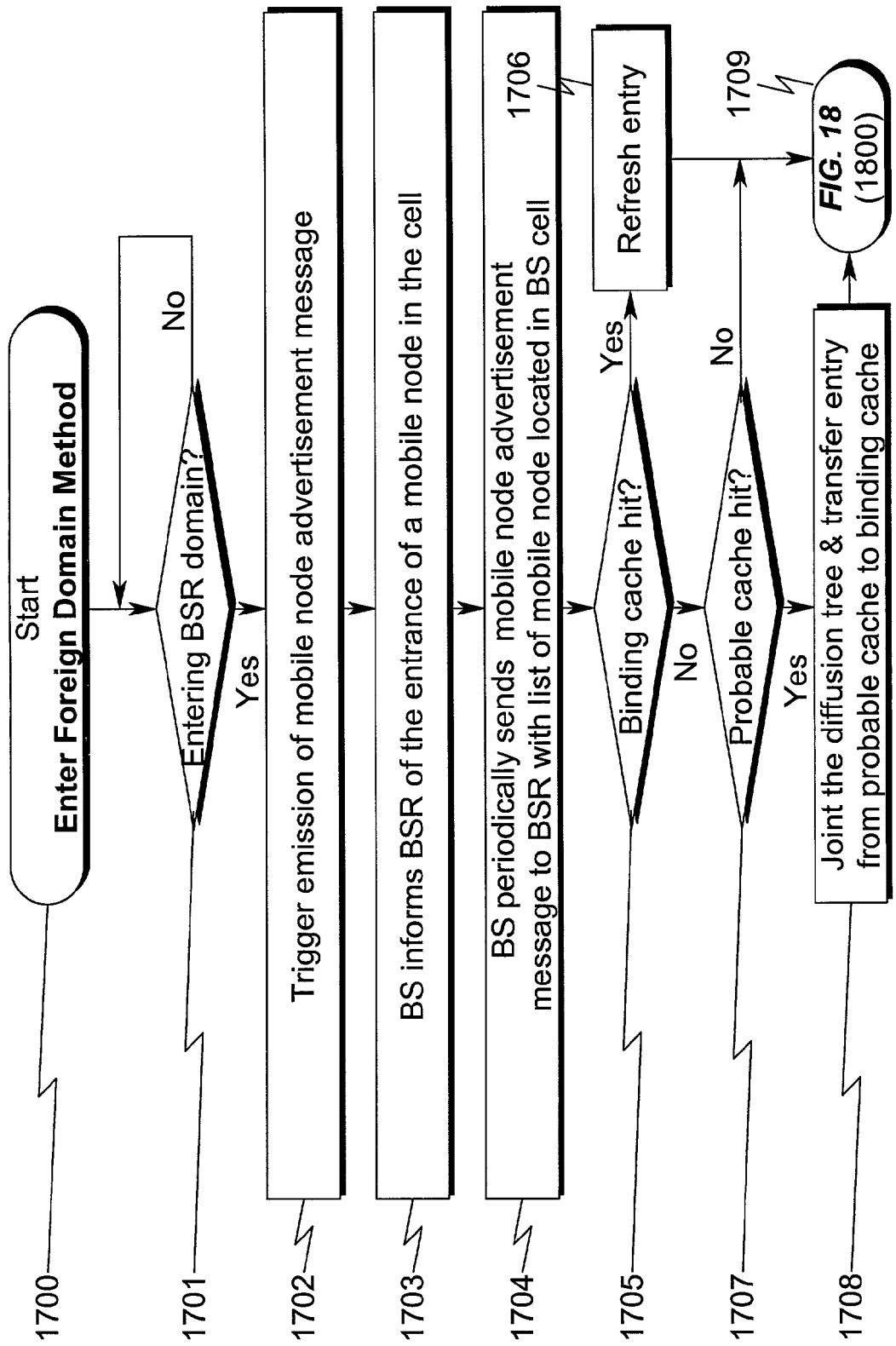
FIGS. 17-36 illustrate exemplary system process flowcharts used within some preferred embodiments of the present invention.
Figure 18:
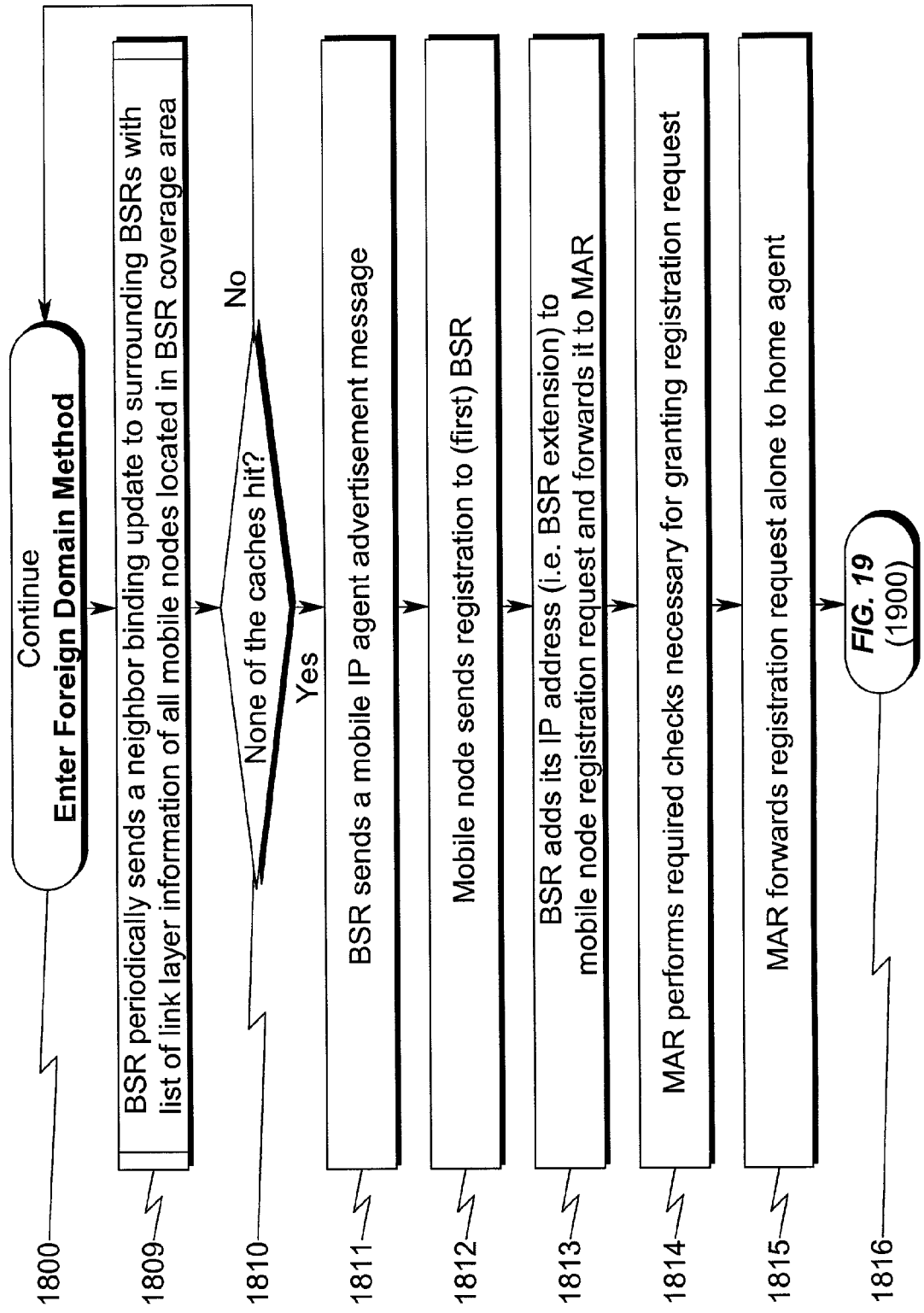
Figure 19:
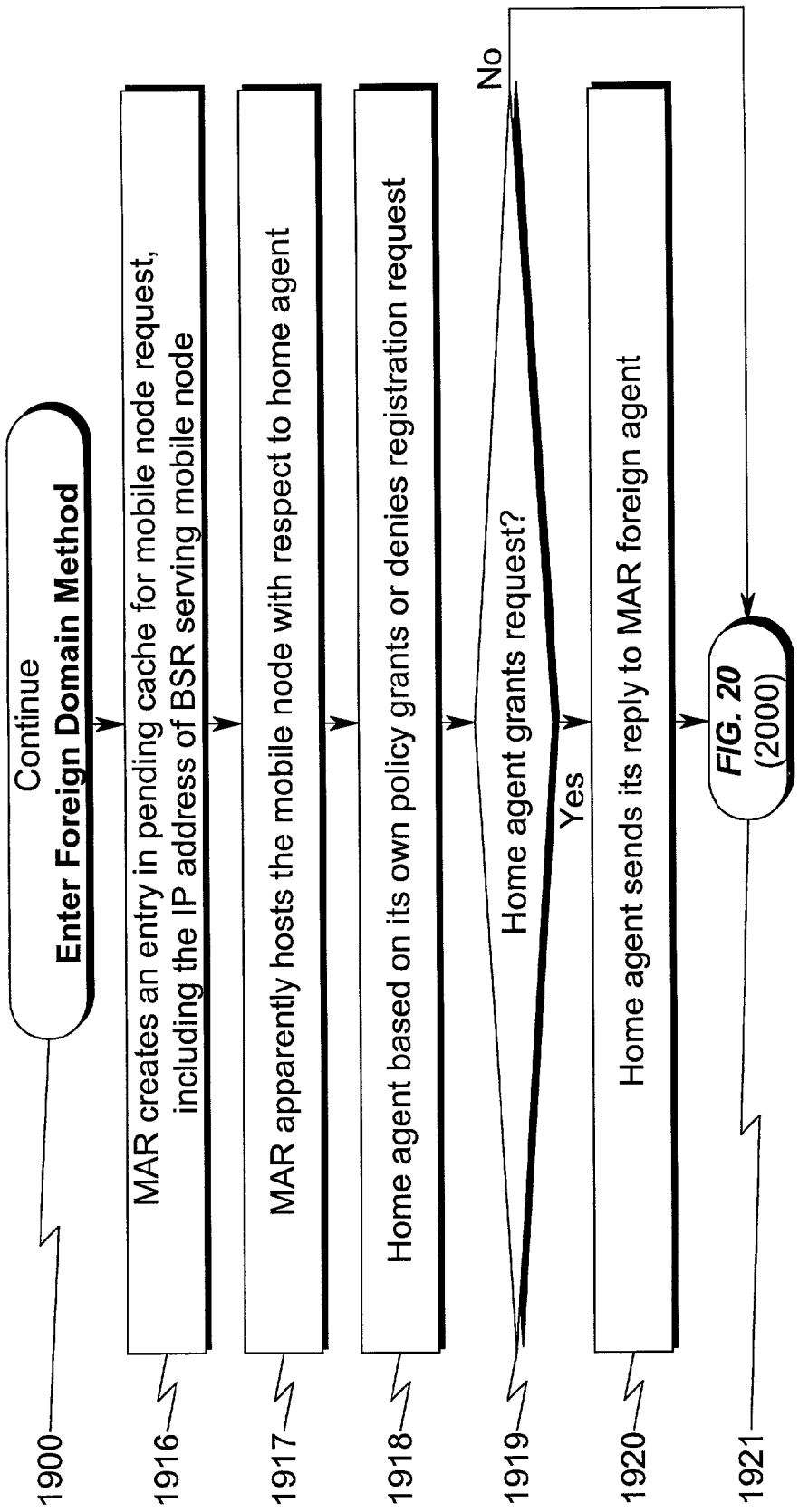
Figure 20:
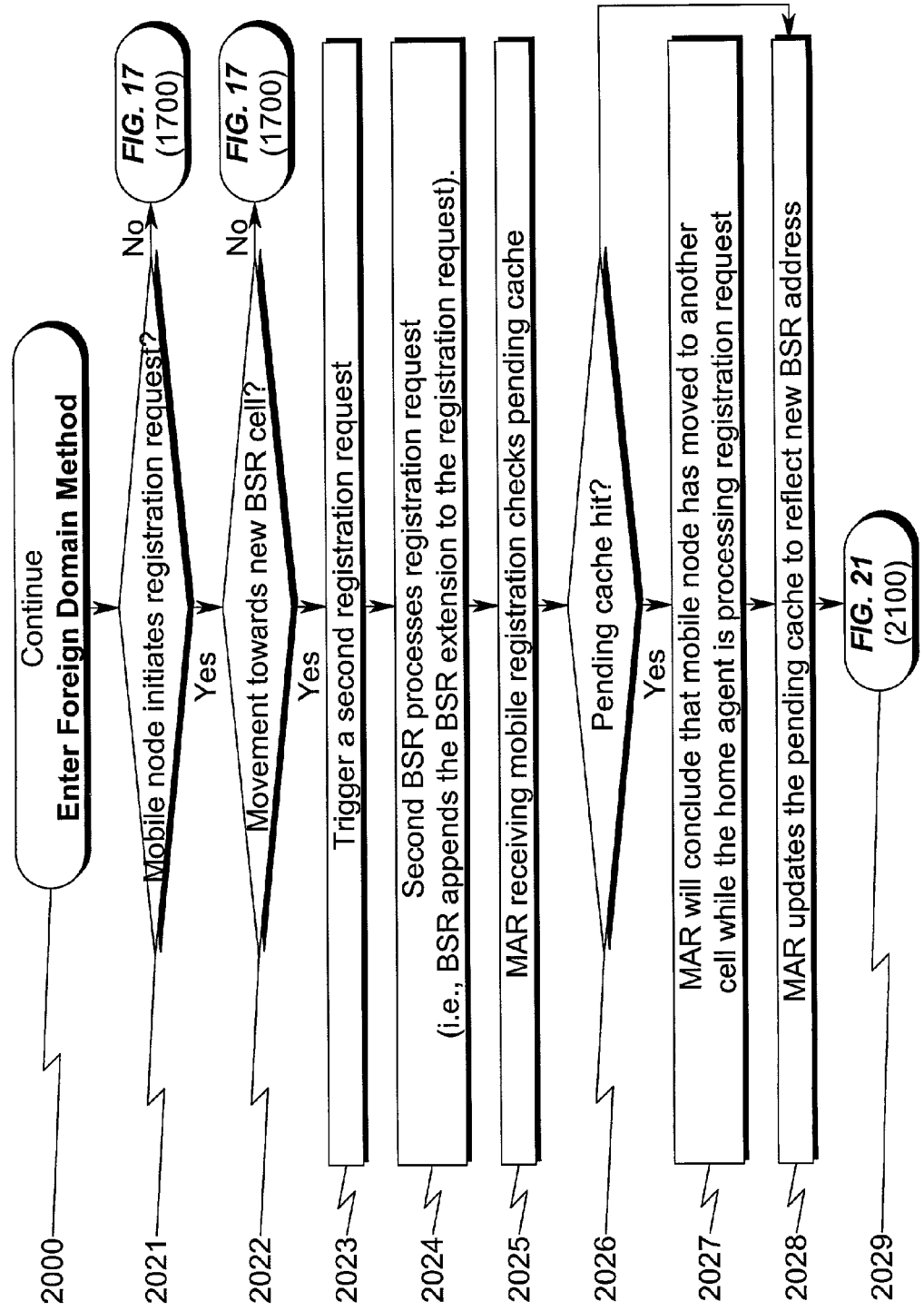
Figure 21:
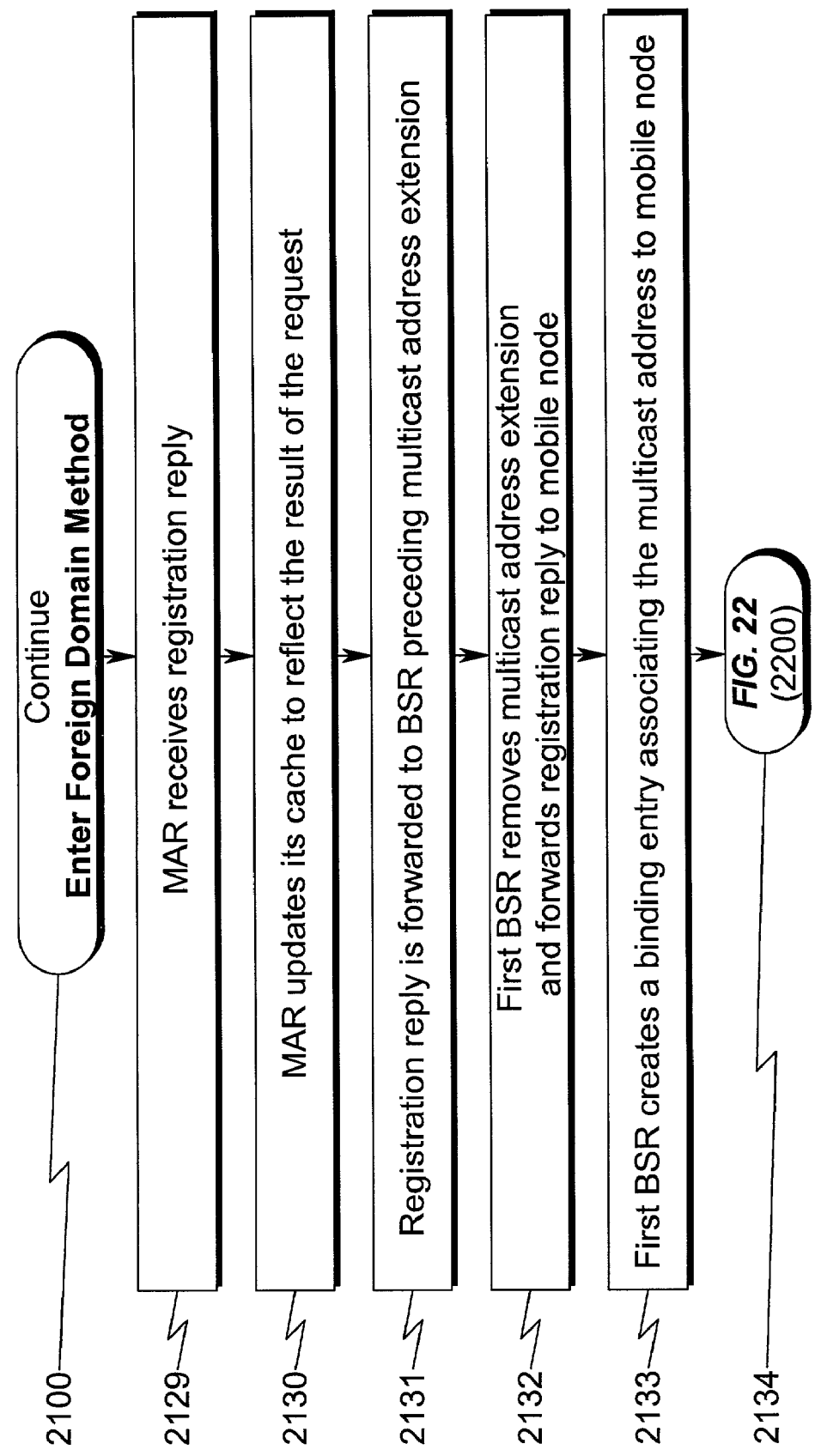
Figure 22:
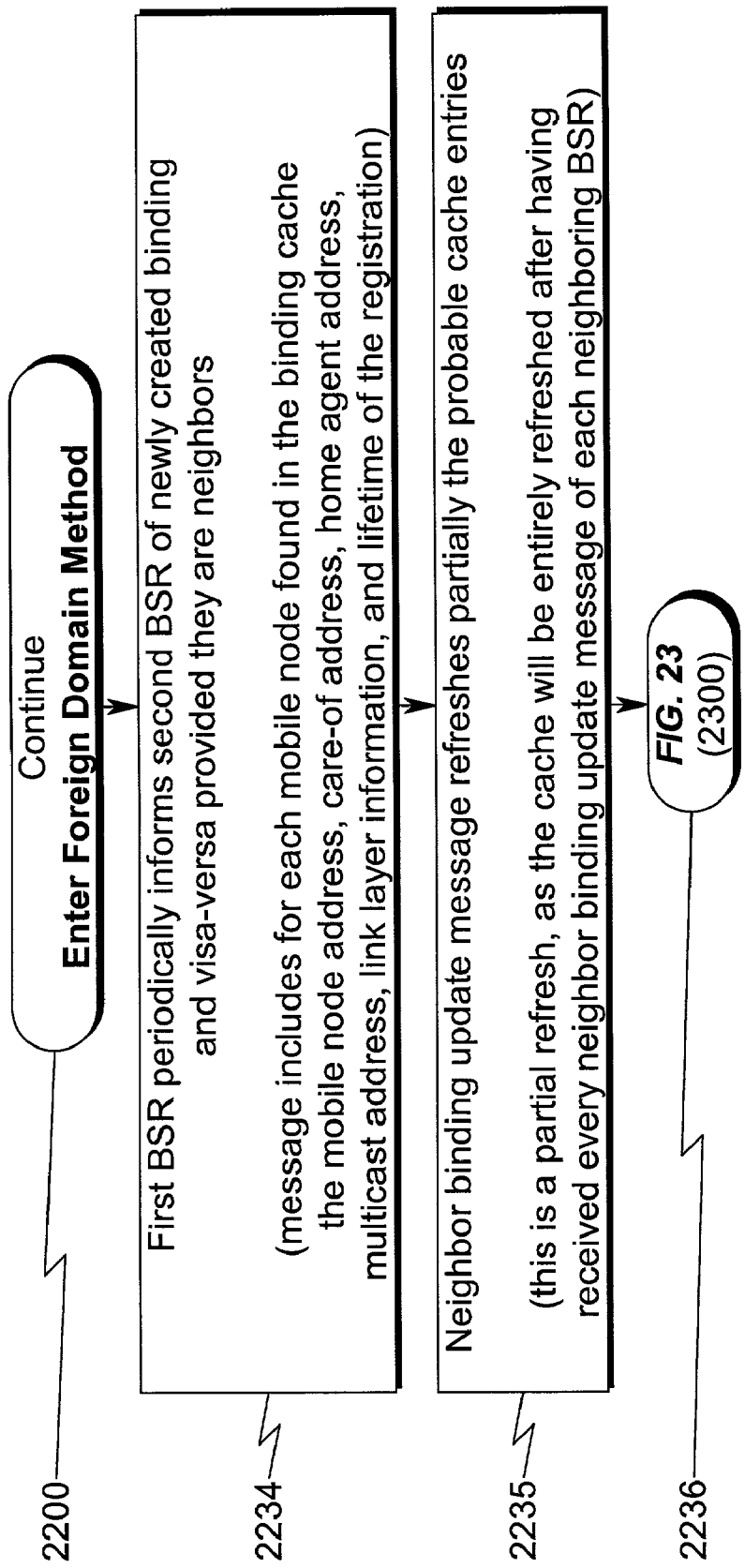
Figure 23:
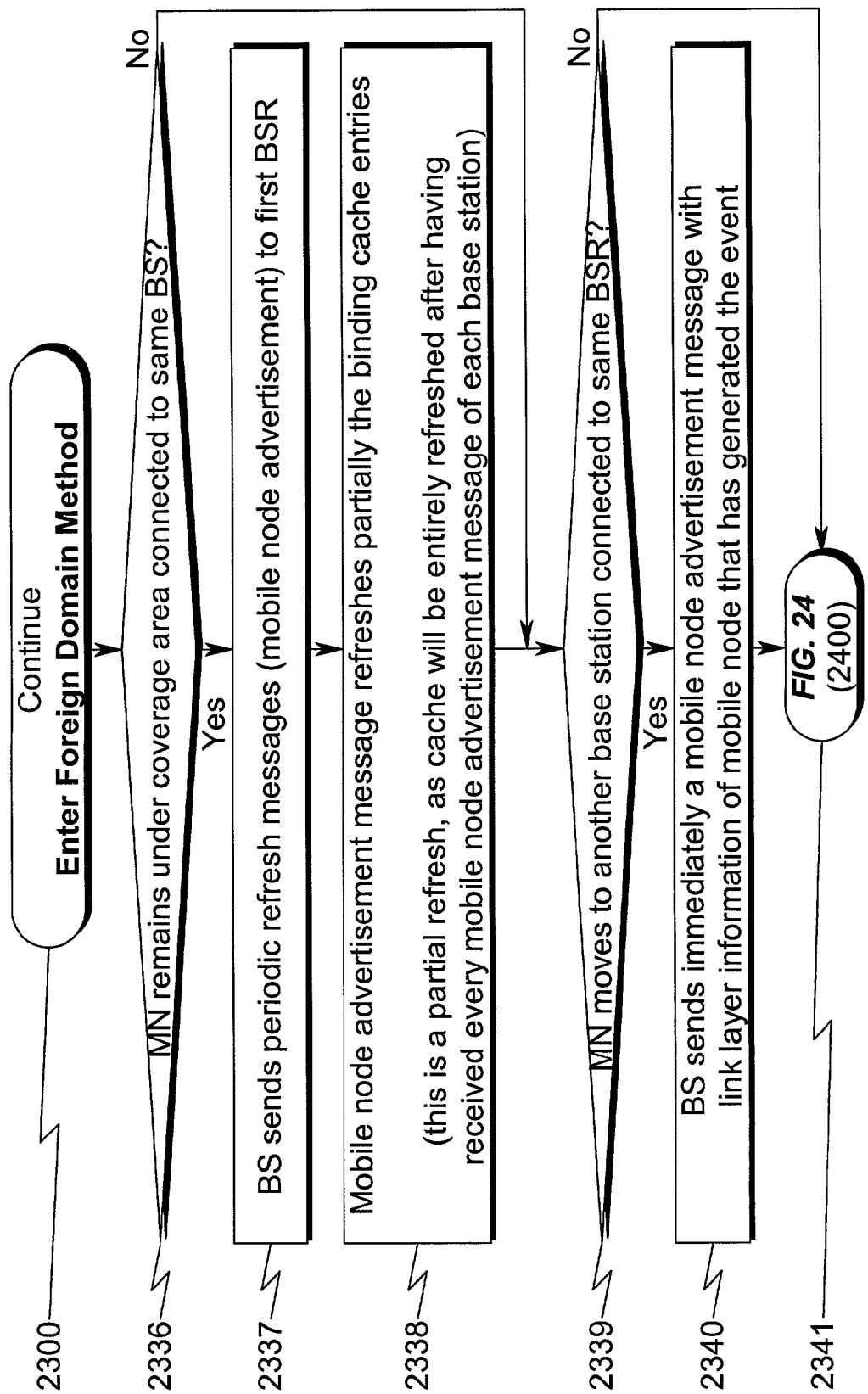
Figure 24:
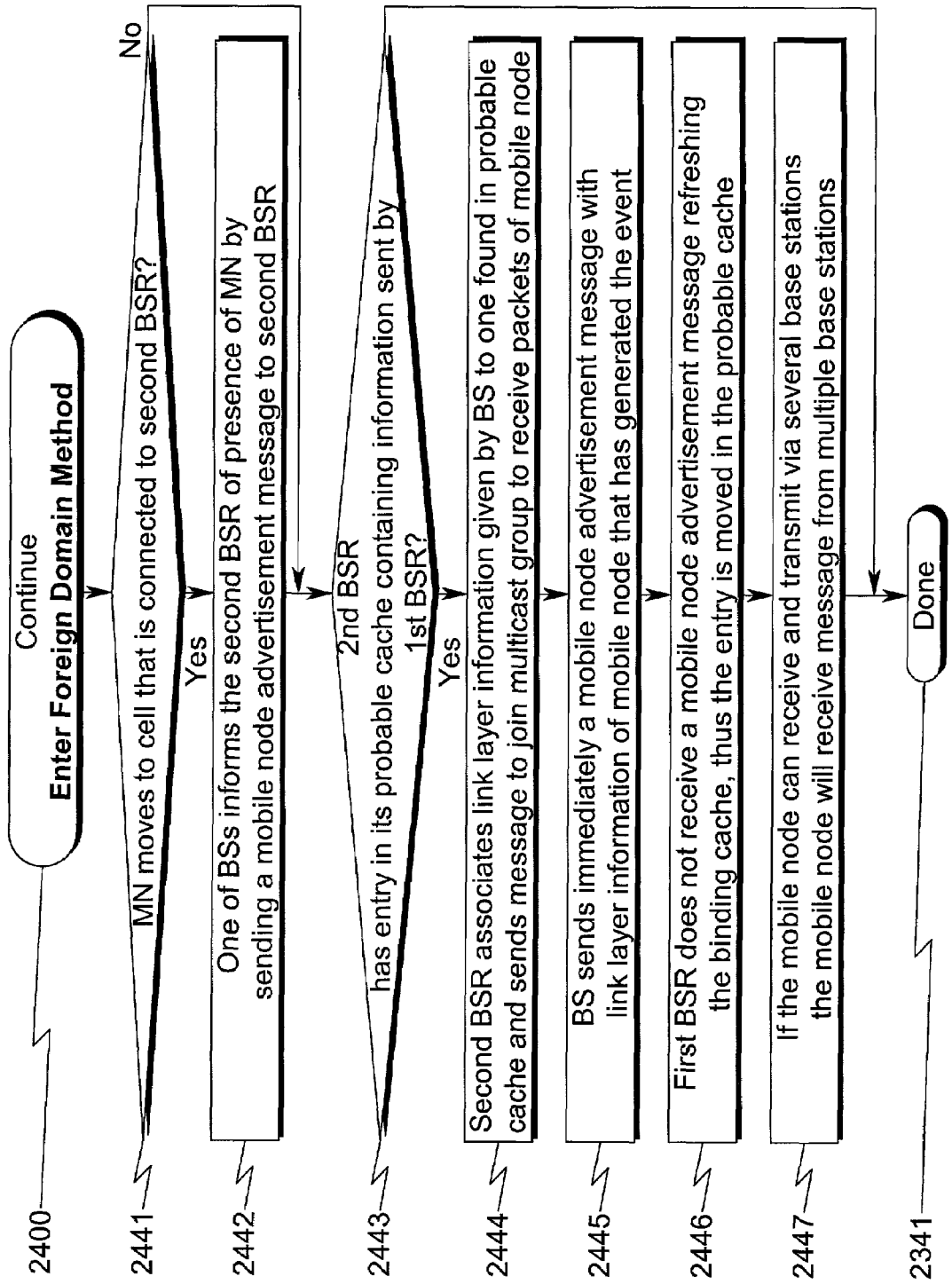
Figure 25:
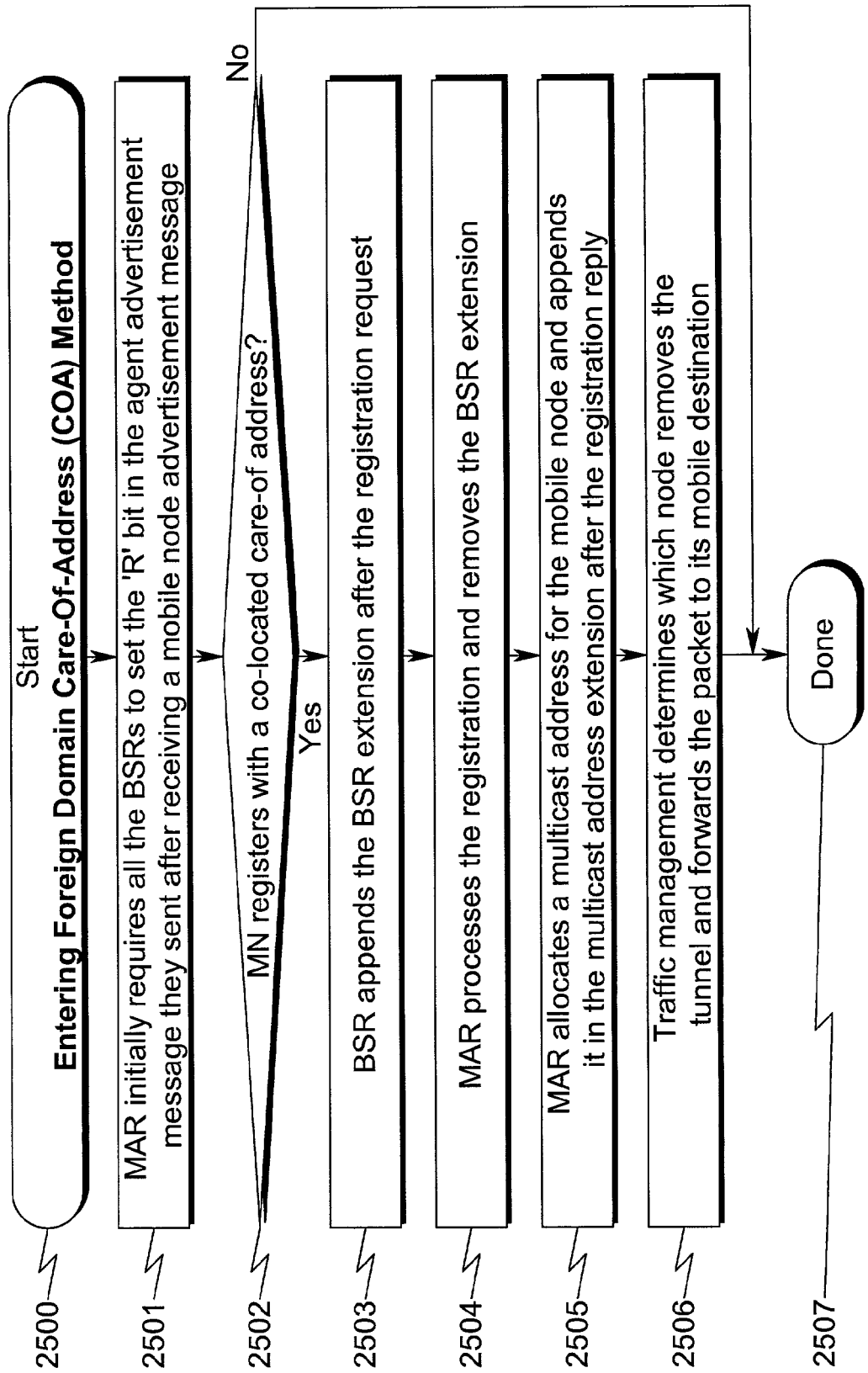

The present invention implements a generalized mobility protocol and messaging system within the context of the generalized mobility scenarios illustrated in FIG. 16 (1600). The following discussion describes the different phases, detailing how the extensions contribute in extending mobile IP to offer micro-mobility support.

The first scenario (1610) illustrated is when the mobile node is moving under the coverage area of a foreign domain (1611).

The second scenario (1620) is when the mobile node moves within its home domain (1621). In this scenario the following discussion describes how the mobile manages to return to its home agent (1622). This protocol takes the assumption that a single operator manages the foreign network, but the present invention is not limited to this assumption.

Entering the Foreign Domain (1700-3200)

Referencing the first mobility scenario illustrated in FIG. 16 (1610), the generalized protocol associated with entering the Foreign Domain is illustrated in FIGS. 17-24 (1700, 1800, 1900, 2000, 2100, 2200, 2300, 2400) and will now be discussed in detail.

When the mobile node enters the coverage area of the base station router 1 (first BSR, or any other router in this domain) (1701), the link layer protocol at the base station triggers the emission of the mobile node advertisement message (1702). The BS informs the BSR of the entrance of a mobile node in the cell (1703). The base station MUST periodically send the mobile node advertisement message to the BSR with the list of mobile node located in the base station cell (1704).

The BSR will base its decision on the presence of the link layer of the mobile node in its caches. If the binding cache is hit (1705), the BSR MUST refresh the entry (1706). If the probable cache is hit (1707), the BSR MUST joint the diffusion tree and transfer the entry from the probable cache to the binding cache (1708).

The BSR MUST periodically send a neighbor binding update to the surrounding BSRs with the list of link layer information of all the mobile nodes located in the BSR coverage area (1809).

If none of the caches are hit (1810), the BSR MUST send a mobile IP agent advertisement message (1811).

The mobile node sends the registration to the base station router (BSR) (1812). The BSR (which can be for instance the first BSR) MUST add its IP address (i.e., BSR extension) to the mobile node registration request and forwards it to the MAR (1813). The MAR after having performed all the required checks necessary for granting the registration request (AAA protocol, challenge/response, and key exchange, NAI, etc.) (1814) forwards the registration request alone to the home agent (1815).

The MAR creates an entry in the pending cache for the mobile node request, including the IP address of the BSR serving the mobile node (1916). For the home agent, the MAR apparently hosts the mobile node (1917). The home agent based on its own policy grants or denies the registration request (1918). Considering that the home agent grants the request (1919), it sends its reply to the foreign agent (i.e., the MAR) (1920).

If the mobile node initiates the first registration request (2021) and moves towards a new cell connected to a new BSR (2022), the mechanism previously described will trigger a second registration request (2023). The new BSR processes the registration request as described in the previous paragraph (i.e., the BSR appends the BSR extension to the registration request) (2024). The MAR receiving the mobile registration MUST check the pending cache (2025). If the cache is hit (2026), the MAR will conclude that the mobile node has moved to another cell while the home agent is processing the registration request (2027). The MAR MUST update the pending cache to reflect the new BSR address (2028).

When the MAR receives the registration reply (2129) it updates its cache to reflect the result of the request (e.g., remove the entry in the pending cache and creates one entry in the binding cache) and assign a multicast address (2130). The registration reply is forwarded to the base station router preceding the multicast address extension (2131). The first BSR removes the multicast address extension and forwards the registration reply to the mobile node (2132). It also creates a binding entry associating the multicast address to the mobile node (2133).

The first BSR periodically informs the second BSR of the newly created binding (2234). The message includes for each mobile node found in the binding cache the mobile node address, the care-of address, the home agent address, the multicast address, the link layer information and the lifetime of the registration. The neighbor binding update message refreshes partially the probable cache entries (2235). This is a partial refresh, as the cache will be entirely refreshed after having received every neighbor binding update message of each neighboring BSR.

If the mobile node remains under the coverage area connected to the same base station (2336), this base station MUST send periodically refresh message (mobile node advertisement) to the first BSR (periodicity needs to be defined based on application context) (2337). The mobile node advertisement message refreshes partially the binding cache entries (2338). This is a partial refresh, as the cache will be entirely refreshed after having received every mobile node advertisement message of each base station.

If the mobile node moves to another base station connected to the same BSR (2339), the base station MUST send immediately a mobile node advertisement message with the link layer information of the mobile node that has generated the event (2340).

If the mobile node moves to cell that is connected to the second BSR (2441), one of the BSs informs the second BSR of the presence of the mobile node by sending a mobile node advertisement message to the second BSR (2442). If the second BSR has an entry in its probable cache containing the information sent by the first BSR (2443), the second BSR associates the link layer information given by the BS to the one found in the probable cache and sends a message to join the multicast group to receive the packets of the mobile node (2444).

Meanwhile, the first BSR does not receive a mobile node advertisement message refreshing the binding cache, thus the entry is moved in the probable cache (2445). If the mobile node can receive and transmit via several base stations the mobile node will receive message from both several base stations (2446).

Table 1 depicts the binding cache entries at the MAR for the scenarios that have been used for experimentation of the MMM protocol. An entry for a MN is created in the binding cache only after having received a registration reply from the HA of the MN. MN1 is under the coverage of BSR1 and HA1 is the home agent of MN1. MN1 uses a care-of-address (either a co-located or the address of the MAR) that has been acquired from the visited domain.

TABLE 1

Binding Table Entries

| MN Home Address | Care of Address | BSR | Home Agent | Lifetime |
| --- | --- | --- | --- | --- |
| MN1 | CoA1 | BSR1 | HA1 | 10 |
| MN2 | CoA2 | BSR2 | HA2 | 5 |
| MN3 | COA3 | BSR3 | HA1 | 10 |
| MN4 | COA4 | BSR3 | HA3 | 10 |

Care-of Address (COA) (2500)

The proposed protocol does not make any special requirement on the type care-of address used by the mobile node. This address can either be a foreign agent care-of address or a co-located care-of address.

The MAR has initially required all the BSRs to set the 'R' bit in the agent advertisement message they send after receiving a mobile node advertisement message (2501). How the mobile node acquires the co-located care of address is out of the scope of the document but its implementation will be well known to one skilled in the art.

Beside this point, the principle remains identical. If the mobile node registers with a co-located care-of address (2502), the BSR appends the BSR extension after the registration request (2503). The MAR processes the registration and removes the BSR extension (2504). The MAR allocates a multicast address for the mobile node and appends it in the multicast address extension after the registration reply (2505). The only difference resides in the traffic management, i.e., which node removes the tunnel and forwards the packet to its mobile destination (2506). The next section describes how the traffic is managed when the mobile node uses a co-located care-of address.

Traffic Flow

Figure 7:
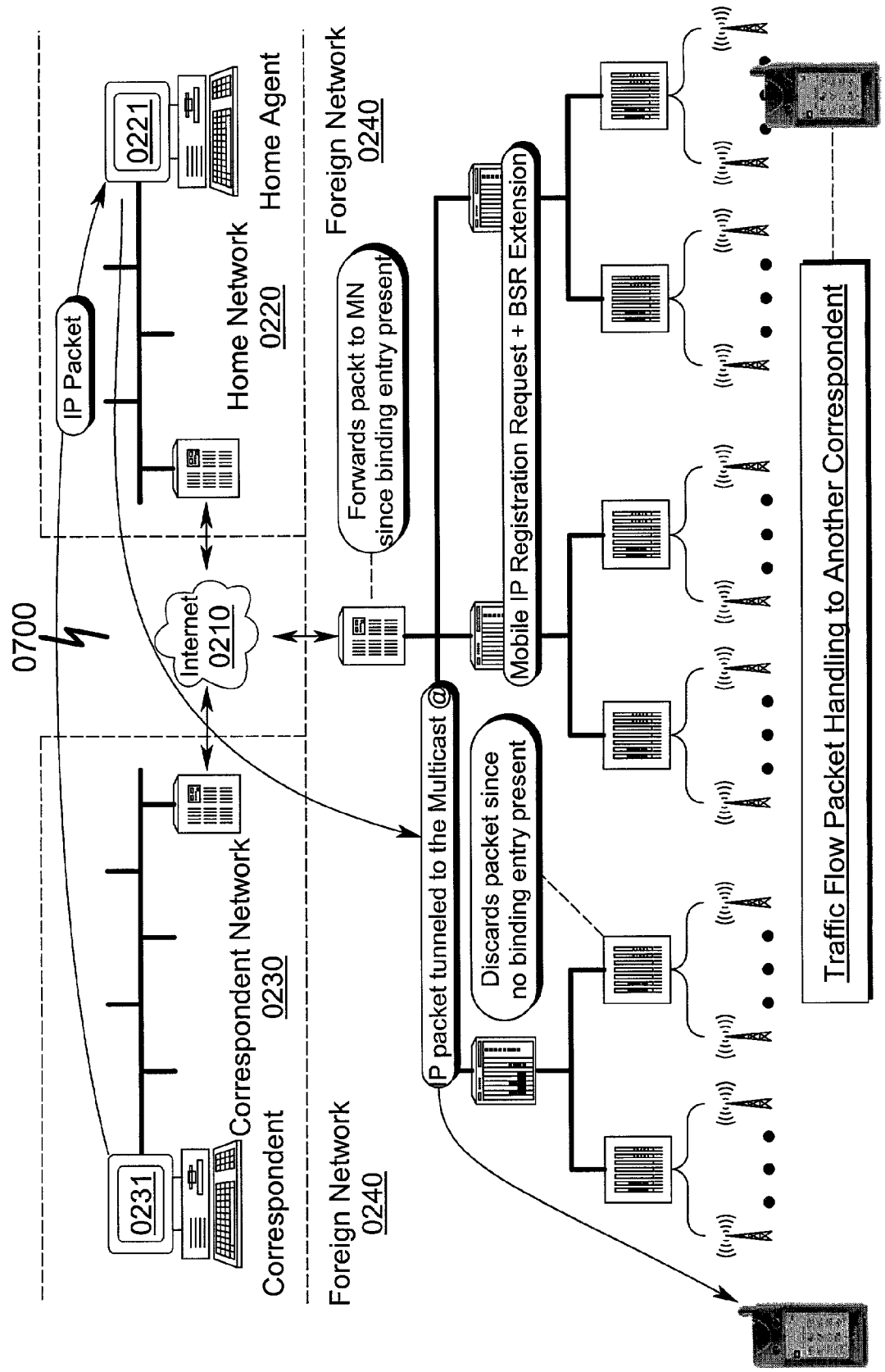

Generic traffic flow packet handling is illustrated in FIG. 7 (0700) and will now be described in detail.

Foreign Agent Care-of Address (2600, 2700)

Figure 26:
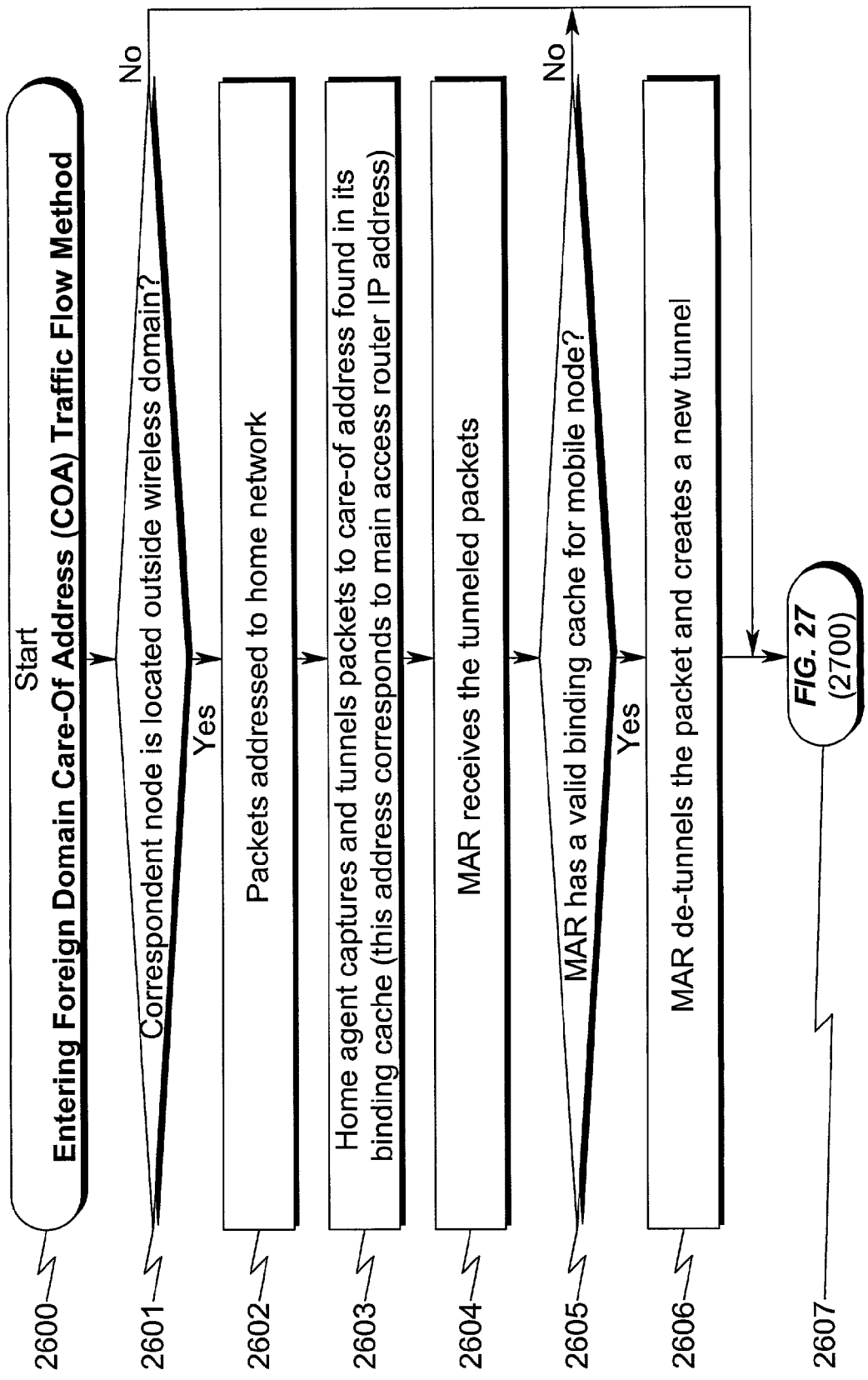
Figure 27:
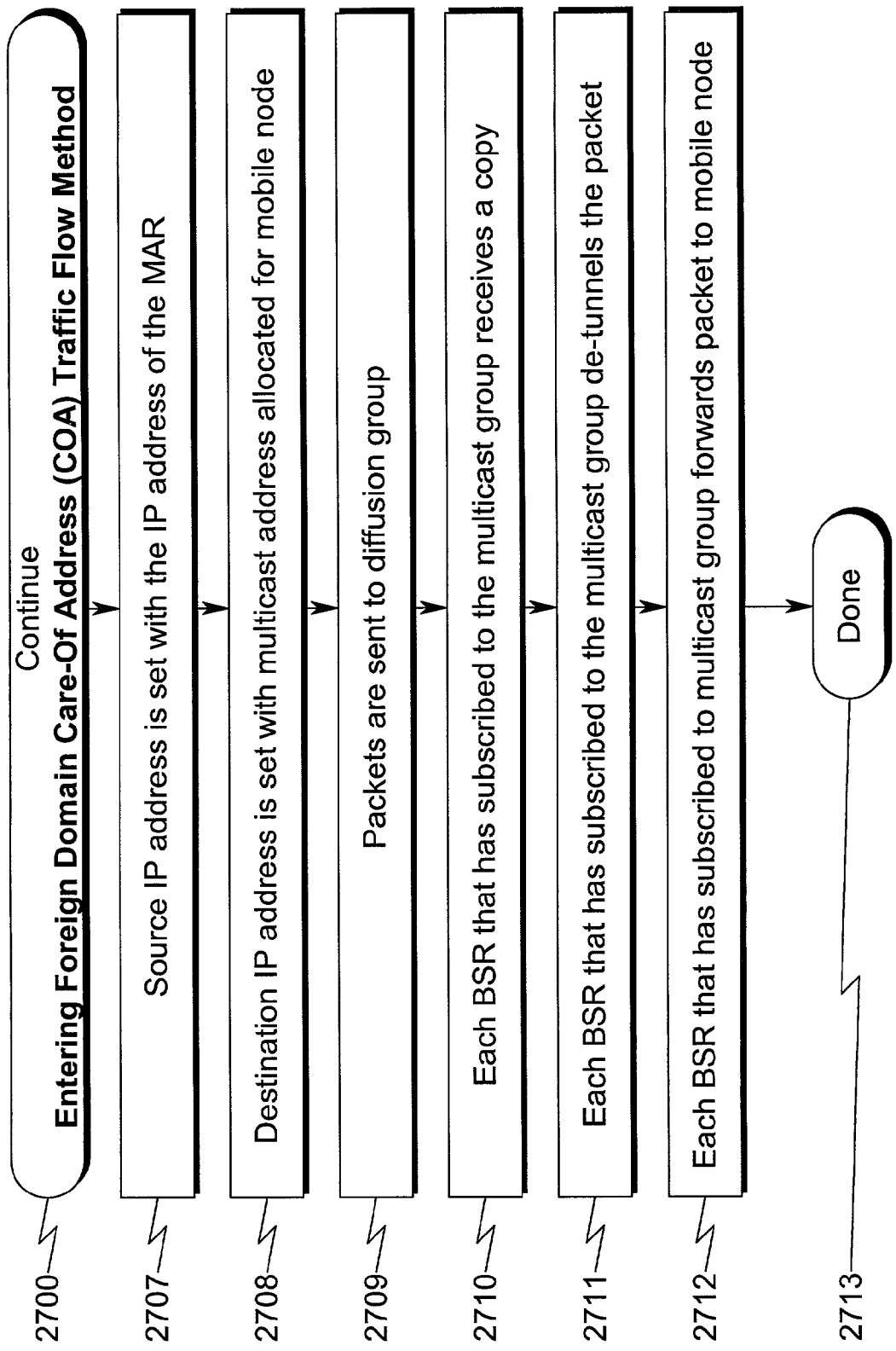

Generalized Foreign Agent Care-Of Address traffic flow is illustrated in FIG. 26 (2600) and FIG. 27 (2700). If the correspondent node is located outside the wireless domain (2601), packets will be addressed to the home network (2602). The home agent captures and tunnels those packets to the care-of address found in its binding cache (2603). This address corresponds to main access router IP address. The MAR receives the tunneled packets (2604). If the MAR has a valid binding cache for the mobile node (2605), it de-tunnels the packet and creates a new tunnel (2606).

Referencing FIG. 27 (2700), the source IP address is set with the IP address of the MAR (2707) and the destination IP address is set with the multicast address allocated for the mobile node (2708). The packets are then sent to the diffusion group (2709). Each BSR that has subscribed to the multicast group receives a copy (2710) and de-tunnels the packet (2711) and forwards the packets to the mobile node (2712).

Co-Located Care-of Address (2800)

Figure 28:
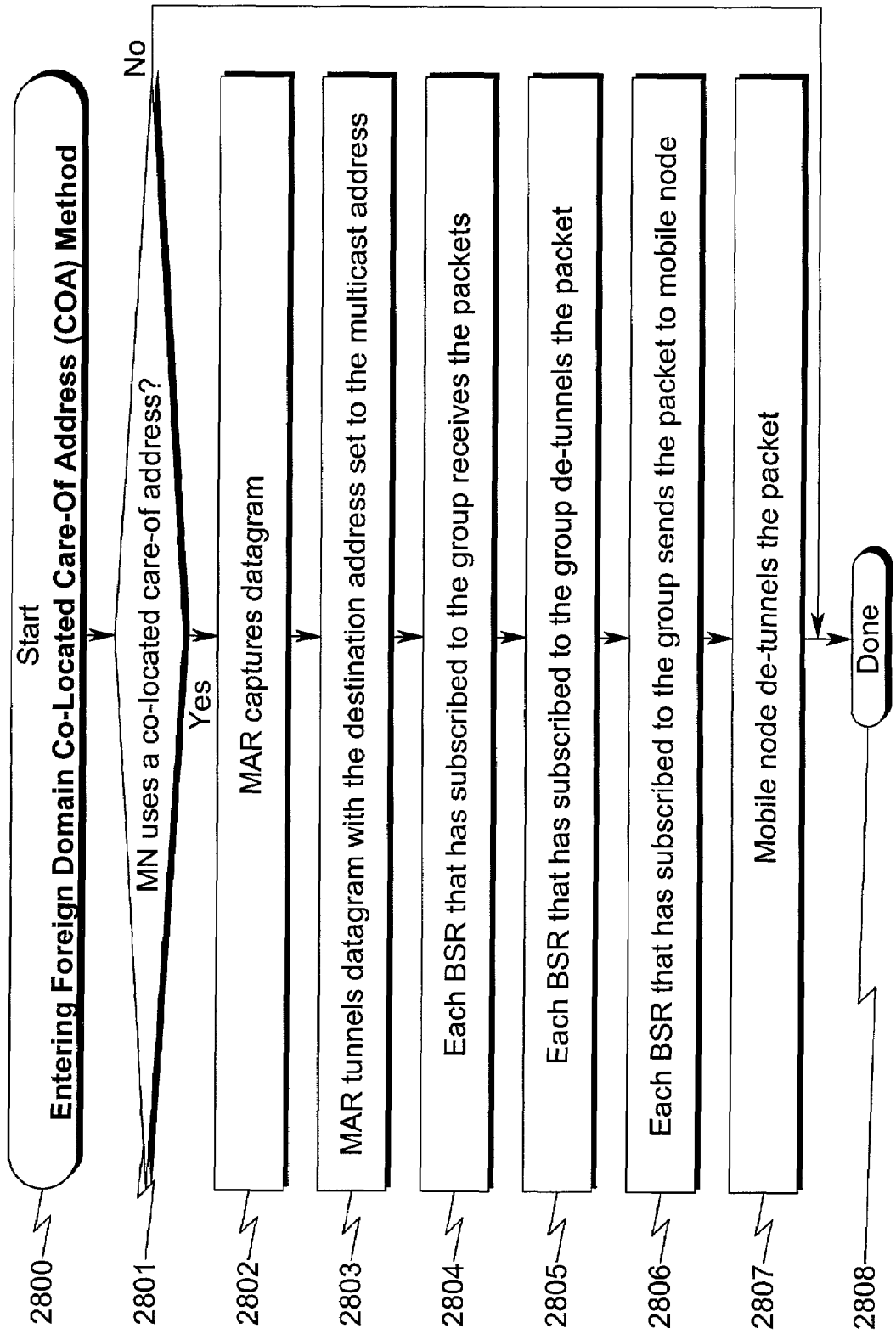

Generalized Foreign Agent Co-Located Care-Of Address traffic flow is illustrated in FIG. 28 (2800). If the mobile node uses a co-located care-of address (2801), the MAR captures the datagram (2802) and tunnels them with the destination address set to the multicast address (2803). Each BSR that has subscribed to the group receives the packets (2804) and de-tunnels it (2805) and sends the packet to the mobile node (2806). The mobile node de-tunnels the packet as specified in mobile IP (2807).

Correspondent within the Wireless Domain (2900)

Figure 29:
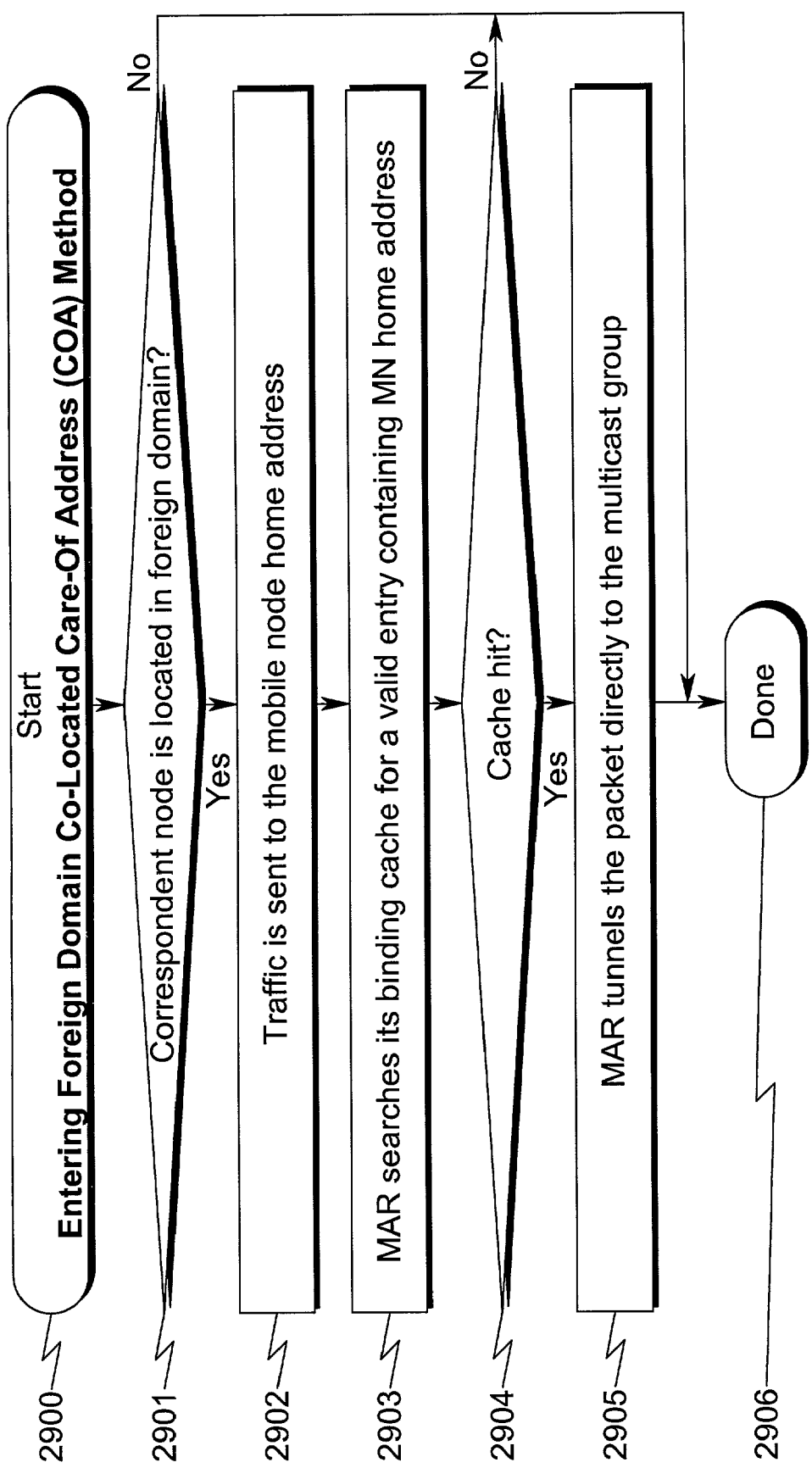

Generalized Foreign Agent Correspondence within the Wireless Domain is illustrated in FIG. 29 (2900). If the correspondent node is located in the foreign domain (2901), the traffic is sent to the mobile node home address (2902). The MAR searches its binding cache for a valid entry containing the mobile node home address (2903). If the cache is hit (2904), MAR tunnels the packet directly to the multicast group (2905). This mechanism enhances the performance of the overall network when route optimization is not used.

Moving Within the Foreign Domain (3000)

Figure 30:
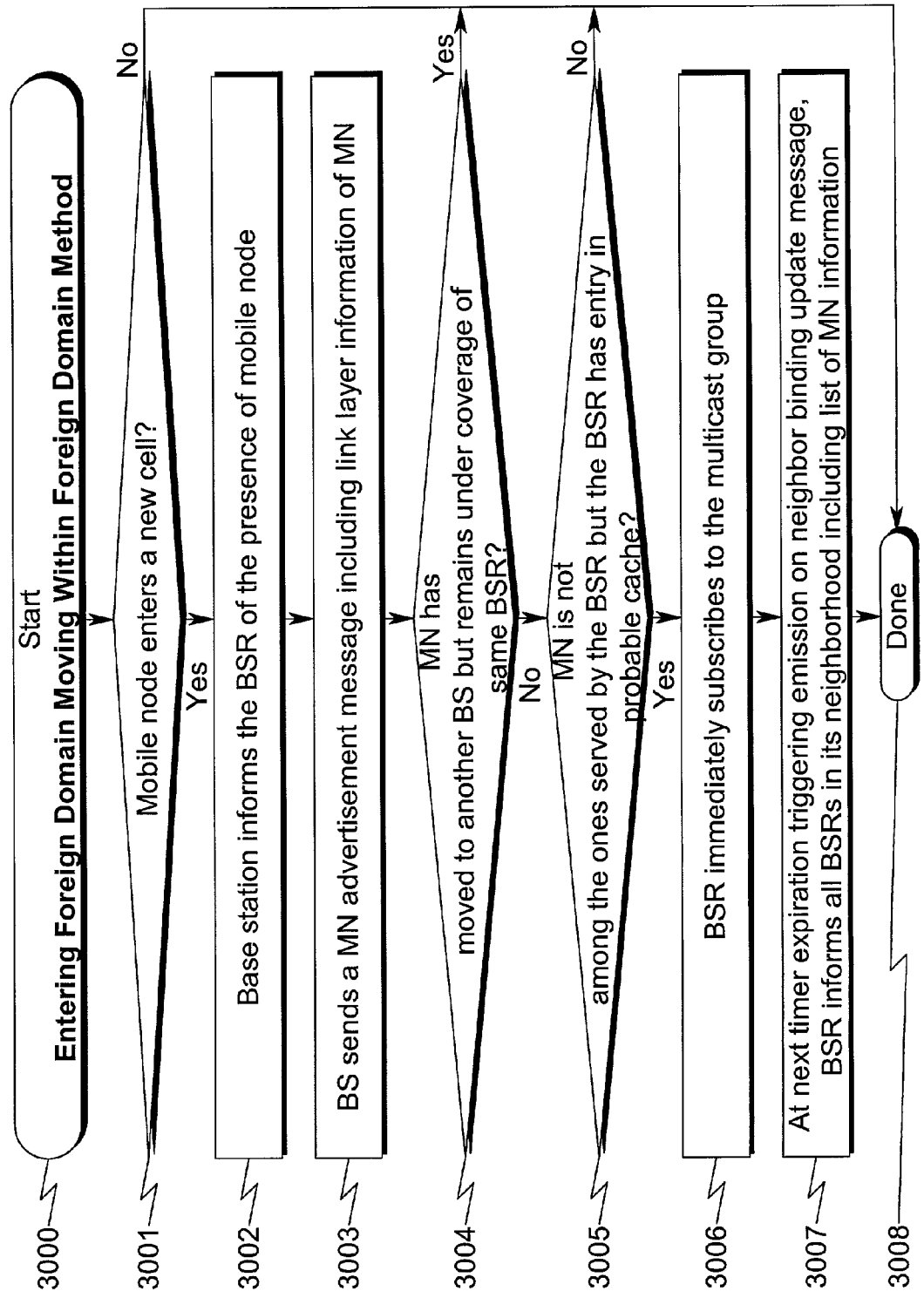

The main advantage of the protocol is the low latency required before receiving packets on outgoing connections. The protocol as it relies on link layer protocol allows such performance and is generally illustrated in FIG. 30 (3000).

If the mobile node enters a new cell (3001), the base station MUST inform the BSR of the presence of the mobile node (3002). It MUST send a mobile node advertisement message including the link layer information of the mobile node (3003). Two scenarios can be foreseen. If the mobile node has moved to another base station but remains under the coverage of the same BSR (i.e., the mobile node is served by a BS linked to the same BSR) (3004), then no action is needed (3008).

If the mobile node is not among the ones served by the BSR (i.e., the BSR does not have a binding cache), but the BSR has an entry in the probable cache (3005), the BSR MUST immediately subscribe to the multicast group (3006).

At the next timer expiration triggering the emission on the neighbor binding update message, the BSR informs all BSRs in its neighborhood including the list of mobile node information (3007).

Make-Before-Break Option (3100)

Figure 31:
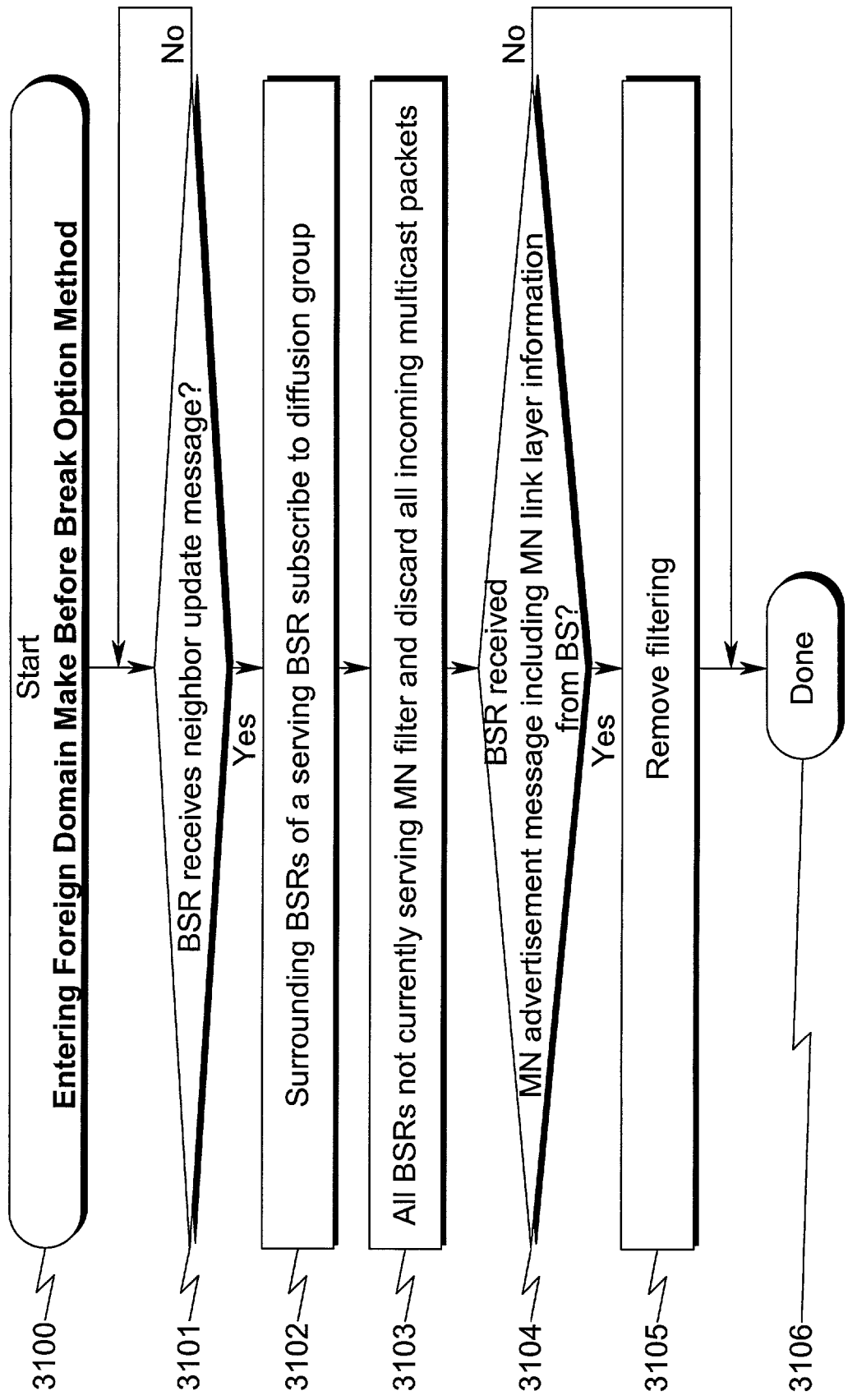

Generalized "Make-Before-Break" optional functionality is illustrated in FIG. 31 (3100). The "make-before-break" option requires that the surrounding BSRs of a serving BSR subscribe to the diffusion group (3102) as soon as they receive the neighbor update message (3101). The option also requires that all the BSRs not currently serving the mobile node (i.e., the mobile node's entry is in the probable cache) to filter and discard all the incoming multicast packets (3103). The filtering is removed (3105) when the BSR received from one of its base stations a mobile node advertisement message including the mobile node link layer information (3104).

This option is intended to reduce the latency of the diffusion group join message's processing, since the BSR already receive the packets sent to the mobile. The processing is then limited to the removal of the filtering feature associated with this particular multicast address.

Refreshing the Registration (3200)

Figure 32:
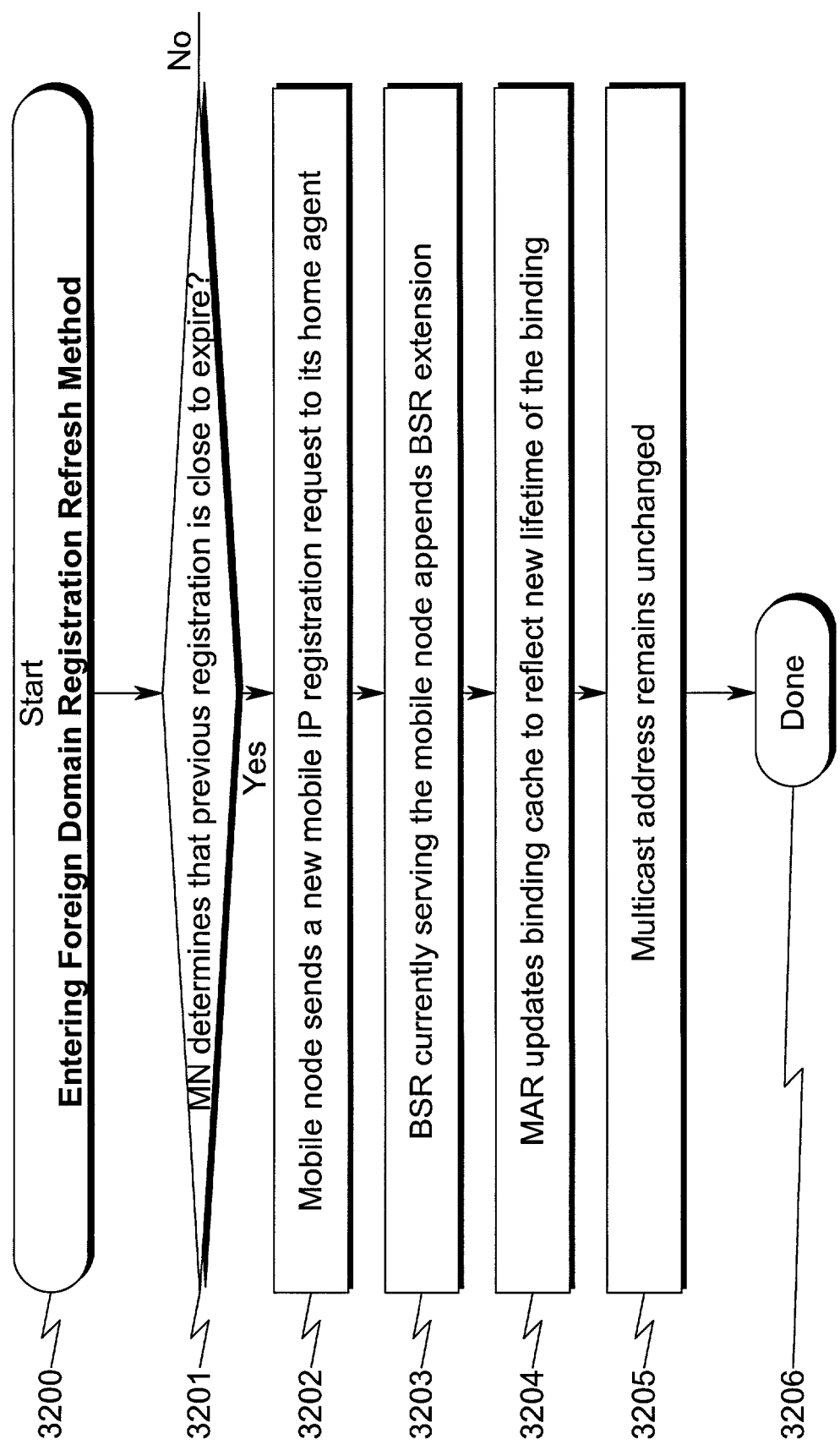

Generalized registration refresh functionality is illustrated in FIG. 32 (3200). When the mobile node determines that the previous registration is close to expire (3201), it MUST send a new mobile IP registration request to its home agent (3202). The BSR currently serving the mobile node MUST append the BSR extension (3203). The MAR MUST update the binding cache to reflect the new lifetime of the binding (3204). The multicast address remains unchanged (3205).

Moving Within the Home Domain

Figure 8:
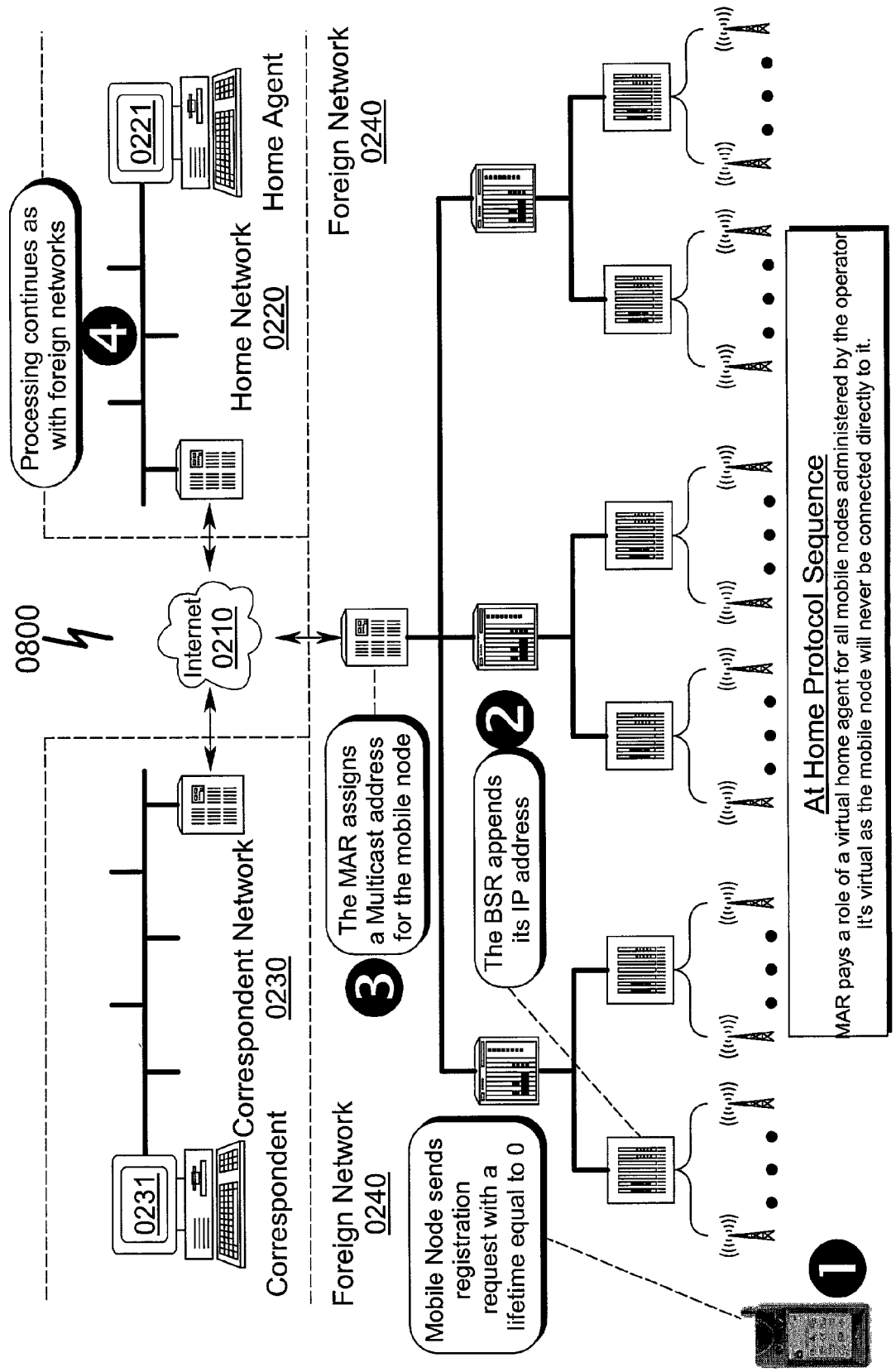

At Home protocol sequence data flows are generally illustrated in FIG. 8 (0800) and will now be discussed in detail.

Virtual Home Network (3300, 3400)

Figure 33:
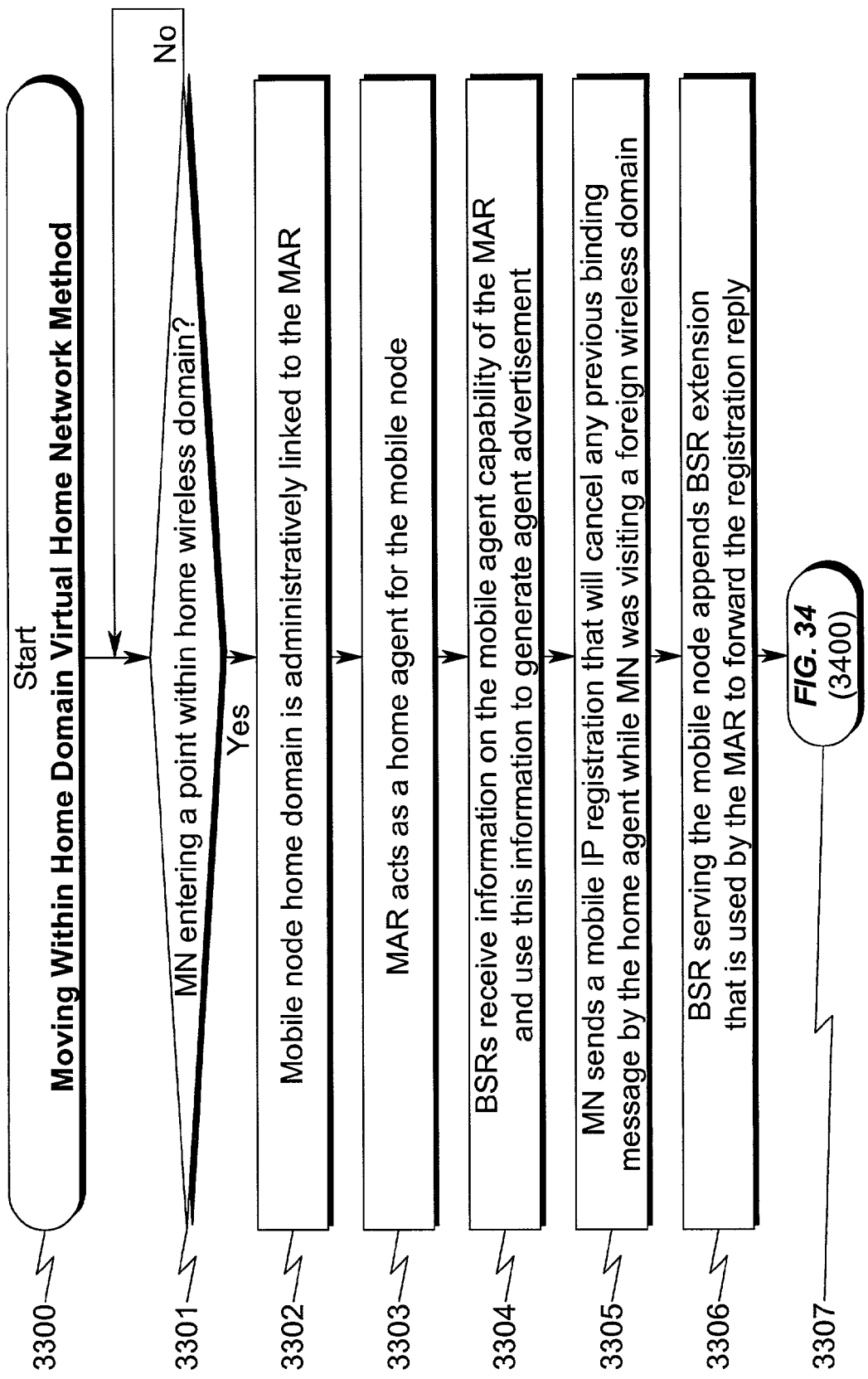

Generalized Virtual Home Network functionality is illustrated in FIG. 33 (3300). When the mobile node is moving within the home wireless domain (3301), principles described for the foreign domain remain. The mobile node home domain is administratively linked to the MAR (3302). Thus the MAR acts as a home agent for the mobile node (3303).

As mentioned in the Overview section above, the protocol requires an initialization phase, during which the BSRs received information on the mobile agent capability of the MAR (3304). The BSRs use this information to generate agent advertisement.

The mobile node entering a point within the home wireless domain will send a mobile IP registration that will cancel any previous binding message by the home agent while the mobile node was visiting a foreign wireless domain (3305). It might as well be a new registration request as the mobile devices has just been turned on. The BSR serving the mobile node MUST append the BSR extension, which will be used by the MAR to forward the registration reply (3306).

Figure 34:
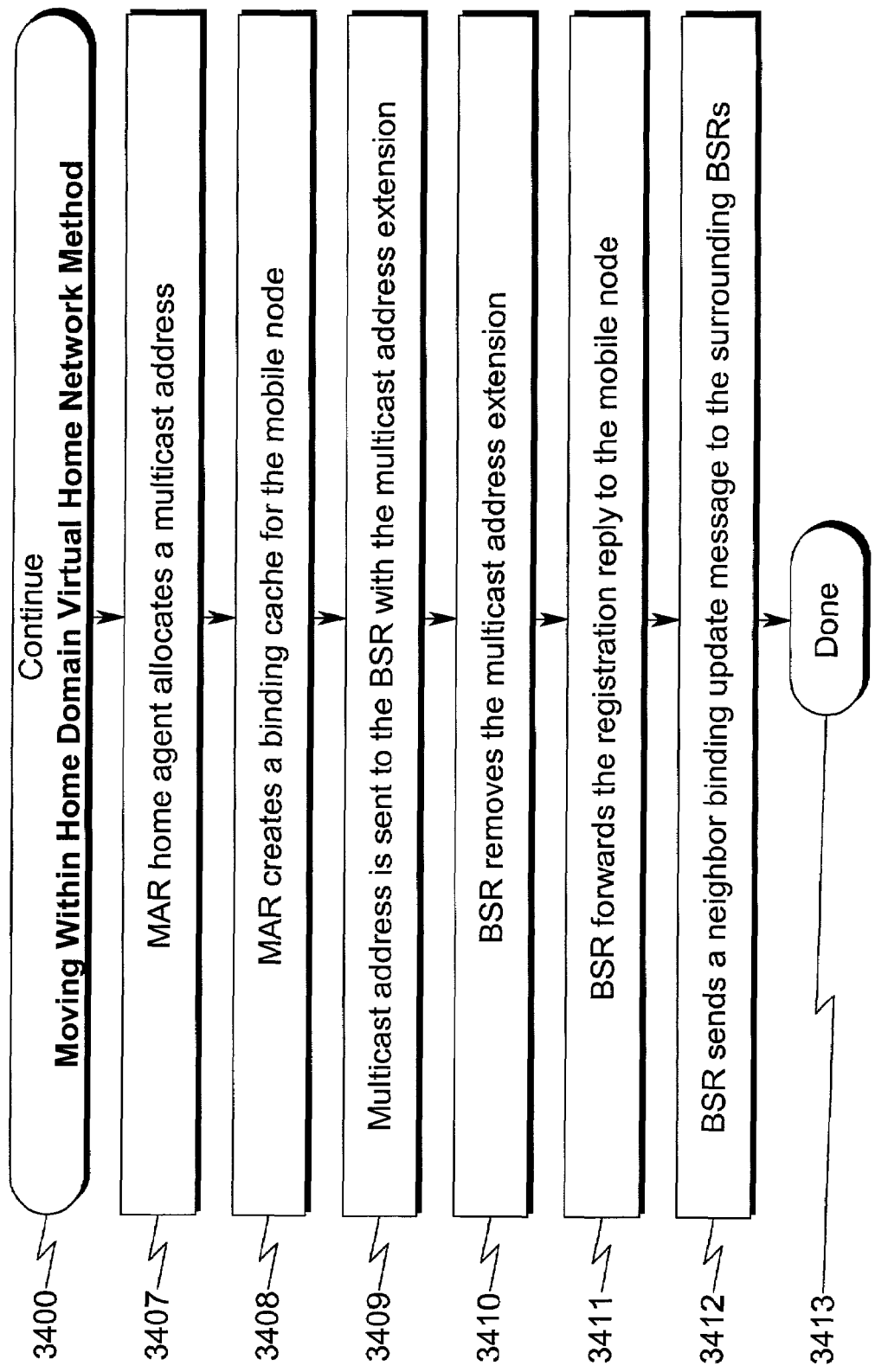

Referencing FIG. 34 (3400), the MAR home agent allocates a multicast address (3407) and creates a binding cache for the mobile node (3408). The multicast address is sent to the BSR with the multicast address extension (3409). The BSR removes the multicast address extension (3410) and forwards the registration reply to the mobile node (3411). The BSR sends a neighbor binding update message to the surrounding BSRs (3412).

While the mobile node moves in the home domain the principles, described for the foreign domain, are strictly identical (see the previous section Moving Within the Foreign Domain).

Traffic Flow (3500)

Figure 35:
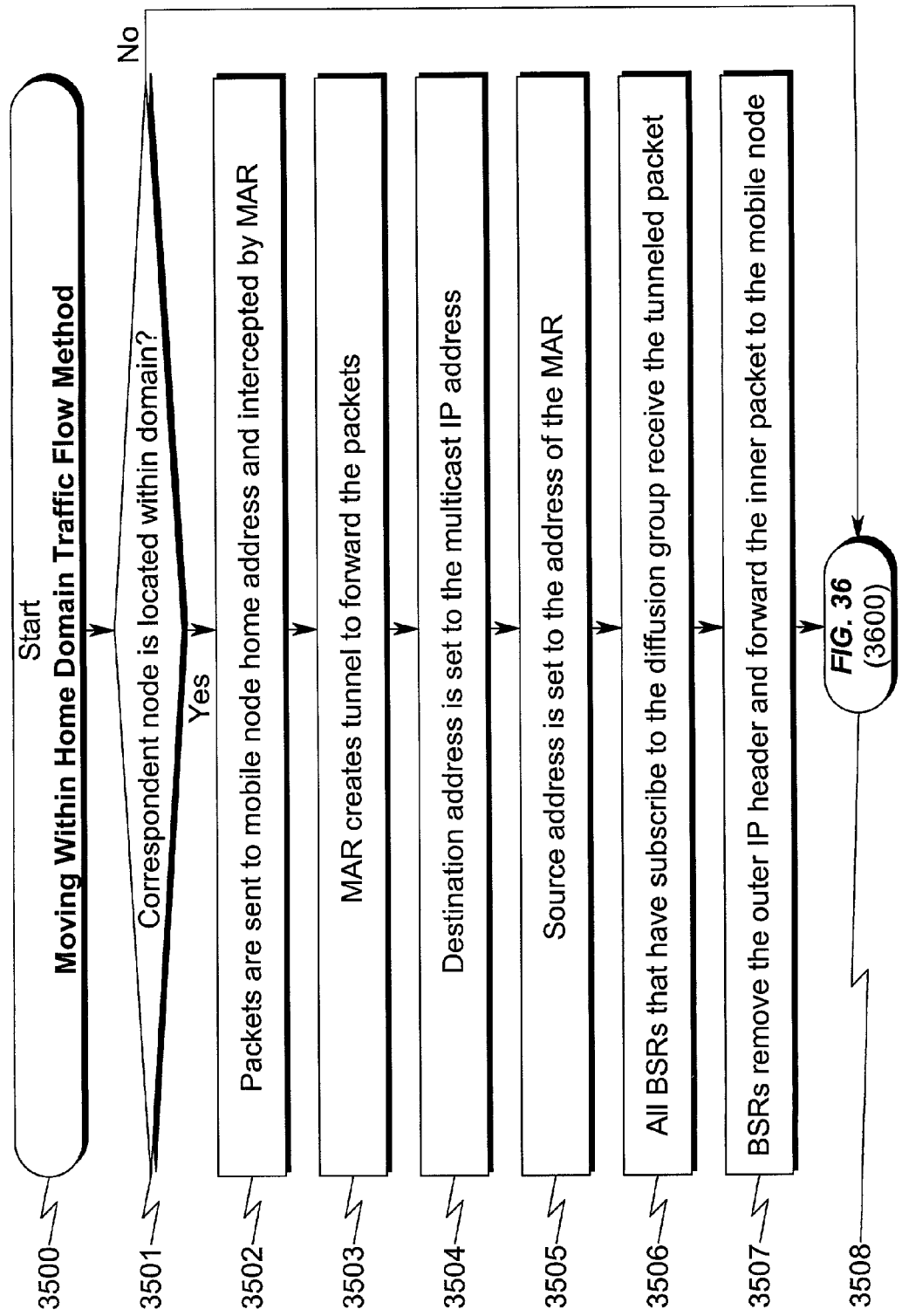
Figure 36:
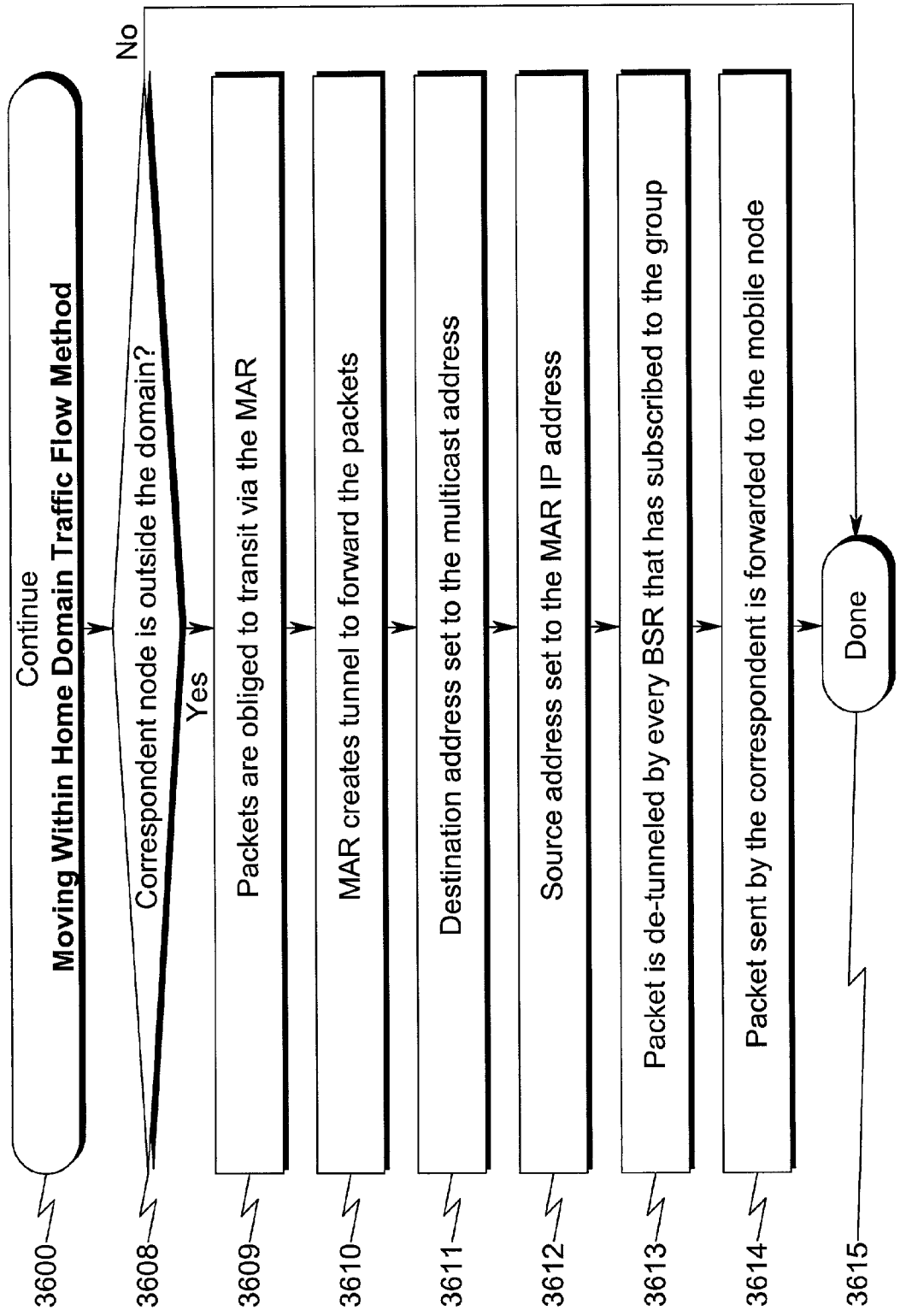

Generalized Traffic Flow functionality is illustrated in FIG. 35 (3500) and FIG. 36 (3600). If the correspondent node is located within the domain (3501), packets are sent to the mobile node home address, which are intercepted by the MAR (3502). The MAR creates tunnel to forward the packets (3503). The destination address is set to the multicast IP address (3504) and the source address is set to the address of the MAR (3505). All the BSRs that have subscribe to the diffusion group will receive the tunneled packet (3506). The BSRs MUST remove the outer IP header and forward the inner packet to the mobile node (3507).

Referencing FIG. 36 (3600), if the correspondent node is outside the domain (3608), packets are obliged to transit via the MAR (3609), which applies the same principle as described in the previous paragraph. The MAR creates a tunnel (3610) with the destination address set to the multicast address (3611) and with the source address set to the MAR IP address (3612). This packet is de-tunneled by every BSR that has subscribed to the group (3613). The packet sent by the correspondent is forwarded to the mobile node (3614).

Change in Existing Protocol Behavior

The present invention slightly modifies existing Mobile IP protocols. The present invention protocol implies that the mobile node MUST register every time it enters a wireless domain, even if the wireless domain is the home domain of the mobile node. This extension is mandatory to allow the establishment of the multicast distribution tree.

The present invention protocol does not require the BSR that is acting as the foreign agent to send periodically the agent advertisement message. The message is send only when the BSR determines that the mobile node is new in the BSR coverage area.

Mobile Node Considerations

The present invention protocol does not imply any specific requirement for the mobile node beside the fact that the mobile node MUST implement mobile IP as defined in RFC 2002.

The unique requirement made within the present invention is that the mobile node when entering a wireless domain MUST send a mobile IP registration request. This is required to set up the multicast tunnel within the wireless domain. This registration also removes the pending binding when the mobile node returns in its home domain. The mobile node MUST then set the lifetime to zero as specified in mobile IP.

The mobile node MUST keep track of the pending registration requests as these messages may get lost. In such case, the mobile node MUST set a timer which expiration will trigger a new mobile IP registration message. The number of mobile IP registration messages sent should be generally be limited.

Base Station Considerations

The base station MUST maintain a cache including link-layer specific information of every mobile node located within its coverage area.

The base station MUST sent periodically mobile node advertisement update (see previous section Mobile Node Advertisement) containing all the link-layer specific information of all the mobile nodes located under its coverage area. The periodicity of this message remains to be defined. It is more likely that the periodicity will be linked to the number of base stations attached to the BSR and to the number of users that the BSR can manage. The number of messages sent should be tuned so that the signaling part of the protocol does not create a great overhead.

Figure 3:
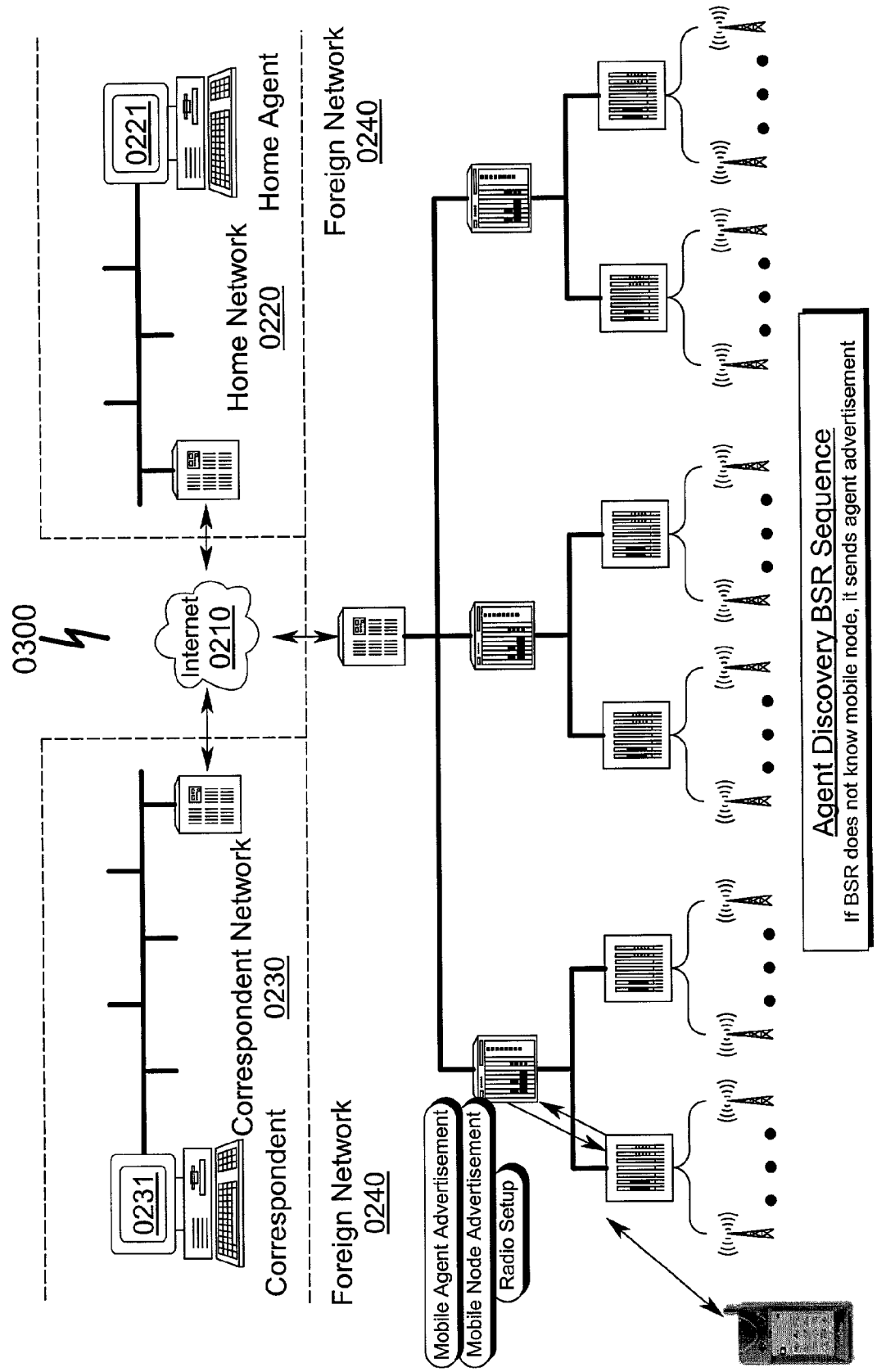

The base station MUST immediately sent a mobile node advertisement message with the sub-type set to "new" (see previous section Mobile Node Advertisement) giving the link-layer specific information of the mobile node, when it detects that a mobile node has enter its coverage area. This sequence is generically illustrated in FIG. 3 (0300).

Base Station Router Considerations

Figure 2:
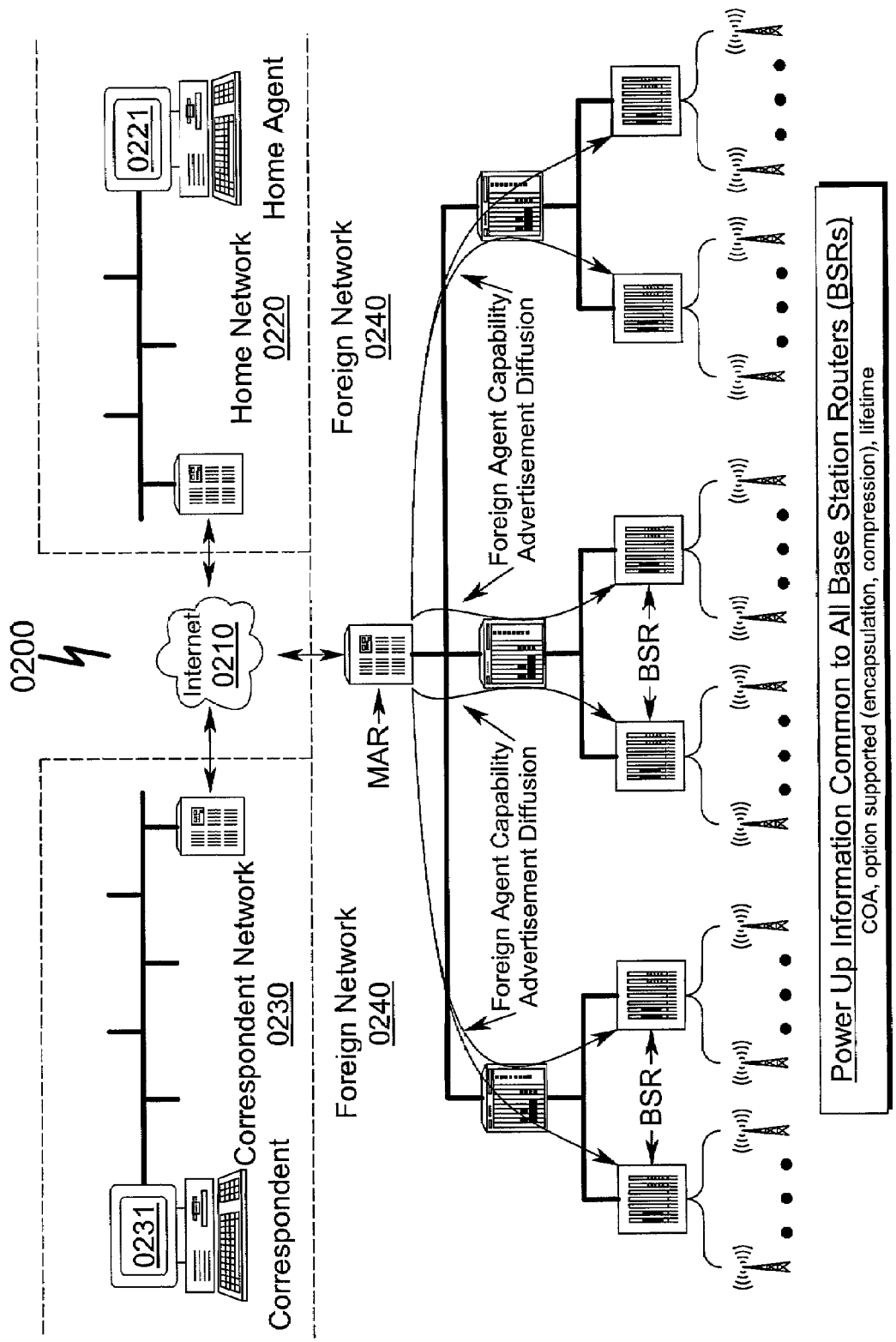
FIGS. 2-8 illustrate a typical topology of the how the present invention system and method are applied to existing home/foreign IP network routing topologies.

The BSR MUST process agent advertisement message sent by the MAR. The BSR MUST store the information given as it will be used to send local agent advertisement message to a mobile node. The BSR detects a MAR failure when it receives an agent advertisement message with a sequence number equal to zero. If the BSR receives an agent advertisement message with a sequence number different than zero just after its own power-up phase, this indicates that the BSR has rebooted. This case requires all mobile nodes to re-register with their home agent. This scenario is illustrated generically in FIG. 2 (0200).

The base station router MUST manage two caches: the binding cache holds the information of all mobile nodes that are currently or were under one coverage area of the one of the base stations. Indeed a mobile node may have been included in the last mobile node advertisement message that will have refreshed the binding cache entry and may have moved under another coverage area managed by another base station router. The probable cache holds the information of the mobile nodes that are in the neighborhood. These mobile nodes may appear in the near future and the information is intended to help the handoff process.

The base station MUST process the mobile node advertisement message. There are two different scenarios depending on the value of the sub-type field:

1. The sub-type field indicates that the mobile node has just entered the coverage area of a base station. For the base station router, this message either means that the mobile is new in the BSR coverage area or the mobile node has moved under an area covered by another BS. The BSR determines the first case by the fact that both the binding cache and the probable cache do not contain an entry matching the link-layer information included in the mobile node advertisement message. In such case, the BSR MUST send a Mobile IP agent advertisement message to the mobile node.

If the BSR has an entry in the binding cache it means that the mobile node has moved in a new cell and no action is needed.

If the BSR determines that the mobile node have just move in its BSR coverage area because it has an entry in the probable cache. The BSR MUST send an IGMP (if this is the protocol used) join message in direction of the MAR. The BSR must also move the entry from the probable cache to the binding cache.

2. If the sub-type field indicates an update message, the BSR MUST process the message, which consist of refreshing the entry in the binding cache of each mobile node included in the list. A single message (i.e., mobile node advertisement update) reflects only a part of the mobile node currently located in the BSR coverage area. The BSR must wait until it has received every base station's mobile node advertisement message before removing entries in the binding cache. If some entries of the binding cache expired, these entries should be moved from the binding cache to the probable cache. The BSR MUST send an IGMP leave message in direction of the MAR if the BSR does not implement the "make-before-break" option. The lifetime of a binding entry is set to be equal to twice the time need for the BSR to receive all BSRs' mobile node advertisement update message.

The BSR MUST send periodically a neighbor update message with the list of mobile node located under its BSR coverage area. This list is sent to all the BSRs in the neighborhood. How the BSR knows the list of BSRs in the neighborhood is out of the scope of the document (e.g., the information could be given to the BSR via network management protocol, SNMP).

The BSR must process every neighbor update message received. Each of these messages includes the list of mobile node currently served by a neighboring BSR. For each mobile node included in the list the BSR MUST either creates an entry or refreshes an existing one. If the implementation wants to support the "make-before-break" option, the BSR MUST send an IGMP join message in direction of the MAR. If the entry in the probable cache expires, the entry MUST be deleted and the BSR MUST send a leave message in direction of the MAR. The lifetime of the probable cache entry is set to twice the sending rate of the neighbor update messages.

For each multicast diffusion group that matches an entry in the binding cache and for which the BSR has subscribed the BSR MUST de-tunnel all packets received and forward them to the base stations. If the BSR implements the make-before-break feature, the BSR MUST be able to filter the multicast diffusion group that do not require packet processing (i.e., because the mobile node have not yet entered the BSR coverage area). The BSR knows the list of mobile nodes that require such processing by consulting the probable cache.

When an entry of the probable cache is not refreshed, if the BSR does not implement the make-before-break option, the BSR MUST send an IGMP leave message in direction of the MAR. The entry MUST then be removed from the cache.

Main Access Router Considerations

The MAR is the only foreign agent available in the wireless domain. The MAR MUST after initially boot (or a reboot) send an agent advertisement message to all the BSRs of the wireless domain. This message MUST be sent periodically to cover a BSR failure. The first message sent after the initial power-up phase MUST have the sequence number equal to zero.

It MUST process all registration requests as defined in Mobile IP and SHOULD process all the extensions of the registration request (e.g., NAI extension, AAA extension, reverse tunneling extension, etc.). The MAR MUST check the presence of the BSR extension. The registration request MUST be rejected by the MAR if the BSR extension is not included. The MAR must be able to determine the two following cases:

1. The mobile is registering for the first time (i.e., the binding cache does not have an entry for this mobile node)
2. The mobile is sending a registration request to refresh a current binding (i.e., the binding cache has an entry for this mobile node)

In the first case, the MAR should create an entry in a pending cache containing the information included in the registration request.

If the MAR receives a second registration request for the same mobile node while the registration request is currently processed (i.e., the pending cache has an entry for this mobile node). The MAR MUST check the content of the BSR extension, as the mobile node may have moved to another BSR coverage area. The MAR should update the entry in the pending. If the registration request is identical the MAR should process the registration and forward it the home agent.

The MAR MUST process all the extension included in the registration, which implies that, the MAR SHOULD have interface with a local AAA server to grant the mobile node's access.

If the home agent grants the registration request, the MAR MUST assign a multicast address and associated to the mobile node. The mechanism by which the MAR finds the multicast is out of the scope of this document. The MAR MUST append the multicast address extension at the end of the registration reply and forward the message to the BSR that has forward the registration request. The MAR MUST create a binding entry holding the information of the association (binding and multicast address).

If the MAR finds that the registration request of the mobile is sent to refresh its current binding, the MAR MUST forward the registration to the home agent. The MAR MUST append the multicast address extension at the end of the registration reply received from the home agent. This extension MUST include the same multicast address has allocated during the processing of the initial registration request.

Figure 4:
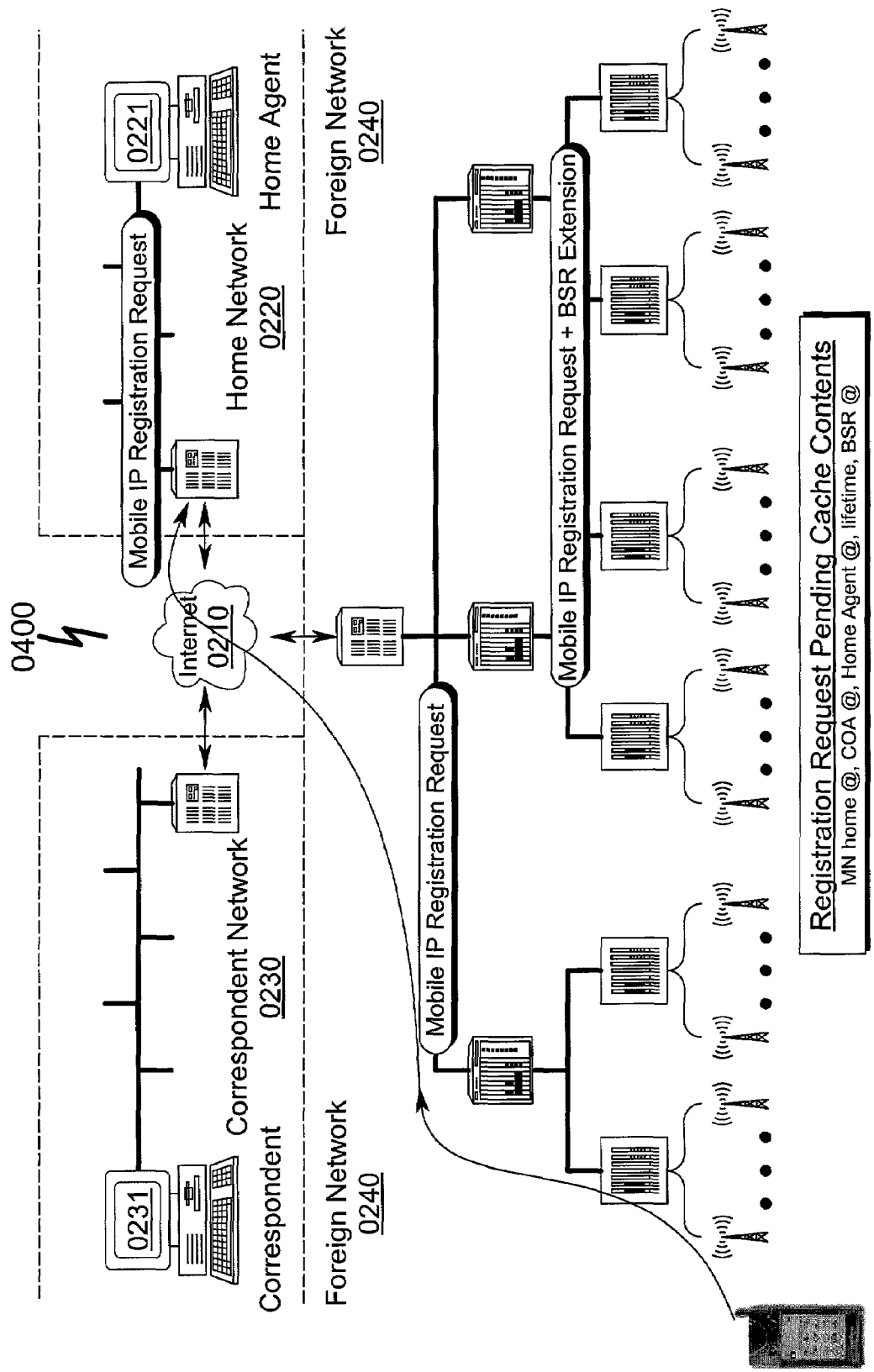
Figure 5:
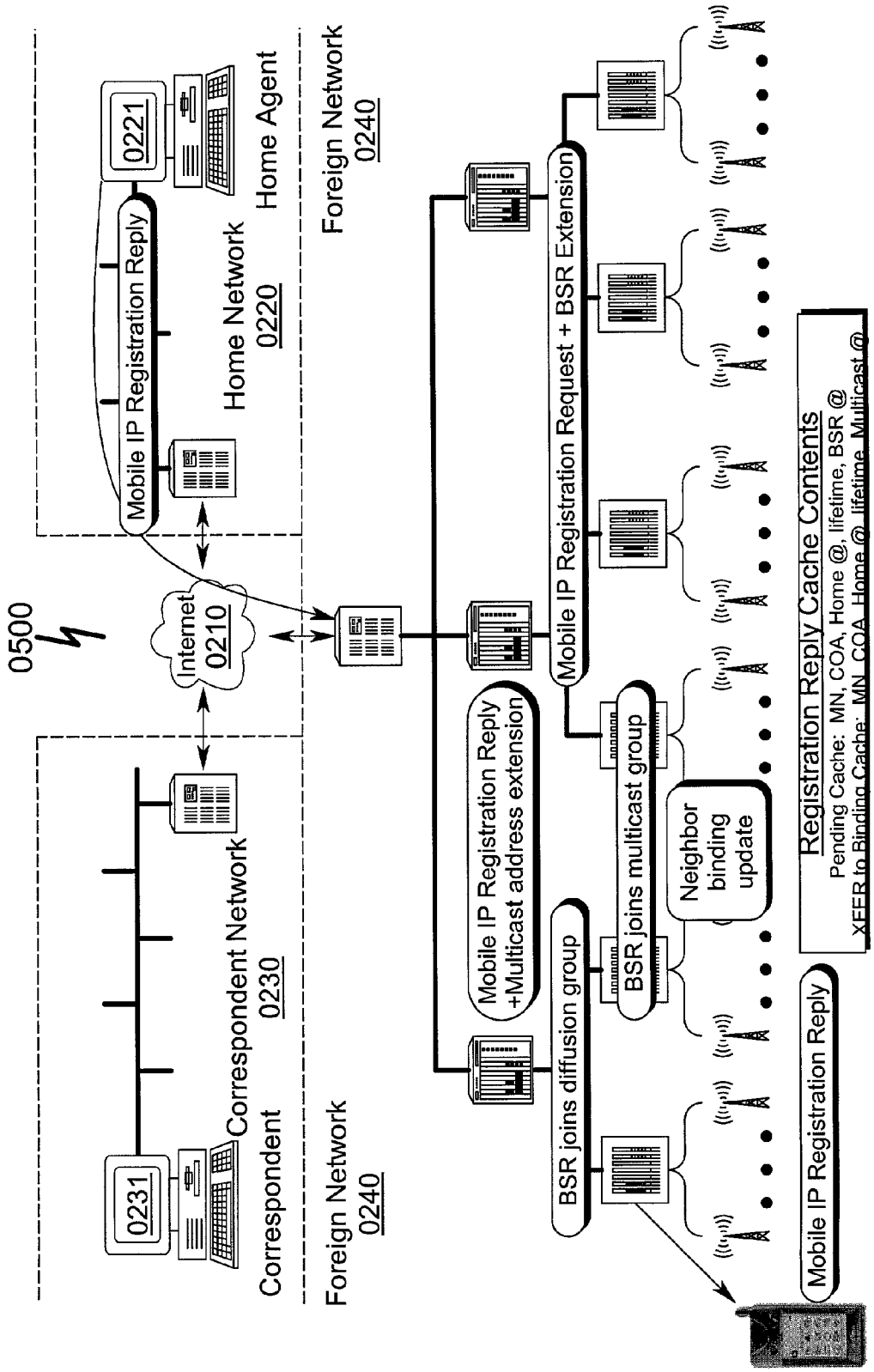
Figure 6:
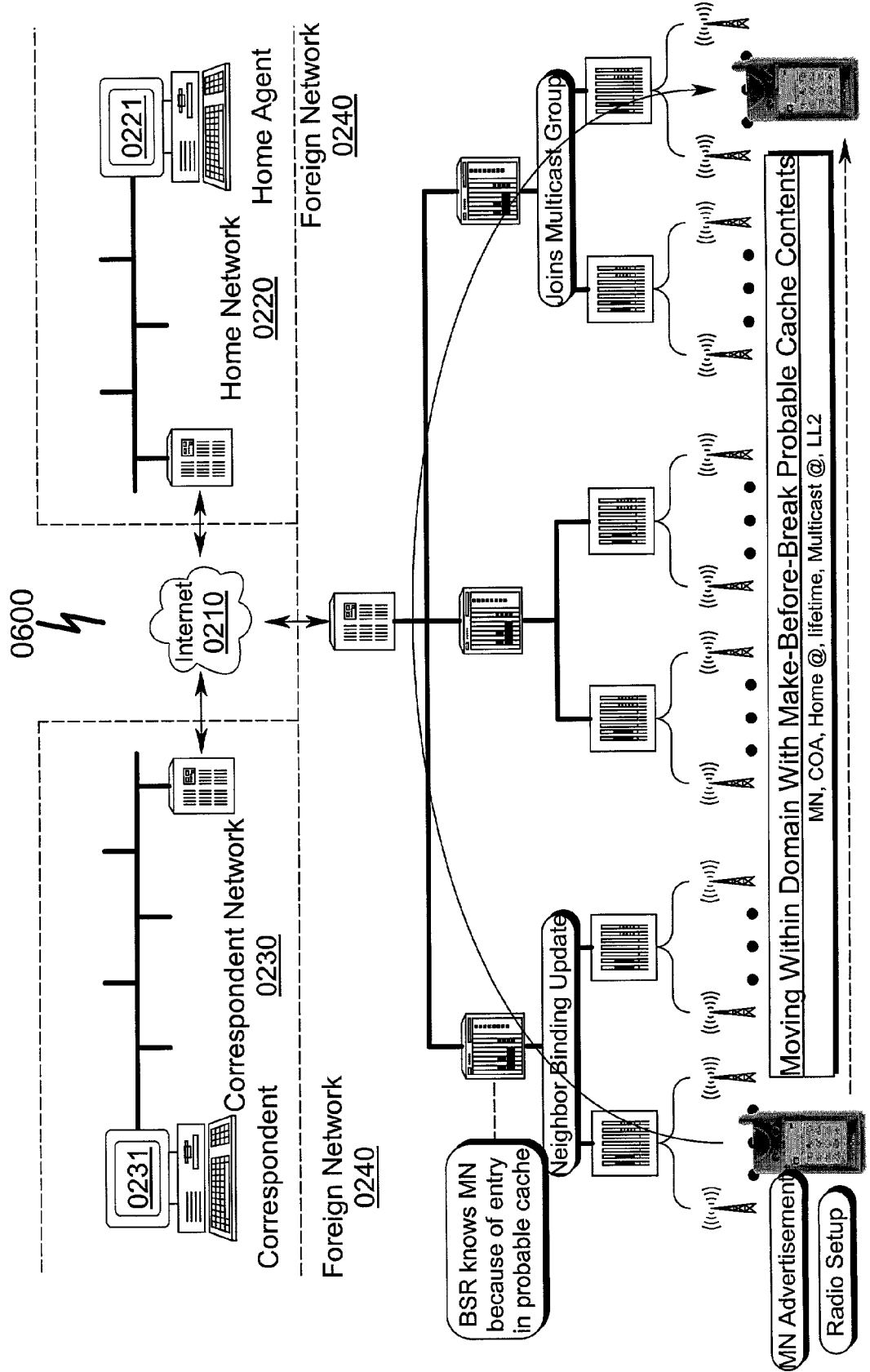

Registration Requests are generically illustrated in FIG. 4 (0400) with Registration Reply flows illustrated in FIG. 5 (0500).

Exemplary System Enhancements

Load Balancing

To avoid having a bottleneck in the network, it is possible to interconnect MARs together. The principle is to have several MAR serving the wireless domain to decrease the load, as each MAR will support only a part of the mobile users actually moving in the domain. The MARs are interconnected together, and the principle is that the mobile node can move to a part of the domain controlled by another MAR simply by having the BSR serving the mobile node sending a join message up to the previous MAR. This solution may create a latency issue in term of hand off performance, but it could be a tradeoff between the bottleneck situation and having a distributed environment. The second benefit is to provide different access points to the wireless network, which will provide backup in case of MAR failure.

If the principle is retained it has the implication of requiring the MAR to be a multicast router, as at one point or another the mobile node will move under an area controlled by another MAR. The BSR will send the IGMP message to the MAR, which will forward the request to the MAR that has initially served the mobile node.

Grouping BSR in Cluster

The idea is to have the MAR sending the mobile IP registration reply to a predefined group of BSRs. For instance we could take a cluster made out of BSR 1, 2 and 3. A BSR belongs to a single cluster. These three BSRs will belong to a same group and will receive registration requests by listening to dedicated multicast address. The BSR that has forwarded the original registration request MUST be able to keep track on the registration requests sent. Indeed the BSR MUST set up the appropriate de-tunneling of the mobile node's packets. The other BSR MUST set up the appropriate filtering so that the mobile node's packets are discarded.

The principle implies that the BSR located on the edge of the cluster MUST know the multicast address of the cluster located near by. So when a mobile node enters the BSR coverage area of an edge BSR, this BSR MUST inform the cluster known. If we apply this scheme to the classical honey cell used to represent the cellular network we can see that the clustering reduce the signaling packets of the protocol. The drawback is that all the BSRs in a cluster will join the group, which will require a greater capacity of the network, as more data traffic will be supported. A simulation should assess if there are some advantages to used such techniques.

Preferred System Context of the Present Invention

Overview (3700)

Figure 37:
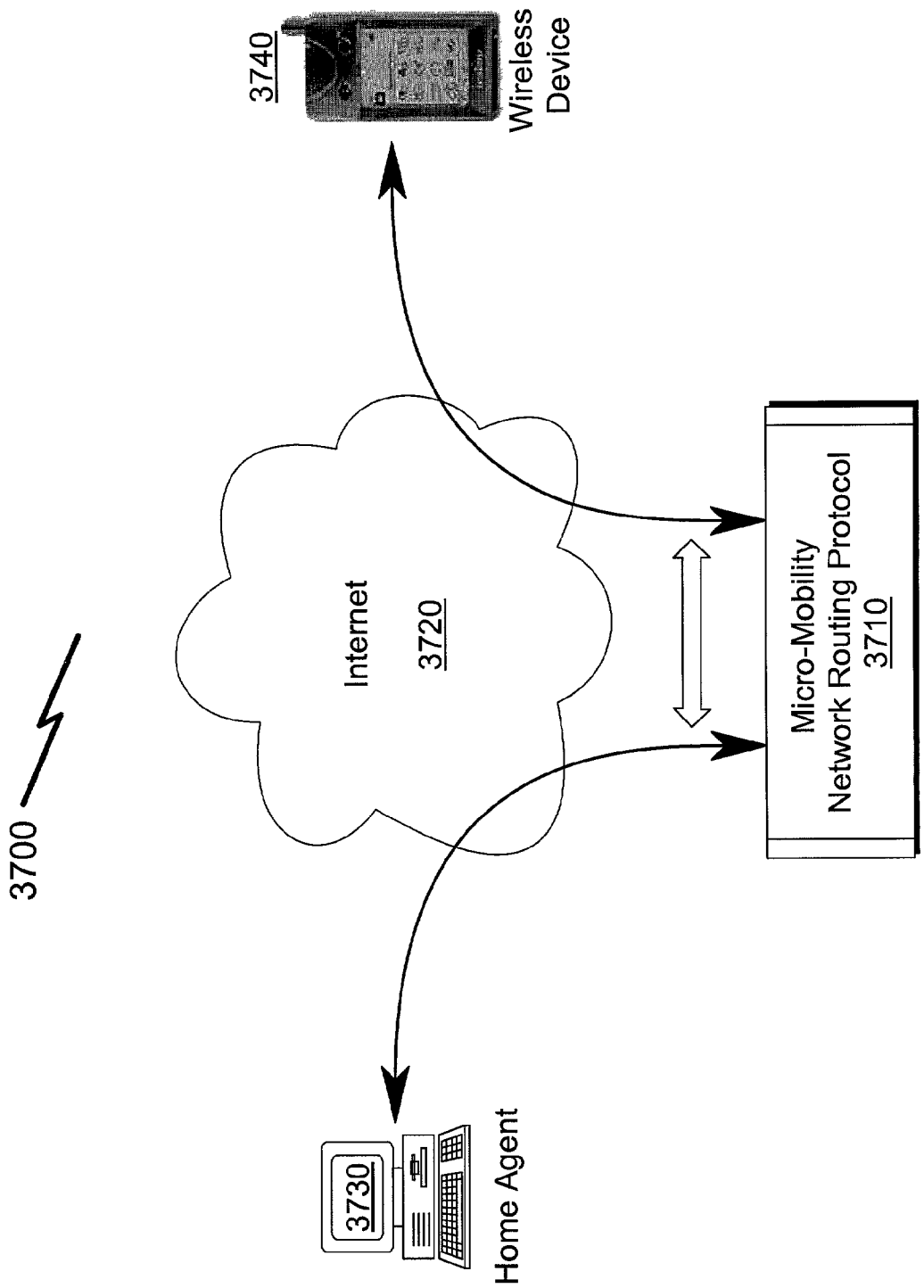
FIG. 37 illustrates a generalized system block diagram of the present invention.

The most generalized system implementation of the present invention is illustrated in FIG. 37 (3700), wherein the present invention as embodied in a Micro-Mobility Network Routing Protocol means (3710) is incorporated within an Internet IP network (3720) to permit communication between a home agent means (3730) (which may be a fixed computer system or a roaming network node) and a wireless remote device means (3740). The protocols and methods described herein permit IP connectivity between the home agent means (3730) and the wireless remote device means (3740) with minimal overhead within the Internet IP network means (3720). The wireless remote device means (3740) may have a wide variety of implementations, including but not limited to telephones, wireless PDAs, and other forms of wireless radio transceivers, transmitters, receivers, and the like.

As previously described, the Internet IP network means (3720) may incorporate any number of Main Access Routers, routers, and/or base station routers to implement the hardware functionality required in this scenario. Software to implement the described protocols may be layered among any or all layers within this hardware structure.

While the present invention may be embodied in a variety of forms and implemented in a variety of system contexts, there are some noteworthy system contexts that are preferred. In this section we introduce the concept Small Group Multicast (SGM) or Explicit Multicast (XCAST) and then develop an implementation technique for MMM using XCAST.

SGM/XCAST

In order to join a particular multicast group a node usually sends an IGMP join message to a source or to a centralized node depending upon the type of multicast technique being used. Traditional IP multicast uses a multicast address to forward datagrams to members of a particular group. The multicast routers from the source to group members update their tables reflecting the presence of group members downstream. Each multicast router forwards the datagrams till they reach the nodes that had subscribed to a group. This mechanism works well when the groups are very large and the number of groups are small in number. There are various multicast schemes that addresses the issue of dense and sparse mode multicast (PIM Sparse Mode and Dense Mode) but the schemes are not well suited for large number of small multicast groups.

Unlike traditional IP multicast, XCAST can effectively support large number of small multicast groups. Traditional IP multicast rely upon multicast routers to maintain multicast group information and therefore highly suitable for small number of large multicast groups. Large number of multicast groups could cause scalability problems because each multicast router would have to keep a lot of entries (for each group) and also the processing time involved in lookup. XCAST addresses this issue by eliminating the need for information (group information) be stored at each multicast router, instead each data packet carries the unicast address of the nodes that are members of this multicast group. The packets are replicated wherever necessary in order that all group members receive the datagrams. The source of the packets usually manages the group membership, therefore any node wishing to be a member of the group sends a message requesting to join a XCAST session.

When a router receives a XCAST packet, it performs the following:

- Looks up the XCAST table to determine the next hop for every destination listed within the datagram.
- If an entry for the next hop for a particular destination then the packet is replicated and sent to the unicast address of the destination.
- If an entry exists for the next hop of a particular destination then the list is partitioned on the basis of the next hop.
- The datagrams are replicated for each unique next hop.
- The destinations within the XCAST header are modified to reflect only those destinations that are reachable through a particular next hop.
- Forwards the datagrams through the appropriate interface to the next hop Implementation Using XCAST A multicast approach to mobility allows us to provide fast handoffs. When performing a handoff, the old BSR and the new BSR would be part of the same multicast session, unless the entry for the MN at the old BSR expires just as handoff is being performed. At most times during a handoff, only two BSRs would be members of the same multicast session. If a MN performs handoffs frequently or if the lifetime of the entry in the tables is longer, then more than two BSRs could be part of the same multicast session. In the normal mode of operation, we are assuming that the lifetimes of the soft-state entries are dynamically computed so as to take into consideration the frequency of handoffs. In such a scenario, there would at most be only two BSRs that are members of the same multicast group.

A domain may consist of few hundred base stations serving thousands of MNs. The MAR assigns a multicast address for every MN within its domain. The MAR therefore, has to keep an entry and the group membership for all MNs within its domain. The BSRs also have hundreds of multicast routing entries for mobile nodes under its coverage. This not only creates a bulky routing table but also increases the lookup time for each MN. If there are multicast routers between the MAR and the BSRs, then they would also need to have multicast entries for each MN. The advantages that multicast routing offers are negated because of the scalability problem that it poses here. This problem also exists with protocols that use host-based routing techniques.

Table 2 shows the entries in a multicast router. If there are N number of MNs under the coverage of a BSR then the BSR has to maintain an entry for each one of them and so does every multicast router within the domain. BSR1 is a member of a multicast group that is addressed by a unique multicast address assigned to MN1. BSR2 and BSR3 are members of multicast group addressed by a multicast address assigned to MN2. Each entry has a lifetime associated with it. The entries are deleted if lifetime associated with an entry expires.

TABLE 2

MCAST Table Entries

| Multicast Address | BSRs | Lifetime |
| --- | --- | --- |
| MN1 Mcast@ | BSR1 | 10 |
| MN2 Mcast@ | BSR2 | 5 |
|  | BSR3 | 10 |
| MN3 Mcast@ | BSR3 | 10 |

This problem is compounded further if the Make-Before-Break (MBB) option is included. Table 3 shows the entries in a multicast router using the Make-Before-Break option. BSR1, BSR2, BSR3 and BSR4 are all members of the multicast group that serves MN1. BSRs that are not serving the MN also receive packets since they have opted to subscribe to the multicast group using the MBB option. The BSRs that are not serving (if the BSRs do not have an entry for the MN1 within their binding cache) MN1 have to discard the packets once it receives them from the MAR. Only those BSRs that have an entry for MN1 in their binding cache can forward the packets to the MN1.

TABLE 3

MCAST Table Entries Using Make-Before-Break

| MN Multicast Address | BSRs | Lifetime |
| --- | --- | --- |
| MN1 | BSR1 | 10 |
|  | BSR2 | 20 |
|  | BSR3 | 10 |
|  | BSR4 | 20 |
| MN2 | BSR2 | 5 |
|  | BSR3 | 10 |
|  | BSR4 | 10 |
|  | BSR5 | 20 |
| MN3 | BSR3 | 10 |
|  | BSR6 | 10 |
|  | BSR7 | 10 |
|  | BSR8 | 10 |

To overcome the drawbacks of IP multicast we propose to use XCAST instead of traditional multicast as a means to achieve micro-mobility. BSRs are required to join small multicast groups in order to achieve fast handovers. The join messages are not the same IGMP join messages but are similar in their functionality. Definition of the messages are not discussed here and are implementation specific. The MAR manages a list of XCAST groups and the unicast routing addresses of the BSRs that belong to each group. MAR maintains a binding between the MN's home address, MN's CoA, the unicast addresses of each BSR that has joined this virtual group and a lifetime associated with the entry. Data packets addressed to a MN visiting a foreign domain are received by the MAR, it then tunnels the packets to the BSRs using the XCAST mechanism. At each intermediate router, the datagrams are either replicated before sending them downstream depending upon the addresses listed in the XCAST header or sent undisturbed to a downstream neighbor. The BSRs decapsulates the datagrams and then forwards them to the appropriate MN.

Creation of XCAST Session

When the MAR receives a registration reply from the HA in response to the registration request sent by a MN, the MAR then creates an entry in the XCAST Table 4 containing the MN's Home Address, the CoA of the MN and an entry for the BSR (BSRs that appended their BSR extension) that had forwarded the registration request from the MN to the MAR. The entry has the unicast address of BSR that is serving the MN. This entry has to be refreshed periodically since it is a soft-state entry. Each entry has a lifetime for which they are valid and entries that are not refreshed periodically by join messages are flushed. BSRs wanting to keep the entries valid are required to send join messages with their BSR extensions to the MAR.

TABLE 4

XCAST Table Entries

| MN Home Address | Care-Of Address | BSRs | Lifetime |
| --- | --- | --- | --- |
| MN1 | CoA1 | BSR1 | 10 |
| MN2 | CoA2 | BSR2 | 5 |
|  |  | BSR3 | 10 |
| MN3 | COA3 | BSR3 | 10 |

Table 4 depicts the entries when using XCAST instead of IP multicast. The XCAST table only resides at the MAR. The routers from the MAR to the BSRs do not contain any XCAST table entries nor do they contain any information about a particular MN except normal IP routing. The intermediate routers therefore do not have to manage large multicast tables. The intermediate routers may have to perform replication of datagrams depending upon which router is the direct predecessor of the BSRs. At most times only those routers that are direct predecessor of the BSRs would have to perform replication and alter the XCAST header.

In Table 4 MN1 has a multicast session associated with it and BSR1 is a member of the multicast session. This implies that MN1 is under the coverage of BSR1 and that BSR1 had forwarded the registration reply from the MN1 to the MAR.

The MAR then either created a new entry or codified/refreshed an existing entry for the MN using the registration request with the BSR extension. MN2 is being handed over from BSR2 to BSR3 and therefore has two BSR entries because the lifetime for the entries are usually longer than the handoff latency.

Make-Before-Break

The Make-Before-Break option helps in achieving handoffs that are required in order to be complaint to the rigid latency requirements of real-time traffic. MNs have to set the appropriate flags during registration to notify the MAR about its requirement for the MBB option. The MAR depending upon the load of the network and the availability of resources within the domain may grant or reject the request for MBB. If the MAR agrees to the request for MBB then it requires that all the BSRs that serve or are neighbors of the BSR serving a MN implement the MBB option. If the MAR rejects the request then the BSRs work in the normal mode.

BSRs that receive neighbor update messages from their neighboring BSRs are required to create an entry for the MN containing the MN's link layer information, its CoA, MNhomeAddress, and a lifetime associated with the entry in their probable cache. The BSRs then joins the multicast session for that particular MN. The MAR on receiving the join messages from the BSRs creates an entry for the MN, binding the MN's home address with BSRs that have sent join messages to the MN's multicast session, even if only one among the several BSRs has the MN under its coverage.

Table 5 reflects the entries in the XCAST session table at the MAR when using the MBB option. BSR1, BSR2, BSR3 and BSR4 are all members of the multicast session for MN1 (MN's unicast address is being used as the session id.), therefore all of them would receive datagrams intended for MN1. From the binding cache entry for the MN1 from Table 1 it is clear that MN1 is being served by BSR1. Therefore BSR2, BSR3 and BSR4 have to discard datagrams intended for MN1 once they receive the data packets from the MAR. Similarly BSR2, BSR3, BSR4 and BSR4 would receive datagrams intended for MN2. Only BSR2 transmits the datagrams to MN2 and others have to discard the datagrams.

TABLE 5

XCAST Table Entries

| MN Home Address | Care-Of Address | BSRs | Lifetime |
|---|---|---|---|
| MN1 | CoA1 | BSR1 | 10 |
|  |  | BSR2 | 20 |
|  |  | BSR3 | 10 |
|  |  | BSR4 | 20 |
| MN2 | CoA2 | BSR2 | 5 |
|  |  | BSR3 | 10 |
|  |  | BSR4 | 10 |
|  |  | BSR5 | 20 |
| MN3 | COA3 | BSR3 | 10 |
|  |  | BSR6 | 10 |
|  |  | BSR7 | 10 |
|  |  | BSR8 | 10 |

Computer Software Media (3800)

The present invention as illustrated in FIG. 13 (1310, 1320, 1330) specifically anticipates that the protocols and methods described herein may be incorporated into computer media readable by one or more computer systems, whether they be Main Access Routers (1310), Routers (1320), and/or Base Station Routers (1330). This computer readable media may have a wide variety of forms well known or anticipated by one skilled in the art.

Figure 38:
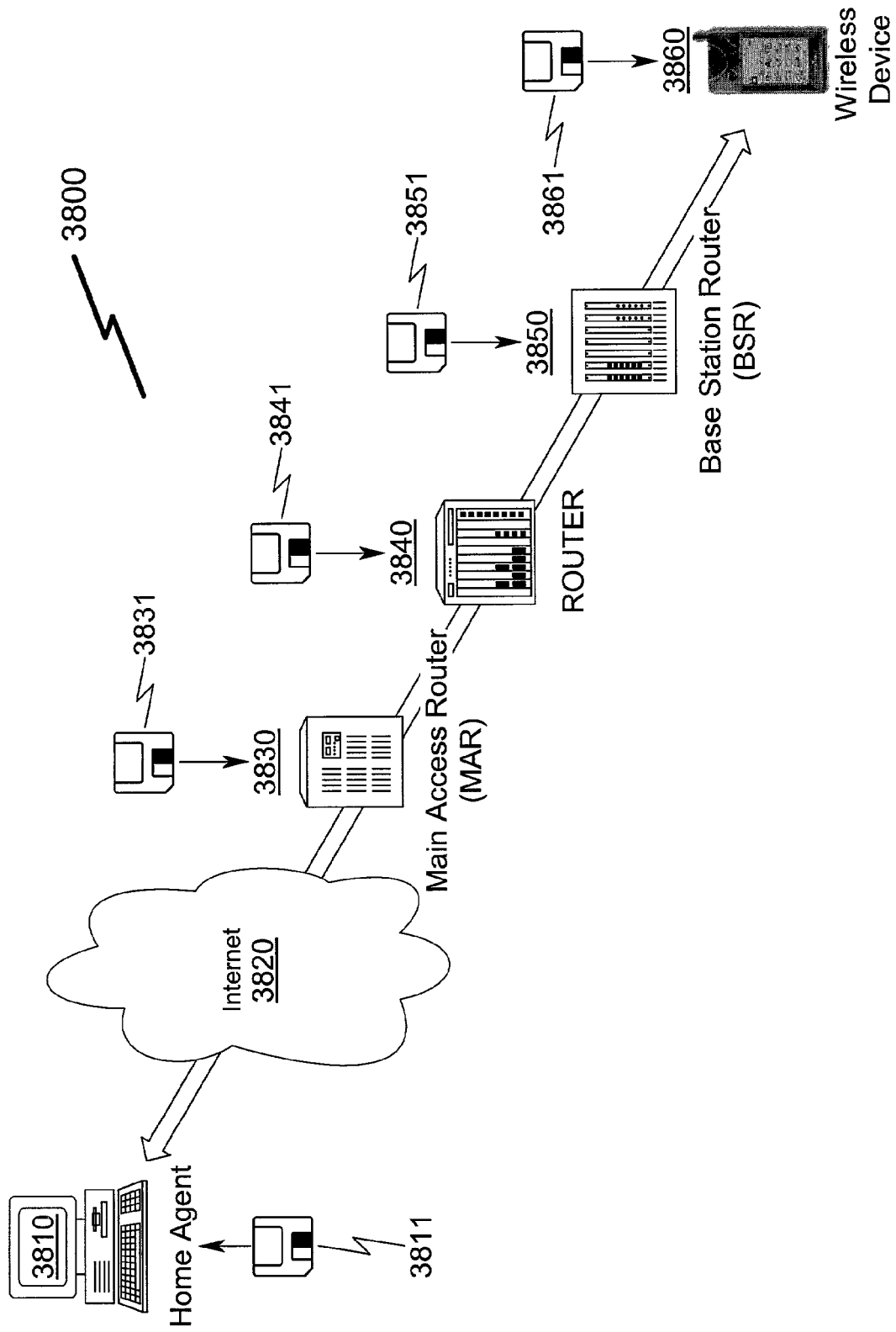
FIG. 38 illustrates a generalized structure of software implemented in some preferred embodiments of the present invention.

As illustrated generically in FIG. 38 (3800), the present invention anticipates the distributed nature of software as embodied in a variety of computer readable media, whether they be in one or more home agents (3811) or other network devices that communicate through the Internet (3821) via a series of software protocols to one or more Main Access Router (3831), Router (3841), and/or Base Station Router (3851) software components to one or more cooperating wireless devices (3861) operating under a coordinated software protocol embodied in a computer readable medium.

Signal Encoding (3900, 4000)

It will be clear to one skilled in the art that the protocols and methods as taught by the present invention may be encoded in a wide variety of ways and that the resulting signals comprising these protocols may be transmitted in a wide variety of networking contexts. The present invention specifically anticipates that the protocols and associated methods described herein will be applied to network signaling methodologies to generate unique signal streams that may be used to affect micro-mobility network portability for generalized IP signaling.

Figure 39:
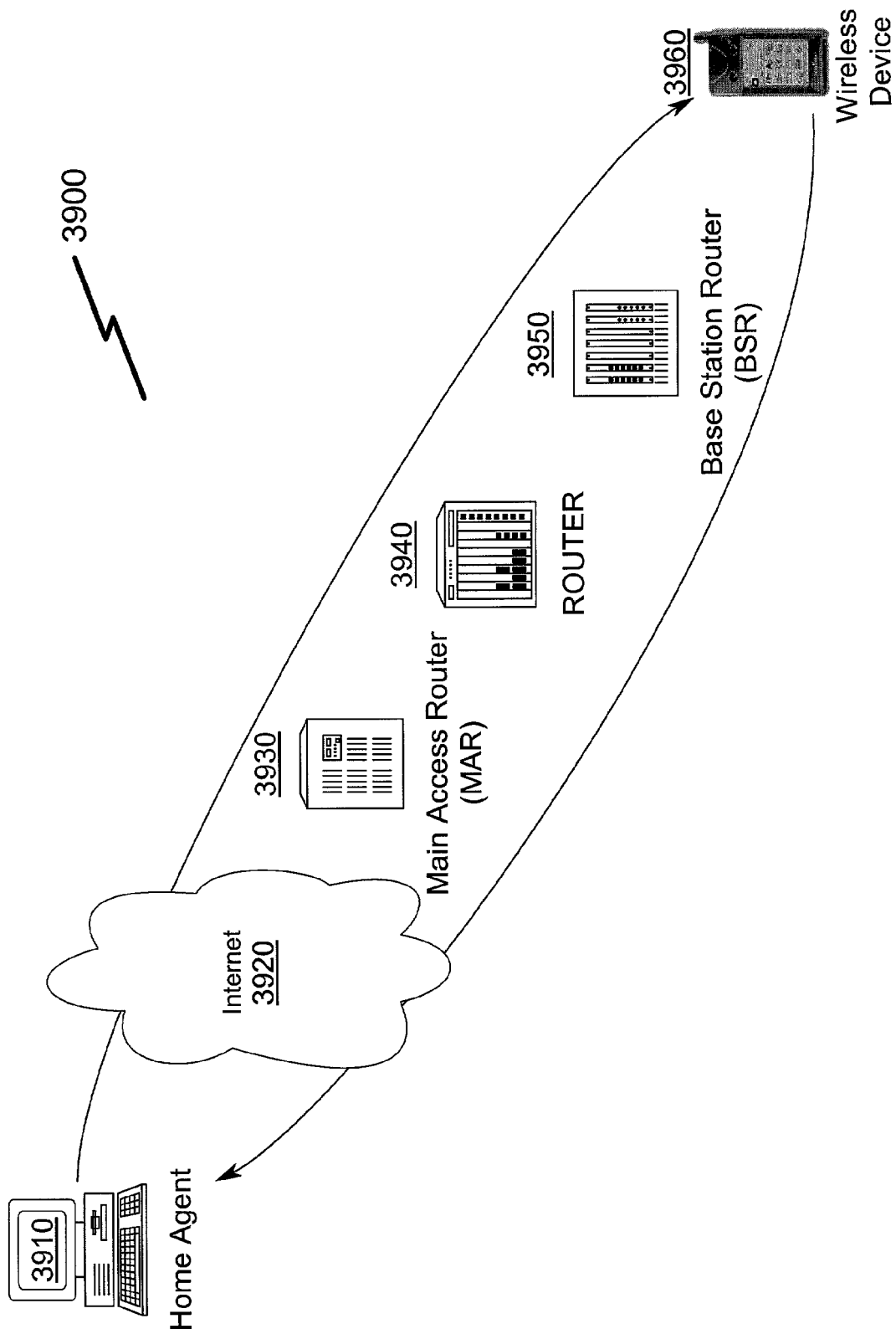
FIG. 39 illustrates a generalized signal flow diagram for the signal structure implemented in some preferred embodiments of the present invention.

Within this context, the general signal flow diagram of FIG. 39 (3900) is applicable. Here, one home agent (3910) or other network device communicates through the Internet (3920) via a series of one or more Main Access Routers (3930), Routers (3940), and/or Base Station Routers (3950) to one or more wireless devices (3960).

As illustrated in FIG. 40 (4000), the signaling in this context corresponds to the present invention protocol as described previously, and generally incorporates Mobile Node Advertisement Extension (MNAE) Structures (4001), Base Station Router (BSR) Extension Structures (4002), Multicast Address Extension (MAE) Structures (4003), and/or Neighbor Update Extension (NUE) Structures (4004).

CONCLUSION

A micro-mobility network routing system and method implementing a protocol that extends the macro mobility support of Mobile IP to support micro mobility has been disclosed which permits a more efficient and easily implemented Internet routing protocol for network devices to be affected. The macro mobility feature herein refers to the notion in which the mobile node gains access to the Internet, while retaining the same IP address. This concept is used only once when the mobile node enters the coverage area of a foreign domain (eventually its home domain). The concept of micro mobility within this context eases routing packets to the mobile node while its moves within the foreign network. The present invention implements these new features via the use of message compositions and protocol extensions that extend the prior art Mobile IP protocols.

The main advantage of the present invention protocol is the low latency that is incurred in establishing a network layer connection between the MN and the foreign network. This is achieved by taking advantage of the triggers offered by the link layer when a handoff occurs. The other advantage is the smoothness of the handoff that this protocol offers. Smooth handoff occurs because of the Make-Before-break option and this is achieved by taking advantage of multicasting techniques.

The present invention protocol offers a new solution to the challenging micro-mobility issue. There are a number of other advantages this protocol offers when compared to the solutions mentioned earlier. This protocol is completely transparent to the MN, which is not aware of the wireless domain and see the BSR as a "pseudo" foreign agent. The use of multicast allows the deployment of MBB, presenting advantages in case of real-time traffic such as voice over IP, although it is important to note that the advantage has its own drawbacks. The main drawback is the useless traffic generated to the BSRs that do not serve the MN.

One skilled in the art given the teachings of the present invention could readily build a simulation platform to validate the concept and measure the performance of the protocol. It would then be possible to ensure that the handoff latency is sufficiently small to offer an efficient quality of service for the end user. One skilled in the art given the teachings of the present invention could readily investigate the issues related to multicast routing. However, since the communication profile is a strict one-to-few, the present invention protocol can take advantage of small group multicast protocol (XCAST). One skilled in the art given the teachings of the present invention could readily make optimizations that to the base protocol with additional study techniques known in the art. Paging extensions based on MMM are anticipated as part of these techniques.

CLAIMS

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A micro-mobility network routing method comprising:
   communicating a registration request of a mobile node (MN) to a wireless domain via a serving base station, a serving base station router (BSR), and a serving main access router (MAR) to said MN's home agent;
   binding said MN's home address to an address associated with said MAR as a multicast address for said MN;
   said MAR maintaining a subscription list associated with the multicast address which includes a unicast routing address of said serving BSR and includes neighboring BSR unicast addresses for neighboring BSRs;
   establishing a binding of the multicast address to said MN within said serving BSR for routing data packets destined for said MN;
   forwarding the multicast address from said serving BSR to a neighboring BSR of said serving BSR and, responsive thereto, said neighboring BSR subscribing to the multicast address, wherein data packets addressed to said MN visiting said wireless domain are received by said MAR which tunnels the data packets to each BSR having subscribed to the multicast address;
   only that BSR that has a binding of the multicast address to said MN is forwarding said packets to said MN; and
   wherein one or more steps of said method is implemented on a wireless radio transceiver.

2. The micro-mobility network routing method of claim 1 further including establishing a further binding of the multicast address to said MN within a further serving BSR when said MN enters a serving area of said further serving BSR.

3. The micro-mobility network routing method of claim 1 wherein said communication occurs over the Internet.

4. The micro-mobility network routing method of claim 1 wherein one or more steps of said method is implemented on a personal computer (PC).

5. The micro-mobility network routing method of claim 1 wherein one or more steps of said method is implemented on a wireless radio transceiver.

* * * * *